United States Patent
Backes et al.

(10) Patent No.: US 8,781,487 B2
(45) Date of Patent: Jul. 15, 2014

(54) PROGRAM FOR DISTRIBUTED CHANNEL SELECTION, POWER ADJUSTMENT AND LOAD BALANCING DECISIONS IN A WIRELESS NETWORK

(75) Inventors: Floyd Backes, Sharon, NH (US); Gary Vacon, East Falmouth, MA (US); Paul Callahan, Carlisle, MA (US); William Hawe, Hollis, NH (US)

(73) Assignee: Piccata Fund Limited Liability Company, Wilmington, DE (US)

( * ) Notice: Subject to any disclaimer, the term of this patent is extended or adjusted under 35 U.S.C. 154(b) by 1311 days.

(21) Appl. No.: 11/676,542

(22) Filed: Feb. 20, 2007

(65) Prior Publication Data

US 2007/0195721 A1    Aug. 23, 2007

Related U.S. Application Data

(63) Continuation of application No. 10/780,817, filed on Feb. 18, 2004.

(60) Provisional application No. 60/449,602, filed on Feb. 24, 2003, provisional application No. 60/466,448, filed on Apr. 29, 2003, provisional application No. 60/472,320, filed on May 21, 2003, provisional application No. 60/472,239, filed on May 21, 2003.

(51) Int. Cl.
*H04W 72/00* (2009.01)

(52) U.S. Cl.
USPC ............... 455/452.1; 455/434; 455/435.1; 455/450; 455/452.2

(58) Field of Classification Search
USPC ............ 455/434, 435.1–435.3, 436, 450–453
See application file for complete search history.

(56) References Cited

U.S. PATENT DOCUMENTS

| | | |
|---|---|---|
| 5,212,831 A | 5/1993 | Chuang et al. |
| 5,345,597 A | 9/1994 | Strawczynski et al. |
| 5,345,598 A | 9/1994 | Dent |
| 5,386,589 A | 1/1995 | Kanai |
| 5,475,864 A | 12/1995 | Hamabe |
| 5,493,694 A | 2/1996 | Vlcek et al. |
| 5,524,280 A | 6/1996 | Douthitt et al. |
| 5,541,954 A | 7/1996 | Emi |

(Continued)

FOREIGN PATENT DOCUMENTS

WO    WO 2004059933 A1    7/2004

OTHER PUBLICATIONS

U.S. Appl. No. 10/781,204, Apparatus for Adjusting Channel Interference between Devices in a Wireless Network.

(Continued)

*Primary Examiner* — Olumide T Ajibade Akonai
*Assistant Examiner* — Jaime Holliday
(74) *Attorney, Agent, or Firm* — Novak Druce Connolly Bove + Quigg LLP

(57) ABSTRACT

The performance and ease of management of wireless communications environments is improved by a mechanism that enables access points (APs) to perform automatic channel selection. A wireless network can therefore include multiple APs, each of which will automatically choose a channel such that channel usage is optimized. Furthermore, APs can perform automatic power adjustment so that multiple APs can operate on the same channel while minimizing interference with each other. Wireless stations are load balanced across APs so that user bandwidth is optimized. A movement detection scheme provides seamless roaming of stations between APs.

27 Claims, 62 Drawing Sheets

(56) References Cited

U.S. PATENT DOCUMENTS

| | | |
|---|---|---|
| 5,551,057 A | 8/1996 | Mitra |
| 5,574,968 A | 11/1996 | Olds et al. |
| 5,574,982 A | 11/1996 | Almgren et al. |
| 5,606,727 A | 2/1997 | Ueda |
| 5,633,888 A | 5/1997 | Stewart |
| 5,724,346 A | 3/1998 | Kobayashi et al. |
| 5,740,534 A | 4/1998 | Ayerst et al. |
| 5,815,811 A | 9/1998 | Pinard et al. |
| 5,845,212 A | 12/1998 | Tanaka |
| 5,852,780 A | 12/1998 | Wang et al. |
| 5,886,988 A | 3/1999 | Yun et al. |
| 5,923,702 A | 7/1999 | Brenner et al. |
| 5,924,030 A | 7/1999 | Rautiola et al. |
| 5,933,420 A | 8/1999 | Jaszewski et al. |
| 5,963,848 A | 10/1999 | D'Avello |
| 5,987,062 A | 11/1999 | Engwer et al. |
| 6,018,663 A | 1/2000 | Karlsson et al. |
| 6,029,074 A | 2/2000 | Irvin |
| 6,052,562 A | 4/2000 | Dorenbosch |
| 6,052,596 A | 4/2000 | Barnickel |
| 6,111,867 A | 8/2000 | Mann |
| 6,131,015 A | 10/2000 | Hill et al. |
| 6,144,855 A | 11/2000 | Slovin |
| 6,157,626 A | 12/2000 | Nakamura et al. |
| 6,195,554 B1 | 2/2001 | H'mimy et al. |
| 6,198,924 B1 | 3/2001 | Ishii et al. |
| 6,208,629 B1 | 3/2001 | Jaszewski et al. |
| 6,208,631 B1 | 3/2001 | Kim |
| 6,215,779 B1 | 4/2001 | Bender |
| 6,215,811 B1 | 4/2001 | Yuen |
| 6,255,918 B1 | 7/2001 | Parrott et al. |
| 6,266,537 B1 | 7/2001 | Kashitani et al. |
| 6,301,482 B1 | 10/2001 | Shohara |
| 6,332,007 B1 | 12/2001 | Sasaki |
| 6,332,077 B1 | 12/2001 | Wu et al. |
| 6,334,047 B1 | 12/2001 | Andersson et al. |
| 6,374,085 B1 | 4/2002 | Saints et al. |
| 6,430,408 B1 | 8/2002 | Dorenbosch |
| 6,452,498 B2 | 9/2002 | Stewart |
| 6,515,971 B2 | 2/2003 | Nelson et al. |
| 6,522,875 B1 | 2/2003 | Dowling et al. |
| 6,522,881 B1 | 2/2003 | Feder |
| 6,542,716 B1 | 4/2003 | Dent et al. |
| 6,560,462 B1 | 5/2003 | Ravi et al. |
| 6,574,474 B1 | 6/2003 | Nielsen |
| 6,574,477 B1 | 6/2003 | Rathunde |
| 6,580,700 B1 | 6/2003 | Pinard et al. |
| 6,580,704 B1 | 6/2003 | Wellig et al. |
| 6,591,103 B1 | 7/2003 | Dunn et al. |
| 6,597,671 B1 | 7/2003 | Ahmadi et al. |
| 6,633,765 B1 | 10/2003 | Maggenti |
| 6,636,737 B1 | 10/2003 | Hills |
| 6,639,904 B1 | 10/2003 | Boyer et al. |
| 6,657,981 B1 | 12/2003 | Lee et al. |
| 6,681,256 B1 | 1/2004 | Kuntze et al. |
| 6,690,944 B1 | 2/2004 | Lee et al. |
| 6,693,915 B1 | 2/2004 | Lappetelainen et al. |
| 6,729,929 B1 | 5/2004 | Sayers et al. |
| 6,732,163 B1 | 5/2004 | Halasz |
| 6,738,599 B2 | 5/2004 | Black |
| 6,741,863 B1 | 5/2004 | Chiang et al. |
| 6,757,319 B1 | 6/2004 | Parsa et al. |
| 6,760,746 B1 | 7/2004 | Schneider |
| 6,760,748 B1 | 7/2004 | Hakim |
| 6,760,877 B1 | 7/2004 | Lappetelainen et al. |
| 6,788,940 B2 | 9/2004 | Bhatoolaul et al. |
| 6,795,407 B2 | 9/2004 | Chesson |
| 6,801,777 B2 | 10/2004 | Rusch |
| 6,805,499 B2 | 10/2004 | Westerweck et al. |
| 6,870,815 B2 | 3/2005 | McFarland et al. |
| 6,888,792 B2 | 5/2005 | Gronke |
| 6,898,198 B1 | 5/2005 | Ryan et al. |
| 6,904,021 B2 | 6/2005 | Belcea |
| 6,905,021 B2 | 6/2005 | Polumbaum et al. |
| 6,907,229 B2 | 6/2005 | Shpak |
| 6,930,986 B2 | 8/2005 | Dempo et al. |
| 6,941,143 B2 | 9/2005 | Mathur |
| 6,954,646 B2 | 10/2005 | Churt |
| 6,959,001 B1 | 10/2005 | Parks |
| 6,973,316 B1 | 12/2005 | Hayakawa |
| 6,993,334 B2 | 1/2006 | Andrus et al. |
| 6,996,127 B2 | 2/2006 | Rezaiifar et al. |
| 7,016,696 B2 | 3/2006 | Vincent et al. |
| 7,020,439 B2 | 3/2006 | Sinivaara et al. |
| 7,035,314 B1 | 4/2006 | Linsky |
| 7,050,479 B1 | 5/2006 | Kim |
| 7,054,640 B2 | 5/2006 | Bing et al. |
| 7,076,220 B2 | 7/2006 | Backes et al. |
| 7,133,386 B2 | 11/2006 | Holur et al. |
| 7,136,665 B2 | 11/2006 | Ida et al. |
| 7,146,300 B2 | 12/2006 | Zammit et al. |
| 7,162,507 B2 | 1/2007 | Carter |
| 7,167,696 B2 | 1/2007 | Backes et al. |
| 7,173,918 B2 | 2/2007 | Awater et al. |
| 7,206,297 B2 | 4/2007 | Backes |
| 7,206,840 B2 | 4/2007 | Choi et al. |
| 7,215,661 B2 | 5/2007 | Backes et al. |
| 7,269,260 B2 | 9/2007 | Adachi et al. |
| 7,280,520 B2 | 10/2007 | Melville et al. |
| 7,359,363 B2 | 4/2008 | Sakai |
| 7,486,616 B2 | 2/2009 | Kitchin |
| 2001/0010460 A1 | 8/2001 | Miller et al. |
| 2001/0046879 A1* | 11/2001 | Schramm et al. ............ 455/525 |
| 2001/0048744 A1 | 12/2001 | Kimura |
| 2002/0012332 A1 | 1/2002 | Tiedemann et al. |
| 2002/0016180 A1 | 2/2002 | Derosier et al. |
| 2002/0038336 A1 | 3/2002 | Abileah et al. |
| 2002/0042268 A1 | 4/2002 | Cotanis |
| 2002/0060995 A1 | 5/2002 | Cervello et al. |
| 2002/0065081 A1 | 5/2002 | Barany et al. |
| 2002/0082011 A1* | 6/2002 | Fujii et al. ............ 455/434 |
| 2002/0085719 A1 | 7/2002 | Crosbie |
| 2002/0090966 A1 | 7/2002 | Hansen et al. |
| 2002/0097696 A1 | 7/2002 | Kossi et al. |
| 2002/0141368 A1 | 10/2002 | Cheung et al. |
| 2002/0141375 A1 | 10/2002 | Choi |
| 2002/0142771 A1 | 10/2002 | Saifullah et al. |
| 2002/0147031 A1 | 10/2002 | Hood, III |
| 2002/0172186 A1 | 11/2002 | Larsson |
| 2002/0176437 A1 | 11/2002 | Busch et al. |
| 2002/0181417 A1 | 12/2002 | Malhotra et al. |
| 2002/0188723 A1 | 12/2002 | Choi et al. |
| 2002/0191554 A1 | 12/2002 | Kondo |
| 2002/0191561 A1 | 12/2002 | Chen et al. |
| 2002/0193113 A1 | 12/2002 | Sayeedi et al. |
| 2002/0193133 A1 | 12/2002 | Shibutani |
| 2003/0002456 A1 | 1/2003 | Soomro et al. |
| 2003/0012174 A1 | 1/2003 | Bender et al. |
| 2003/0022686 A1 | 1/2003 | Soomro et al. |
| 2003/0022692 A1 | 1/2003 | Ueno |
| 2003/0035442 A1 | 2/2003 | Eng |
| 2003/0036374 A1 | 2/2003 | English et al. |
| 2003/0040319 A1 | 2/2003 | Hansen et al. |
| 2003/0050066 A1 | 3/2003 | Tobe et al. |
| 2003/0076852 A1 | 4/2003 | Fukui |
| 2003/0081654 A1 | 5/2003 | Cooklev et al. |
| 2003/0083095 A1 | 5/2003 | Liang |
| 2003/0086437 A1 | 5/2003 | Benveniste |
| 2003/0087646 A1 | 5/2003 | Funato et al. |
| 2003/0100328 A1 | 5/2003 | Klein et al. |
| 2003/0134642 A1 | 7/2003 | Kostic et al. |
| 2003/0174667 A1 | 9/2003 | Krishnamurthi et al. |
| 2003/0181211 A1 | 9/2003 | Razavilar et al. |
| 2003/0185233 A1 | 10/2003 | Ji et al. |
| 2003/0190915 A1 | 10/2003 | Rinne et al. |
| 2003/0198305 A1 | 10/2003 | Taylor et al. |
| 2003/0207699 A1* | 11/2003 | Shpak ............ 455/525 |
| 2003/0223354 A1 | 12/2003 | Olszewski |
| 2003/0231655 A1 | 12/2003 | Kelton et al. |
| 2003/0236064 A1 | 12/2003 | Shiohara et al. |
| 2004/0001467 A1 | 1/2004 | Cromer et al. |
| 2004/0003285 A1 | 1/2004 | Whelan et al. |
| 2004/0008645 A1 | 1/2004 | Janevski et al. |
| 2004/0014422 A1 | 1/2004 | Kallio |

(56) References Cited

U.S. PATENT DOCUMENTS

| | | |
|---|---|---|
| 2004/0022219 A1 | 2/2004 | Mangold et al. |
| 2004/0023629 A1 | 2/2004 | Klank |
| 2004/0023674 A1 | 2/2004 | Miller |
| 2004/0027284 A1 | 2/2004 | Leeper et al. |
| 2004/0037247 A1 | 2/2004 | Ngo |
| 2004/0038697 A1 | 2/2004 | Attar et al. |
| 2004/0039817 A1 | 2/2004 | Lee et al. |
| 2004/0047335 A1 | 3/2004 | Proctor et al. |
| 2004/0054767 A1 | 3/2004 | Karaoguz et al. |
| 2004/0054774 A1 | 3/2004 | Barber et al. |
| 2004/0057507 A1 | 3/2004 | Rotstein et al. |
| 2004/0066759 A1 | 4/2004 | Molteni et al. |
| 2004/0071110 A1* | 4/2004 | Guey et al. ............ 370/329 |
| 2004/0095902 A1 | 5/2004 | Larola et al. |
| 2004/0121749 A1 | 6/2004 | Cui et al. |
| 2004/0121765 A1 | 6/2004 | Idnani et al. |
| 2004/0132458 A1 | 7/2004 | Bing et al. |
| 2004/0137915 A1 | 7/2004 | Diener et al. |
| 2004/0146021 A1 | 7/2004 | Fors et al. |
| 2004/0151137 A1 | 8/2004 | McFarland et al. |
| 2004/0156336 A1* | 8/2004 | McFarland et al. ...... 370/329 |
| 2004/0157613 A1 | 8/2004 | Steer et al. |
| 2004/0160908 A1 | 8/2004 | Perlman |
| 2004/0162084 A1 | 8/2004 | Wang |
| 2004/0165557 A1 | 8/2004 | Backes et al. |
| 2004/0166849 A1 | 8/2004 | Hawe |
| 2004/0166867 A1 | 8/2004 | Hawe |
| 2004/0174852 A1 | 9/2004 | Backes et al. |
| 2004/0192279 A1 | 9/2004 | Backes et al. |
| 2004/0202141 A1 | 10/2004 | Sinivaara et al. |
| 2004/0203783 A1 | 10/2004 | Wu et al. |
| 2004/0203808 A1* | 10/2004 | Mathur ................ 455/450 |
| 2004/0203828 A1 | 10/2004 | Mirchandani et al. |
| 2004/0203863 A1 | 10/2004 | Huomo |
| 2004/0208151 A1 | 10/2004 | Haverinen et al. |
| 2004/0214572 A1 | 10/2004 | Thompson et al. |
| 2004/0214590 A1 | 10/2004 | Al-Housami et al. |
| 2004/0219920 A1 | 11/2004 | Love et al. |
| 2004/0266351 A1 | 12/2004 | Chuah et al. |
| 2005/0003827 A1 | 1/2005 | Whelan |
| 2005/0013275 A1 | 1/2005 | Black et al. |
| 2005/0026610 A1 | 2/2005 | Backes et al. |
| 2005/0032506 A1 | 2/2005 | Walker |
| 2005/0047354 A1 | 3/2005 | Zeira et al. |
| 2005/0074030 A1 | 4/2005 | Cho et al. |
| 2005/0090250 A1 | 4/2005 | Backes |
| 2005/0117524 A1 | 6/2005 | Lee et al. |
| 2005/0118981 A1 | 6/2005 | Laroia et al. |
| 2005/0124335 A1 | 6/2005 | Cave et al. |
| 2005/0130677 A1 | 6/2005 | Muenier et al. |
| 2005/0148336 A1 | 7/2005 | Nagato et al. |
| 2005/0152480 A1 | 7/2005 | Chang et al. |
| 2005/0180356 A1 | 8/2005 | Gillies et al. |
| 2005/0190730 A1 | 9/2005 | Dore et al. |
| 2005/0195786 A1 | 9/2005 | Shpak |
| 2005/0232200 A1 | 10/2005 | Jeong et al. |
| 2005/0245269 A1 | 11/2005 | Demirhan et al. |
| 2005/0250511 A1 | 11/2005 | Xiao et al. |
| 2006/0013179 A1 | 1/2006 | Yamane |
| 2006/0068781 A1 | 3/2006 | Lam |
| 2006/0082489 A1 | 4/2006 | Liu et al. |
| 2006/0089138 A1 | 4/2006 | Smith et al. |
| 2006/0094371 A1 | 5/2006 | Nguyen |
| 2006/0120302 A1 | 6/2006 | Poncini et al. |
| 2007/0041398 A1 | 2/2007 | Benveniste |
| 2007/0058581 A1 | 3/2007 | Benveniste |
| 2007/0111730 A1 | 5/2007 | Baker et al. |
| 2007/0286143 A1 | 12/2007 | Olson et al. |
| 2007/0286425 A1 | 12/2007 | Adachi et al. |

OTHER PUBLICATIONS

U.S. Appl. No. 10/781,159, Patent No. 7,215,973, Apparatus for Adjusting Channel Interference between Access Points in a Wireless Network.

U.S. Appl. No. 10/781,219, Patent No. 7,369,858, Apparatus for Self-Adjusting Power at a Wireless Station to Reduce Inter-channel Interference.

U.S. Appl. No. 10/781,535, Patent No. 7,228,149, Method for Adjusting Channel Interference between Devices in a Wireless Network.

U.S. Appl. No. 10/781,474, Patent No. 7,221,954, Method for Adjusting Channel Interference between Access Points in a Wireless Network.

U.S. Appl. No. 10/780,775, Patent No. 7,295,537, Method for Self-Adjusting Power at a Wireless Station to Reduce Inter-channel Interference.

U.S. Appl. No. 10/781,191, Patent No. 7,653,407, Program for Adjusting Channel Interference between Devices in a Wireless Network.

U.S. Appl. No. 10/781,137, Program for Adjusting Channel Interference between Access Points in a Wireless Network.

U.S. Appl. No. 10/781,536, Patent No. 7,149,539, Program for Self-Adjusting Power at a Wireless Station to Reduce Inter-channel Interference.

U.S. Appl. No. 12/652,146, Program for Adjusting Channel Interference between Access Points in a Wireless Network.

U.S. Appl. No. 12/437,085, Program for Adjusting Channel Interference between Devices in a Wireless Network.

U.S. Appl. No. 12/359,683, Program for Selecting an Optimum Access Point in a Wireless Network.

U.S. Appl. No. 12/359,545, Method for Selecting an Optimum Access Point in a Wireless Network on a Common Channel.

U.S. Appl. No. 11/866,445, Wireless Network Apparatus and System Filed of the Invention.

U.S. Appl. No. 10/673,636, Patent No. 7,606,573, A Wireless Switched Network.

IEEE, Wireless LAN Mediumj Access Control (MAC) and Physical Layer (PHY) specifications, Standard 802.11, 1999 edition, Reference No. ISO/IEC 8802-11:1999(E), 528 Pages.

Michael Barr, Toward a Smaller Java, Embedded.com, Jun. 14, 2002, pp. 1-9.

Moustafa Youssef, "Handling Samples Correlation in the Horus System", IEEE INFOCOM 2004.

Kin K. Leung "Integrated Link Adaptation and Power Control for Wireless IP Networks", At&T Labs-research, Jan. 19, 2000.

Ana Zapater et al., "Development and implementation of a Bluetooth Networking Infrastructure for the a Notebook—University Scenario", Institute of Communications Engineering, University of Hannover, May 13, 2003.

Walter Klotz, "Graph Coloring Algorithms", 1999.

Brent N. Chun et. Al., "Market-based Proportional esource Sharing for Flusters", University of California at Berkeley computer Science Division, Sep. 1999.

The Four Color Theorem, Web page, author(s) unknow, updated Nov. 13, 1995.

IEEE Std 802.11h-2003, IEEE Standard for Information technology Telecommunications and Information exchange between systems Local and metropolitan area networks Specific requirements, Oct. 14, 2003, 59 pages.

* cited by examiner

46

| AP_ID | received power | TP Backoff | DRCP | Normalized received power |
|---|---|---|---|---|
| AP[1] | <list> | <list> | 1 | |
| AP[2] | 0 | ? | 0 | |
| ... | ... | ... | ... | ... |
| AP[n] | <list> | <list> | 1 | |

Other APs Table

Fig. 6

Scan Table

116

| Channel_ID | highestPwr AP_ID | highestPwrlevel |
|---|---|---|
| 2 | AP[1] | dbm |
| 3 | AP[2] | dbm |
| ... | ... | ... |
| 8 | AP[n] | dbm |

Channel Map

Fig. 10

| Channel | signal strength | Triplet avg | AP ID |
|---|---|---|---|
| 2 | 5 | 5 | 3 |
| 3 | 2 | 5 | 11 |
| 4 | 8 | 5 | 2 |
| 1 | 3 | 6 | 8 |
| 2 | 9 | 6 | 6 |
| 3 | 6 | 6 | 1 |
|  |  |  |  |

124

Triplet channel map

| AP-ID | ReceivedPowerlevel | DRCP |
|-------|--------------------|------|
| 2 | <list> | 5 |
| 3 | <list> | 7 |
| 4 | <list> | 3 |
| 7 | <list> | 6 |
| 9 | <list> | 9 |
| 11 | <list> | 12 |

Claim APs table

Fig. 12

| AP_ID | TP_Backoff | Max Power | DRCP | Age | Normalized power | sample size | corrected power |
|---|---|---|---|---|---|---|---|
| AP[1] | <list> | <list> | 1 | 2 | dbm | 3 | dbm |
| AP[2] | 0 | max power | 0 | 3 | dbm | 4 | dbm |
| ... | ... | ... | ... | ... | ... | ... | ... |
| AP[MAX_AP] | <list> | <list> | 1 | 1 | dbm | 1 | dbm |

200

AP Known APs Table

Fig. 14

AP AssociatedSTA Table

| Number of Samples | Calculated Standard Error (+/- dB) | Rounded Standard Error (+/- dB) |
|---|---|---|
| 2 | 38.6 | 39 |
| 4 | 22.3 | 22 |
| 8 | 14.6 | 15 |
| 16 | 9.94 | 10 |
| 32 | 6.9 | 7 |
| 64 | 4.9 | 5 |
| 128 | 3.4 | 3 |
| 256 | 2.3 | 2 |
| 512 | 1.7 | 2 |
| 1024 | .8<dB<1.7 | 1 |
| 2000 | .8 | 1 |
| 2048 | 0<dB<.8 | 1 |

Table I

Stardard error for 99% confidence on received power values averaged over number of samples for standard deviation = 15 dB.

Fig. 19

Fig. 20 — AP Power adjust during STA movement

STA Initialization

STA Canvassing, 802.11

| AP_ID | Channel ID | age | Load Factor | TP Backoff | Max Power | distance _samples | distance | my_Load Factor | biased distance | corrected distance |
|---|---|---|---|---|---|---|---|---|---|---|
| AP[1] | 3 | 2 | 2 | <list> | <list> | 10 | avg | 2 | 2 | 2 |
| AP[2] | 7 | 3 | 3 | <list> | <list> | 7 | | 3 | 3 | 3 |
| ... | 5 | ... | ... | ... | ... | ... | ... | ... | ... | ... |
| AP[MAX_AP] | 2 | 1 | 1 | <list> | <list> | 13 | | 1 | 1 | 1 |

430

STA Known APs Table

Fig. 26

STA Power Adjustment

| Distance in Banzais | 802.11a, g Mb/s | 802.11b Mb/s |
|---|---|---|
| 0-68 | 54 | 11 |
| 69-72 | 48 | 11 |
| 73-76 | 36 | 11 |
| 77-80 | 24 | 11 |
| 81-83 | 18 | 11 |
| 84-85 | 12 | 5.5 |
| 86 | 9 | 5.5 |
| 87 | 9 | 2 |
| 88 | 6 | 2 |
| 89 | 2 | 2 |
| 90-91 | 2 | 1 |
| 92-94 | 1 | 0 |
| 95-97 | .5 | 0 |

Table II

Distance_to_Rate Table, 802.11

Fig. 31

| Data Rate | Load Factor |
|---|---|
| 108 | 4 |
| 72 | 6 |
| 54 | 8 |
| 48 | 9 |
| 36 | 12 |
| 24 | 18 |
| 18 | 24 |
| 11 | 39 |
| 9 | 48 |
| 6 | 72 |
| 5.5 | 79 |
| 2 | 216 |
| 1 | 432 |
| .5 | 864 |
| 0 | 65,535 |

Table III

Rate_to_Load table for 802.11

Fig. 32

802.11 AP DRCP Architecture 802.11 STA DRCP Architecture

| Message Type | Usage | Data Rate | Max Power |
| --- | --- | --- | --- |
| DRCP Preclaim | Used by ARMAs in the channel selection process | Lowest Datarate | Max Power |
| DRCP Claim | Used by ARMAs in the channel selection process | Lowest Datarate | Max Power |
| DRCP Announce | Used by ARMAs to announce their presence to SRMAs and other ARMAs. | Lowest Datarate | Max Power |
| DRCP Bid | Used by SRMAs to bid for slots on ARMAs | STA Datarate | Max Power - TP Backoff |
| DRCP Accept | Used by ARMAs to signal to SRMAs permission to associate | STA Datarate | Max Power - TP Backoff |
| DRCP Registration Request | Used by STAs to tell ARMAs they will associate | STA Datarate | Max Power - TP Backoff |
| DRCP Registration Acknowledge | Used by ARMAs to tell STA it received registration request | STA Datarate | Max Power - TP Backoff |

Fig. 40

| Name | Size | Description |
|---|---|---|
| Type | 1 | Message type. Values:<br>1 = DRCP Claim<br>2 = DRCP Announce<br>3 = DRCP Preclaim<br>4 = DRCP Bid<br>5 = DRCP Accept<br>6 = DRCP Registration Request<br>7 = DRCP Registration Acknowledge |
| Channel ID | 1 | Indicates the channel of the originating station |
| AP-ID | 6 | The MAC Address of the AP in which the transmitting ARMA is insantiated |
| SSID | 32 | The Service Set ID (SSID) of the AP in which the transmitting ARMA is instantiated. This value is also referred to as the "Network Name". |
| Load Factor | 2 | The sum of the loads of the ATAs currently associated to the transmitting AP. |
| TP Backoff | 2 | Transmit power backoff value in use by the transmitting AP. |
| Max Power | 2 | Maximum pwer output, in dBm, of the transmitting AP's radio. |
| Biased Distance Delta | 4 | The difference between the biased distance from the transmitting STA to its current AP and the destination AP. |
| STA ID | 6 | The MAC address of the STA in which the transmitting SRMA is instantiated. |
| STA Assoc AP ID | 6 | The MAC address of the AP to which the transmitting STA is currently associated. |
| Bid AP ID | 6 | The MAC address of the AP to which the transmitting STA is bidding. |
| Accepted STA ID | 6 | The MAC address of the STA that the sending AP is accepting. |
| STA Reported AP ID | 6 | The MAC address of the AP that was identified in the last Bid message as the accepted STA's associated AP. |
| Max TP Backoff | 2 | Max dB's backoff capable of an AP |
| Adjacency Vector Sum | 2 | Sum of received power levels from all APs heard during scanning and preclaiming. |

Fig. 41

Byte Address

| | | | | |
|---|---|---|---|---|
| 0 | Version | Type | Flags | Channel ID |
| 4 | AP ID (MSBs) | | | |
| 8 | AP ID (LSBs) | | Max Backoff | Max power |

DRCP Preclaim Message

Fig. 42

Byte Address

| | | | | |
|---|---|---|---|---|
| 0 | Version | Type | Flags | Channel ID |
| 4 | AP ID (MSBs) ||||
| 8 | AP ID (LSBs) || Max Backoff | Max Power ||
| 12 | Adjacency Vector Sum || Reserved ||

DRCP Claim Message

Fig. 43

Byte Address

| | | | | |
|---|---|---|---|---|
| 0 | Version | Type | Flags | Channel ID |
| 4 | AP ID (MSBs) | | | |
| 8 | AP ID (LSBs) | | Max Backoff I Max Power | |
| 12 | TP Backoff I Reserved | | Load Factor | |

DRCP Announce Message

Fig. 44

Byte Address

| | Version | Type | Flags | Channel ID |
|---|---|---|---|---|
| 0 | | | | |
| 4 | Biased Distance Delta ||||
| 8 | STA ID (MSBs) ||||
| 12 | STA ID (LSBs) || STA Assoc AP ID (MSBs) ||
| 16 | STA Assoc AP ID (LSBs) ||||
| 20 | Bid AP ID (MSBs) ||||
| 24 | Bid AP (LSBs) || Reserved ||

DRCP Bid Message

Fig. 45

Byte Address

| | | | | |
|---|---|---|---|---|
| 0 | Version | Type | Flags | Channel ID |
| 4 | AP ID (MSBs) ||||
| 8 | AP ID (LSBs) || Accepted STA ID (MSBs) ||
| 12 | Accepted STA ID (LSBs) ||||
| 16 | STA Reported AP ID (MSBs) ||||
| 20 | STA Reported AP ID (LSBs) || Reserved ||

DRCP Accept Message

Fig. 46

Byte Address

| | | | | |
|---|---|---|---|---|
| 0 | Version | Type | Flags | Channel ID |
| 4 | AP ID (MSBs) ||||
| 8 | AP ID (LSBs) || Accepted STA ID (MSBs) ||
| 12 | Accepted STA ID (LSBs) ||||

DRCP Registration Request Message

Fig. 47

Byte Address

| | | | | |
|---|---|---|---|---|
| 0 | Version | Type | Flags | Channel ID |
| 4 | AP ID (MSBs) | | | |
| 8 | AP ID (LSBs) | | Accepted STA ID (MSBs) | |
| 12 | Accepted STA ID (LSBs) | | | |

DRCP Registration Acknowledge Message

Fig. 48

| Sample Time Duration | # Power Samples (N2) | Upper 99% Confidence Interval | Lower 99% Confidence Interval |
|---|---|---|---|
| 1 sec | 20 | -29.1 dbm | -46.9 dbm |
| 10 sec | 200 | -35.3 dbm | -40.7 dbm |
| 100 sec | 2000 | -37.2 dbm | -38.3 dbm |
| 1000 sec | 20,000 | -37.7 dbm | -38.3 dbm |

Fig. 54

PROGRAM FOR DISTRIBUTED CHANNEL SELECTION, POWER ADJUSTMENT AND LOAD BALANCING DECISIONS IN A WIRELESS NETWORK

CROSS-REFERENCE TO RELATED APPLICATIONS

This application is a continuation of U.S. patent application Ser. No. 10/780,817 filed on Feb. 18, 2004 and incorporated herein by reference, now abandoned. U.S. patent application Ser. No. 10/780,817 claims priority to the following provisiional applications: 60/449,602, filed Feb. 24, 2003; 60/466,448, filed Apr. 29, 2003, 60/472,239, filed May 21, 2003; and 60/472,320 filed Apr. 21, 2003.

FIELD OF THE INVENTION

The invention relates generally to wireless networks, and more particularly to wireless network configuration and power level adjustment for network performance optimization.

BACKGROUND OF THE INVENTION

The proliferation of laptop and hand-held portable computers has produced a concomitant need for robust, reliable, and high performance wireless networks to maximize the mobility advantages of these devices and increase the ease of construction and management of these wireless networks. Current wireless networks, such as IEEE 802.11b, 802.11a, 802.11g, (etc) networks, are subject to certain limitations that can limit a mobile user's network performance and reliability. For instance, only a very limited number of radio channels are available. In the current state of the art, wireless access points cannot effectively share the same channel in the same area because of radio and control protocol interference. So, bandwidth over a given area is limited by the number of non-overlapping channels available. Also, current wireless networks require manual site engineering to control the placement of access points and channel distribution between access points, raising the cost and complexity of the wireless network installation process. Furthermore, user roaming between wireless access points is inconsistent. Once associated with an access point, a user will tend to remain associated with that access point even if another access point is capable of providing higher performance for the user. It would be desirable to provide wireless networking solutions which overcome the above described inadequacies and shortcomings of current wireless networks.

SUMMARY OF THE INVENTION

In accordance with the principles of the invention, various apparatus, methods, and computer program products are provided to improve the performance and ease of management of wireless communications environments. For example, a mechanism is provided to enable access points (APs) to perform automatic channel selection. A wireless network can therefore include multiple APs, each of which will automatically choose a channel such that channel usage is optimized. Furthermore, APs can perform automatic power adjustment so that multiple APs can operate on the same channel while minimizing interference with each other. Further aspects of the invention are used to cause load balancing of stations across APs so that user bandwidth is optimized. Novel movement detection schemes provide seamless roaming of stations between APs. These and further aspects of the invention enable the provision of automatically configurable, high performance wireless communications environments.

BRIEF DESCRIPTION OF THE DRAWINGS

FIG. 6 is a representation of a table kept by APs for use in an alternate channel selection scheme.

FIG. 10 is a representation of a Channel Map kept by APs for use in the automatic channel selection scheme of FIG. 8.

FIG. 11 is a representation of a Triplet Channel Map kept by APs for use in the automatic channel selection scheme of FIG. 8.

FIG. 12 is a representation of a Claim APs table kept by APs for use in the automatic channel selection scheme of FIG. 8.

FIG. 14 is an example of an AP KnownAPs table maintained by an AP, and used for power adjustment.

FIG. 19 is a table showing expected standard errors related to number of power level samples.

FIG. 26 is an example of a STA Known APs table, used by STAs for power adjustment and load balancing.

FIG. 31 is an example of a distance_to_rate table for use in an 802.11 wireless networking environment.

FIG. 32 is an example of a rate_to_load table for use in an 802.11 wireless networking environment.

FIG. 40 is a table summarizing the DRCP messages used in the various aspects of the invention.

FIG. 41 is a table describing the various fields used in DRCP messages.

FIG. 42 is a diagram of the message format of a DRCP Preclaim message.

FIG. 43 is a diagram of the message format of a DRCP Claim message.

FIG. 44 is a diagram of the message format of a DRCP Announce message.

FIG. 45 is a diagram of the message format of a DRCP Bid message.

FIG. 46 is a diagram of the message format of a DRCP Accept message.

FIG. 47 is a diagram of the message format of a DRCP Registration Request message.

FIG. 48 is a diagram of the message format of a DRCP Registration Acknowledge message.

FIG. 54 is a table showing the number of samples that need to be taken in order to cause the long term average confidence interval range to converge toward zero.

DETAILED DESCRIPTION OF EXEMPLARY EMBODIMENTS

Figure 1:
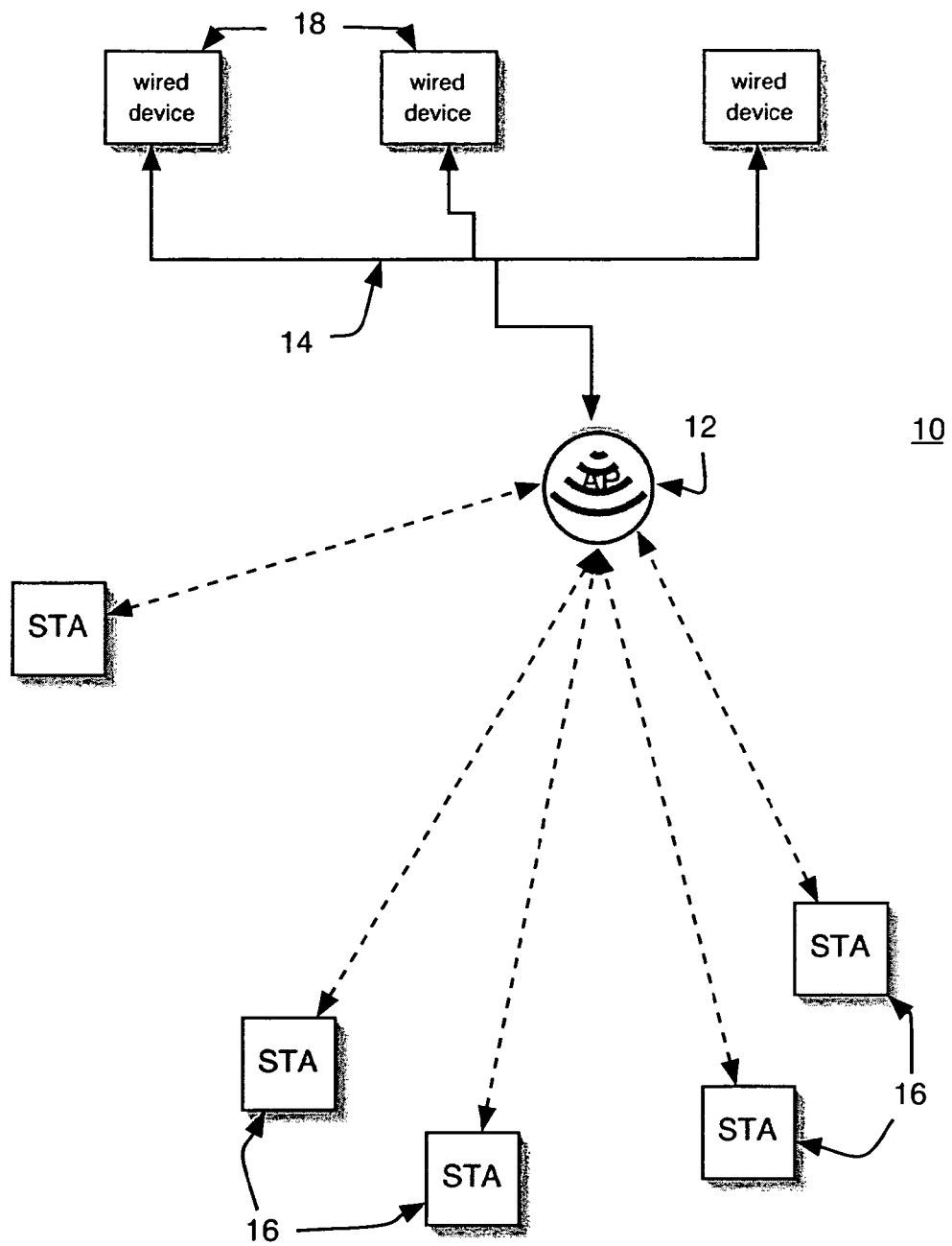
FIG. 1 shows a wireless communications environment in which wireless users interact with other networked devices via an access point (AP).

In accordance with the present invention, a fully automatic control system is provided for wireless communications environments. Referring to FIG. 1, a typical wireless communications environment 10 includes access devices 12 (one shown) that interface between a wired communications medium 14 and wireless devices 16 to provide network access to the wireless devices 16. Wireless devices 16 can thus communicate with wired devices 18 and with each other via the access device 12. These access devices 12 are referred to by various names depending upon the wireless architecture employed, and are herein referred to as "access points" or "APs". The wireless devices 16 also have various architecture dependent names and are herein referred to as "stations" or STAs. A wireless communications capable device may be an AP, or a STA, or both.

Various types of wireless communications environments 10 exist. Wireless communications environments include for example wireless data networks and wireless I/O channels. An example of a wireless data network is described in "IEEE Standard for Information technology—Telecommunications and information exchange between systems—Local and metropolitan area networks—Specific requirements—Part 11: Wireless LAN Medium Access Control (MAC) and Physical Layer (PHY) specifications—Amendment 1: High-speed Physical Layer in the 5 GHz band", incorporated herein by reference (hereinafter "802.11"). Furthermore, various different 802.11 "modes" are defined. For example, in IEEE 802.11 compatible wireless networks, wireless devices may be arranged in an "infrastructure mode", whereby the network is configured such that STAs 16 communicate with other network devices via an AP 12, as shown in FIG. 1. 802.11 compatible devices may also be arranged in "ad-hoc" mode, whereby all the STAs 16 are within transmission range and can communicate directly with each other. Furthermore, wireless "mesh" technologies exist, whereby each wireless device acts as both an AP and a STA. Wireless I/O channels can be used to provide I/O communications, for example, between servers and storage devices via the "Bluetooth" Standard, or between home entertainment audio and video components, or between wireless telephone handsets and base stations. The various aspects of the invention apply to generally to wireless networking architectures, including those used in wide area networks, metropolitan area networks, enterprise networks, and home networks, and wireless I/O channel architectures, as they exist now and as they are developed.

According to aspects of the invention, an arbitrary number of wireless access points (APs) can be placed in arbitrary positions, and all APs and STAs will automatically configure themselves for optimal channel usage, power levels, and STA/AP associations. So, in a wireless networking environment, channel usage is optimized while interference between APs is minimized. Wireless devices such as wireless enabled laptops or hand-held computing devices or Internet protocol telephones, are transparently and seamlessly distributed between APs such that network performance is optimized from the perspective of the user of the wireless device. And, in a wireless I/O channel environment that might be employed for example in a home, audio, video, and other appliances may be moved without performance degradation, and channel usage for each appliance may be optimized so that the appliances do not interfere with each other.

In order to expedite the understanding of the invention, certain examples will be described as they apply to the relatively well known 802.11 wireless LAN architecture, with the understanding that the principles of the invention apply more generally to any wireless communications environment. A preferred implementation of the inventive principles will then be described as embodied in an 802.11 wireless network The following aspects of the invention contribute to its advantages, and each will be described in detail below.
1. AP Initialization: In many wireless communications environments, multiple frequencies ("channels") are available for use by APs. For example, in accordance with 802.11b and 802.11g, 3 non-overlapping channels are available. In accordance with IEEE 802.11a, 13 non-overlapping channels are available. In an environment where multiple APs are employed, it will be seen that it is advantageous for the APs to use different channels to optimize performance and minimize interference. In accordance with the invention, APs perform automatic channel selection. Where multiple APs are distributed in a given area, the APs execute a distributed protocol to pick channels for each AP. APs close to each other use non-overlapping channels.
2. AP Optimization:
   a. Power Adjustment: When the number of APs in a wireless communications environment exceeds the number of non-overlapping channels, APs and STAs adjust their power such that APs and STAs on the same channel can co-exist in an area without interference. For APs using the same channel, APs continually re-adjust their power levels based on environmental factors such as signal strength changes due to movement of doors, people, background noise floor, and the like, so that the users' optimal bandwidth is maintained without undue interference.
   b. Auction: APs keep track of various parameters for STAs that are associated with them, and STAs will roam between APs for load balancing purposes, which can help to maximize performance over a group of STAs.
3. STA initialization: STAs associate with an initial AP. Invention enabled STAs turn on functions that allow them to receive messages from invention enabled APs.
4. STA optimization:
   a. Channel Canvassing: In order to further optimize performance, STAs periodically canvass the other channels in the band in which the STA is operating to see if a "better" AP is present. To ascertain whether another AP is "better", various parameters are considered, such as signal strength and load factors, to be further described.
   b. Bidding: If a better AP is found, a STA enters a bidding process to try to cause the STA to roam to the better AP. Load balancing is thereby achieved. In addition, the bidding process accommodates STA movement by causing the STA to associate to a better AP after it has moved closer to the better AP.
   c. Power Adjustment: STAs perform power adjustment such that they can maintain throughput to and from their currently associated AP while minimizing the interference with nearby wireless devices that may be using the same channel.
   d. Movement Detection: STAs perform movement detection so that the bidding process can be turned off while a STA is moving, and then turned back on when the STA has stopped moving. When turned back on, a "better" AP may turn up and thus the STA will bid for it.
5. Software Architecture
   a. The above functionality is advantageously implemented in APs and STAs in a modular manner for ease of transfer between platforms.
   b. The above functionality is described in detail as it is implemented in a preferred 802.11 network embodiment.
6. Movement Detection statistical analysis: A novel scheme for highly accurate and computationally efficient detection of a change in an attribute subject to high noise variation is described, and applied to detection of the movement of wireless STAs.

Since exemplary examples will refer to the 802.11 networking environment, the following information provides relevant context, while understandably not limiting the invention to 802.11 environments.

In an 802.11 network, APs periodically send frames called "Beacons". STAs listen for Beacons. When an unassociated STA (i.e. a STA that is not yet able to communicate on the wireless network) hears Beacons at what it deems to be a reasonable power level, it can attempt to authenticate with the AP sending the Beacons, and then associate with that AP. Once authenticated and associated, the STA is able to send data frames to other STAs on the wireless network via the AP.

More particularly, APs and STAs send and respond to three different types of frames, known as Class 1 Frames, Class 2 Frames, and Class 3 Frames. Class 1 Frames include control frames and management frames, and can be sent regardless of whether a STA is authenticated and associated with an AP. A Beacon is a type of Class 1 frame. Class 2 Frames are sent only once a STA is authenticated, and include for example association request/response messages. Class 3 Frames can be sent only if associated, and include data frames.

In order to maximize user bandwidth and throughput, the invention automatically optimizes the operation of multiple APs for a given wireless communications environment. In accordance with the exemplary IEEE 802.11a networking standard, 13 non-overlapping frequencies are available for use by the APs. Each AP is capable of transmitting and receiving data at a maximum rate of 54 Mbps. The actual rate at which data is transmitted and received between an AP and a STA depends upon many factors, including the distance between the AP and the STA, the structures located between the AP and the STA, and the environmental interference occurring on the particular frequency. One skilled in the art will realize that the invention is not limited by the maximum data rates of current wireless technology, nor is it limited by currently understood radio frequency attenuation factors. The principles of the invention will continue to be applicable as wireless technology evolves.

Figure 2:
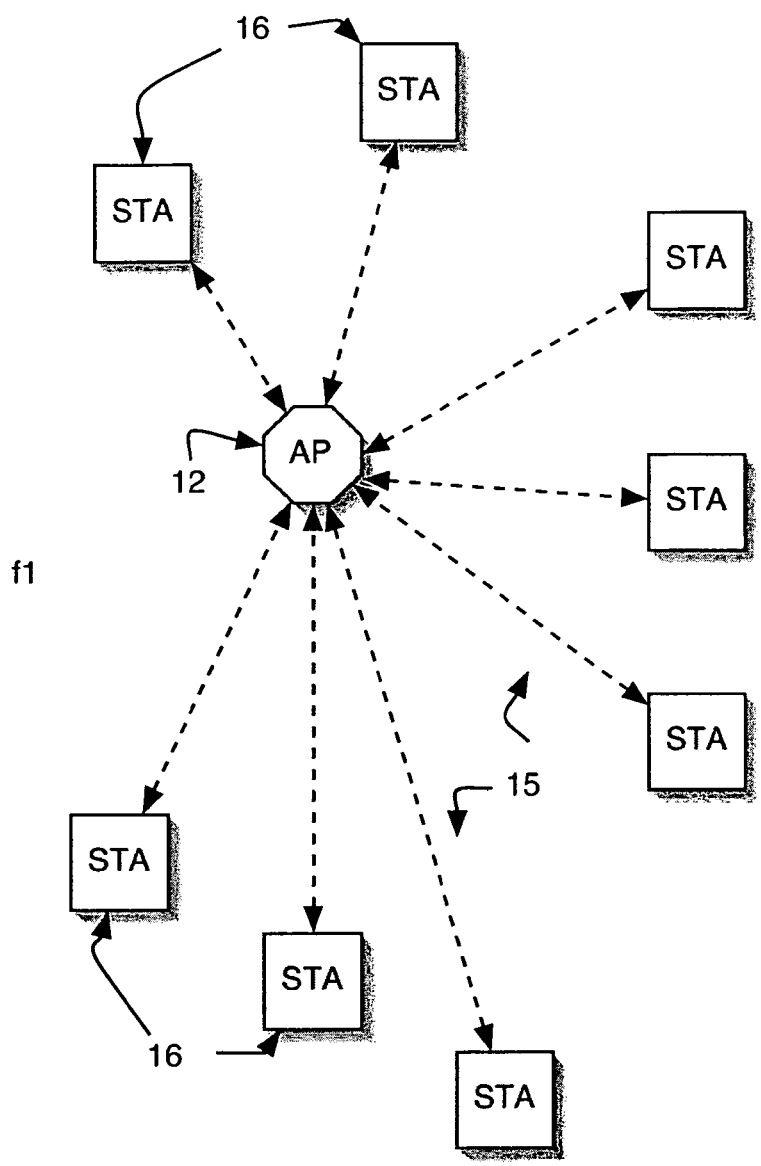
FIG. 2 shows a wireless network in which wireless user devices, or stations (STAs), access the wireless network via an access point and share the available network bandwidth.

Consider an area such as the wireless network shown in FIG. 2, wherein 8 users (shown as STAs 16), which may be mobile laptops, PDAs, and the like, share a space including a single AP 12 operating on one of the 13 available 802.11a frequencies, denoted "f1". The 8 users 16 share the bandwidth provided by the AP 12. If all 8 users 16 are located close enough to the AP such that the AP provides a 54 Mb bit maximum data rate, then all 8 users 16 share the AP's bandwidth such that each user maintains 6.75 Mb throughput on average. (The invention contemplates the fact that data traffic is bursty and that a user in the present example may attain 54 Mb throughput for a short interval, but for purposes of simplicity, the average throughput over time for a given user is discussed.)

Figure 3:
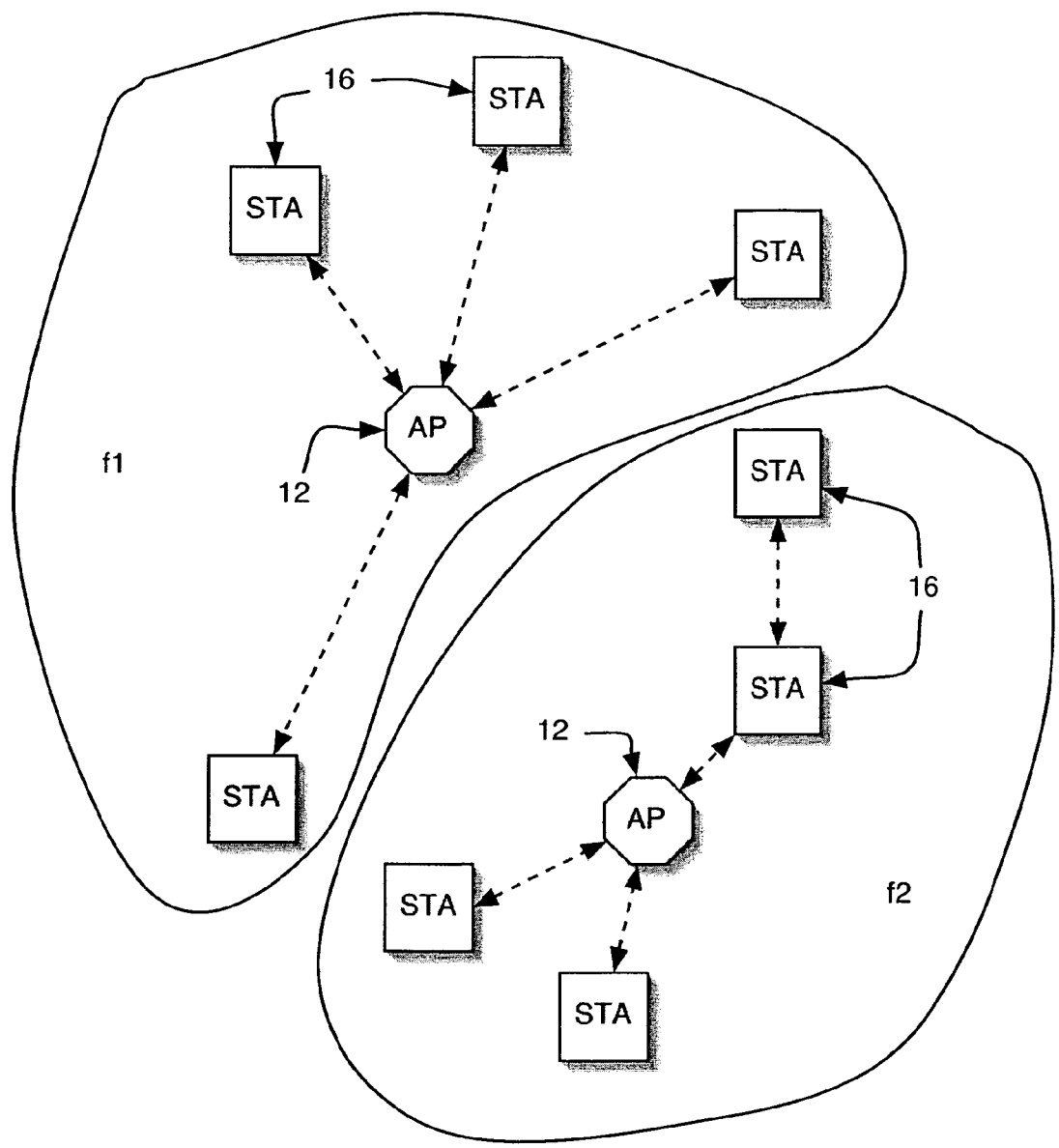
FIG. 3 shows a wireless network wherein the stations access the network via two separate access points.

Now, referring to FIG. 3, a second AP 12 has been added in the area. The second AP 12 operates on a different one of the 13 frequencies, denoted "f2", such that the two APs 12 do not interfere, nor do their associated STAs 16. As shown, 4 of the 8 users have roamed to the second AP 12. Now each user maintains 13.5 Mb throughput on average. Addition of further APs on different frequencies further increases user average throughput.

In accordance with the invention, a Dynamic Radio Control Protocol (DRCP) provides a mechanism for an arbitrary collection of STAs and APs to automatically control the frequency and power of their radios in order to extend the properties exemplified in FIG. 2 to maximize overall system performance. DRCP messages are passed between APs and APs, as well as between APs and STAs to implement this functionality. Eight types of messages are used: DRCP Preclaim, DRCP Claim, DRCP Announce, DRCP Bid, DRCP Accept, DRCP Registration Request, and DRCP Registration Acknowledge.

DRCP Preclaim and Claim messages are exchanged between APs during AP initialization, and are used to aid automatic channel selection in accordance with the invention. DRCP Announce messages are sent by APs and received by STAs during STA optimization. These Announce messages inform invention-enabled STAs of available invention-enabled APs to which they may choose to associate, and provide information about APs that STAs can use to aid a decision as to whether to request to roam to another AP. DRCP Bid messages are sent by STAs to APs during STA optimization. These messages inform invention-enabled APs of invention-enabled STAs that are requesting association to the APs. DRCP Accept messages are sent by APs to STAs in response to DRCP Bid messages. These messages inform a STA that it may associate with the AP it is requesting to associate with. DRCP registration request and acknowledge messages are exchanged by invention-enabled APs and STAs to indicate to each that the other is DRCP capable.

The DRCP protocol employing these messages will first be described as used in a generic wireless communications environment. The detailed implementation of each of these messages will then be further described in terms of a preferred embodiment in an 802.11 environment.

The aspects of the invention are now described as they apply to AP initialization and optimization, and then as they apply to STA initialization and optimization. It is noted that, though many of the inventive aspects described herein with regard to STAs and APs are advantageous when implemented, they are not required to be implemented in a wireless communications environment. Performance advantages are achieved when only the APs, or only the STAs, or both implement one or more of the various aspects of the invention.

1. AP Initialization

During AP initialization, APs perform automatic channel selection. In accordance with the channel selection aspect of the invention, APs located in the same wireless network automatically select channels for operation such that they do not interfere with nearby APs. The invention contemplates that different bands of frequencies are available, for example based on 802.11 version and the country in which the network is deployed. According to a preferred embodiment, APs attempt to select a channel, in each band in which the AP is equipped to operate, which is least likely to interfere with other APs that are already deployed. APs also quarantine channels in accordance with rules associated with regulatory domains (Europe, etc.) so they don't interfere with other wireless applications (radar, etc.). In the event that one AP selects a free channel, and another AP selects the same free channel at the same time (i.e. a channel selection "Collision"), the APs' media access control (MAC) addresses are used as a tie breaker. If the other AP is a standard AP that does not include the improvements associated with the current invention, then the invention-enabled AP will direct its own radio to the "next best" channel. The AP repeats the channel selection phase for each band of frequencies.

Figure 4:
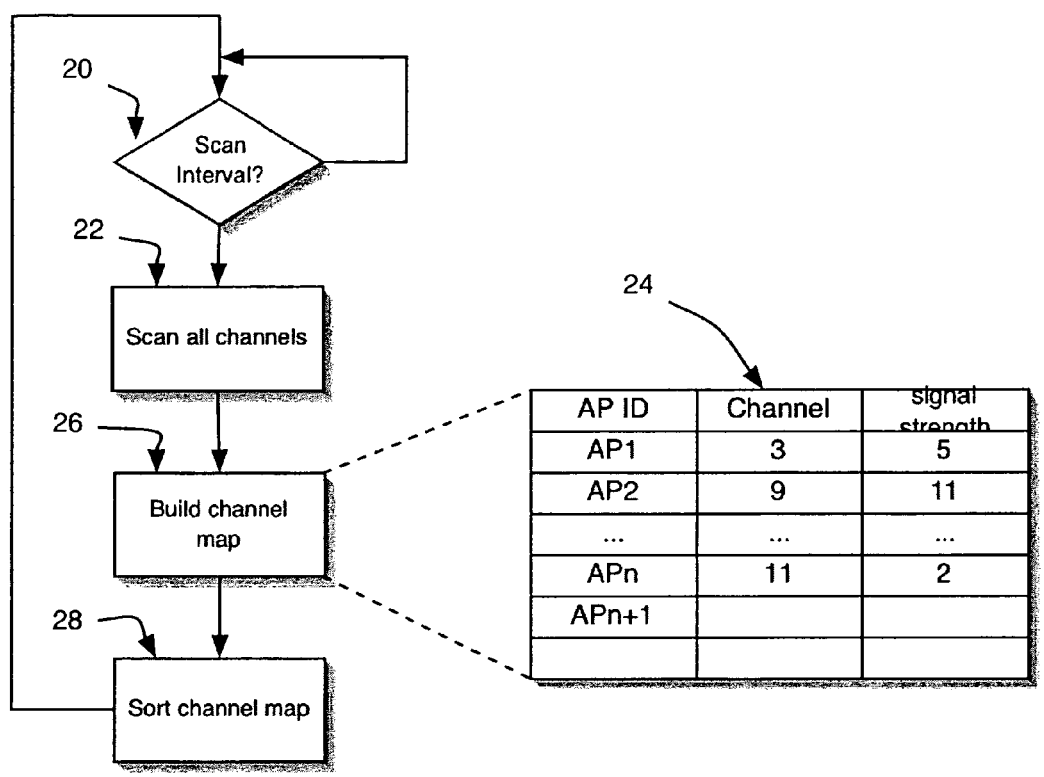
FIG. 4 is a flow diagram representing how an AP builds a channel map for use in an automatic channel selection scheme.

More particularly, referring to FIG. 4, before a newly added AP 12 starts to "Beacon" (i.e. broadcast management packets to other APs and STAs), the AP 12 first examines a list of RF bands supported by the AP 12, and the list of channels supported and not quarantined by the radio which implements the Physical Layer (PHY) for each RF band. The AP 12 then selects a channel in each band according to the following algorithm:

For each band:

Scan Intervals occur periodically. During a Scan Interval (step 20), the AP 12 passively scans all channels which the AP supports within the band (step 22). The AP 12 gathers a list of active APs 12, the channels on which they are operating, and the power at which the beacons from each AP 12 was heard. This information is used to build a table called a channel map 24 (step 26), which contains a list of all APs 12 heard from, the channel on which they were heard, and the signal strength at which they were heard. There is a separate channel map 24 for each band. The AP 12 sorts the channel map to produce a list of APs 12 in ascending order of power level (step 28).

Figure 5:
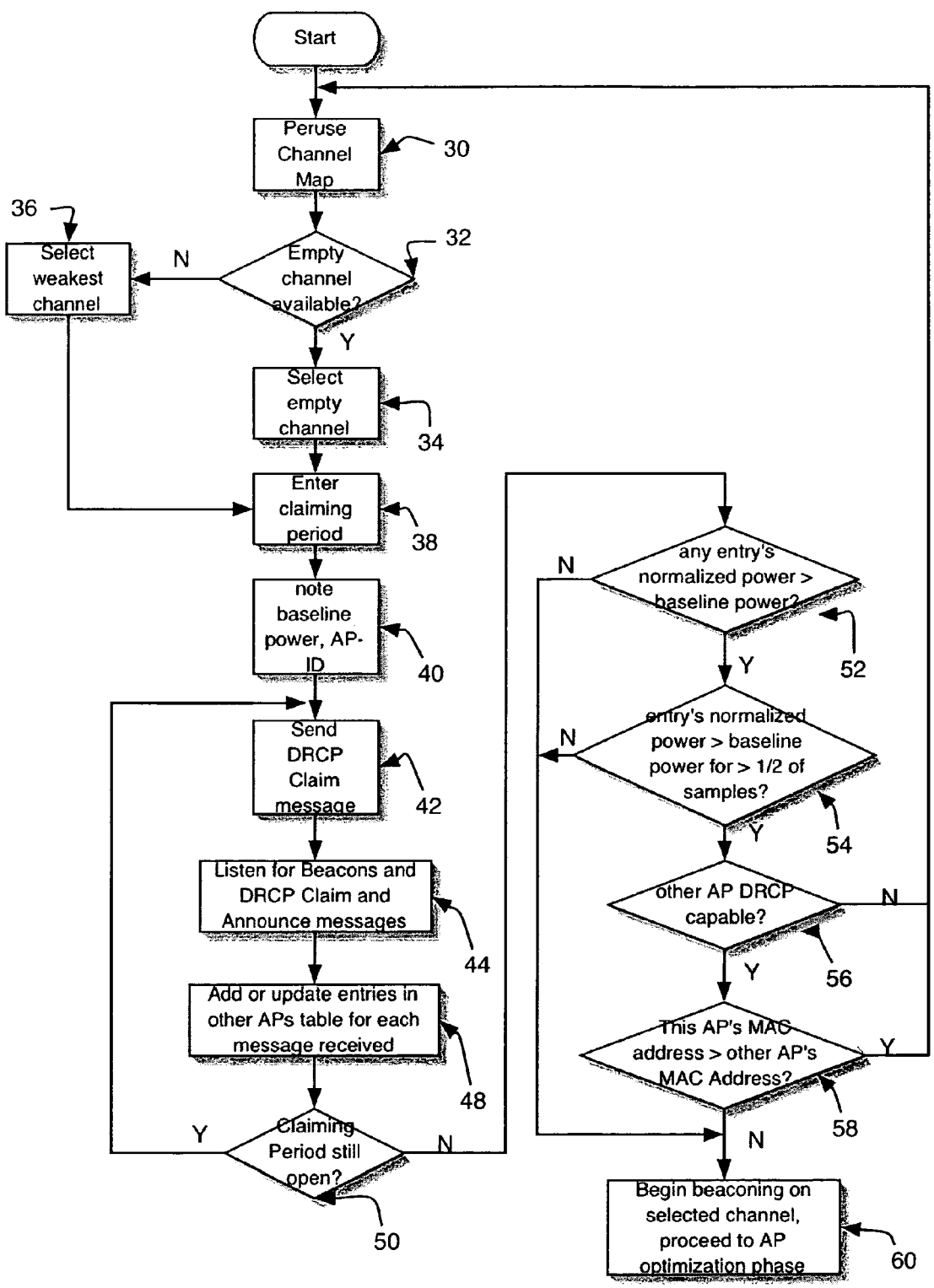
FIG. 5 is a flow diagram representing an automatic channel selection method.

Referring to FIG. 5, a channel is now selected by the AP 12 as follows. First, the AP 12 peruses the channel map (step 30), and if there is a channel on which no AP 12 is operating (i.e. signal strength=0) (step 32), then the AP 12 selects that channel (step 34). Otherwise, the AP 12 peruses the list for the channel transmitting the weakest signal (step 36). The AP 12 now enters a time interval referred to as the "claiming period" (step 38).

If the AP 12 selected a channel having the weakest signal strength, the AP 12 notes the channel-ID of the channel that it has selected, the received power level on the channel, and the AP-ID of the AP that generated that power level (step 40). It will use the power level value as a baseline against which to detect increases in received power on its selected channel. If the AP 12 selected an empty channel, the baseline power level will be the AP's noise floor.

The AP 12 then advertises its intention to use the selected channel by periodically transmitting DRCP Claim messages during the claiming period (step 42). Claim messages are transmitted at full power. During this claiming period, the AP 12 receives all Beacons, DRCP Claim messages, and DRCP Announce messages transmitted on the currently chosen channel (step 44) and uses the information contained therein to build an "Other APs" table 46 (FIG. 6, FIG. 5 step 48). For each Beacon it receives, the AP 12 notes the AP-ID and the received power level in the Other APs table 46. For each Claim or Announce message it receives, the AP 12 notes the AP-ID of the AP that sent the message, the received power level, and the transmit power backoff (TP backoff) in the Other APs table 46. The TP Backoff value indicates how far from maximum power the sending AP's radio has been turned down, and will be explained in more detail in the AP Power Adjustment section. The AP 12 also marks the entry for that AP-ID as being DRCP capable. A normalized received power value is calculated by adding the TP Backoff value to the received power value. The normalized received power value equalizes the AP power levels for comparison purposes. When the AP 12 receives a Beacon or DRCP message from an AP for which it already has an entry, it updates the entry and stores the received power and TP_backoff values as a list.

If another AP 12 starts to radiate significant energy on the selected channel, one of two events must have occurred. The new AP 12 is either not running DRCP, or a conflict has occurred with another DRCP-active AP, where a race condition has caused the other DRCP-active AP to select the same channel at the same time. This is called a Channel Selection Collision (CSC).

At the end of the claim period (step 50), the AP 12 stops sending Claim messages and evaluates the information it has collected, its CSC data, to determine if a CSC has occurred. It looks to see if the received power in any entry is greater than the baseline power level it recorded for the channel (step 52). If so, it looks to see if the received power is exceeded in at least half of the power level values for the entry (step 54). If so, the AP 12 checks to see whether the AP in the entry is DRCP capable (step 56).

If the other AP is not DRCP active, the AP 12 defers to the non-DRCP-active AP and starts the entire channel selection process over again.

If the other AP is DRCP-active, then a CSC is assumed to have occurred. When a CSC has occurred, the MAC address of the other AP is compared to the MAC Address of this AP 12. If the MAC address of this AP 12 is numerically higher than the observed MAC address (step 58), this AP 12 starts the channel selection process over again.

If at the end of the claiming period, the AP has succeeded in claiming the selected channel, it begins running on the channel. The AP starts beaconing, begins sending DRCP Announce messages, and prepares to enter the Optimization stage in order to run its Auction and Power Adjustment functions (step 60).

Figure 7:
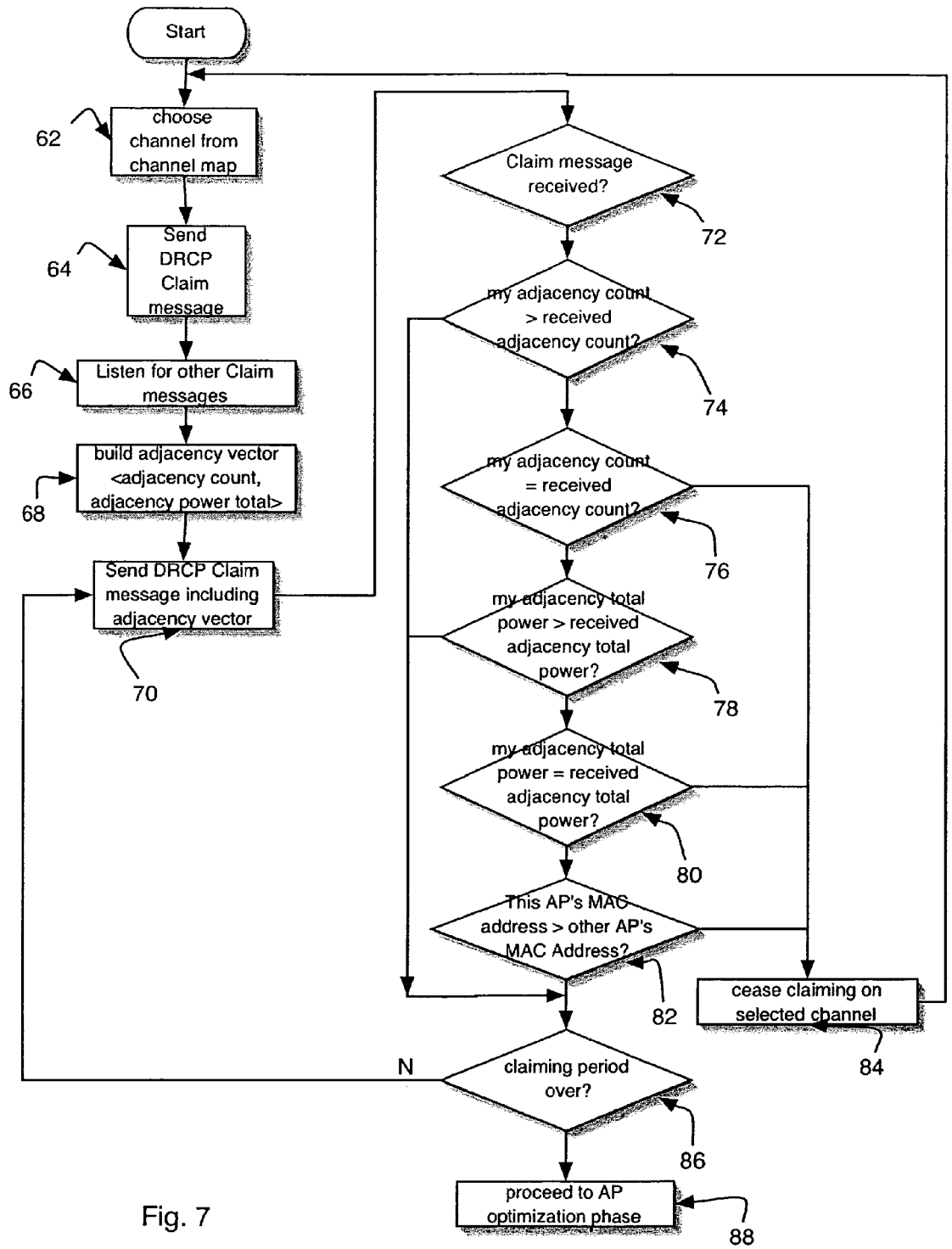
FIG. 7 is a flow diagram representing an alternate automatic channel selection scheme.

A variation on the channel selection process of FIG. 5 can be employed to improve channel selection coverage when several APs 12 are powered on all at once. Referring to FIG. 7, each AP, upon power-up, sends a claim message on a first channel chosen from the channel map—for purposes of example designated channel 1 (steps 62, 64). All APs scan all channels. All APs scanning on channel 1 will hear each other's claim messages. During the claiming period, an AP will ascertain whether channel 1 is in fact available for use by it. Accordingly, the AP listens for other DRCP Claim messages on the same channel, which would indicate that another invention-enabled AP is trying to use the same channel (step 66). The AP 12 keeps track of the number of different APs it hears (based on AP IDs the claim messages received) and the average signal strength of claim messages from each AP. The AP 12 builds an adjacency vector (adjacency count, adjacency power total) (step 68). Adjacency count represents the number of APs heard on the channel. Adjacency power total represents the sum of the average power levels for each AP heard. Each AP sends its adjacency vector to all the other APs in its claim messages step 70. If a DRCP claim message is received (step 72), in this case on channel 1, the AP 12 first compares its adjacency count with the adjacency count received in the claim message (step 74). If the AP 12's adjacency count is higher than that received in the claim message, this probably indicates that the AP 12 is closer to the center of the network. The AP 12 therefore continues to claim the channel during the claim period. If the AP's adjacency count is the same as the adjacency count received in the claim message (step 76), the AP 12 then compares its own adjacency total power to the adjacency total power value received in the claim message. If the AP 12's own adjacency total power is higher than that received in the claim message (step 78), this may also indicate that the AP 12 is closer to the center of the network, and therefore the AP 12 continues to send claim messages on the channel. If the AP 12's own adjacency total power is the same as that received (step 80), then the AP 12 performs the previously described MAC address test step 82). If the AP 12 finds that its own adjacency count or adjacency power are lower than any received in claim messages, or that in the event of a tie on these values that its MAC address is higher, it ceases to send claim messages on the channel and returns to peruse the channel map (step 84). Otherwise, the AP 12 continues to send claim messages including its adjacency vector (step 70). If, at the end of the claiming period (step 86), the AP 12's adjacencies are greater than other AP's adjacencies, the AP 12 has won the channel and proceeds to the AP optimization phase (step 88). According to this method, the APs closest to the center of a multi-AP network obtain the first channel assignments and subsequent channels are assigned to the other APs.

Figure 8A:
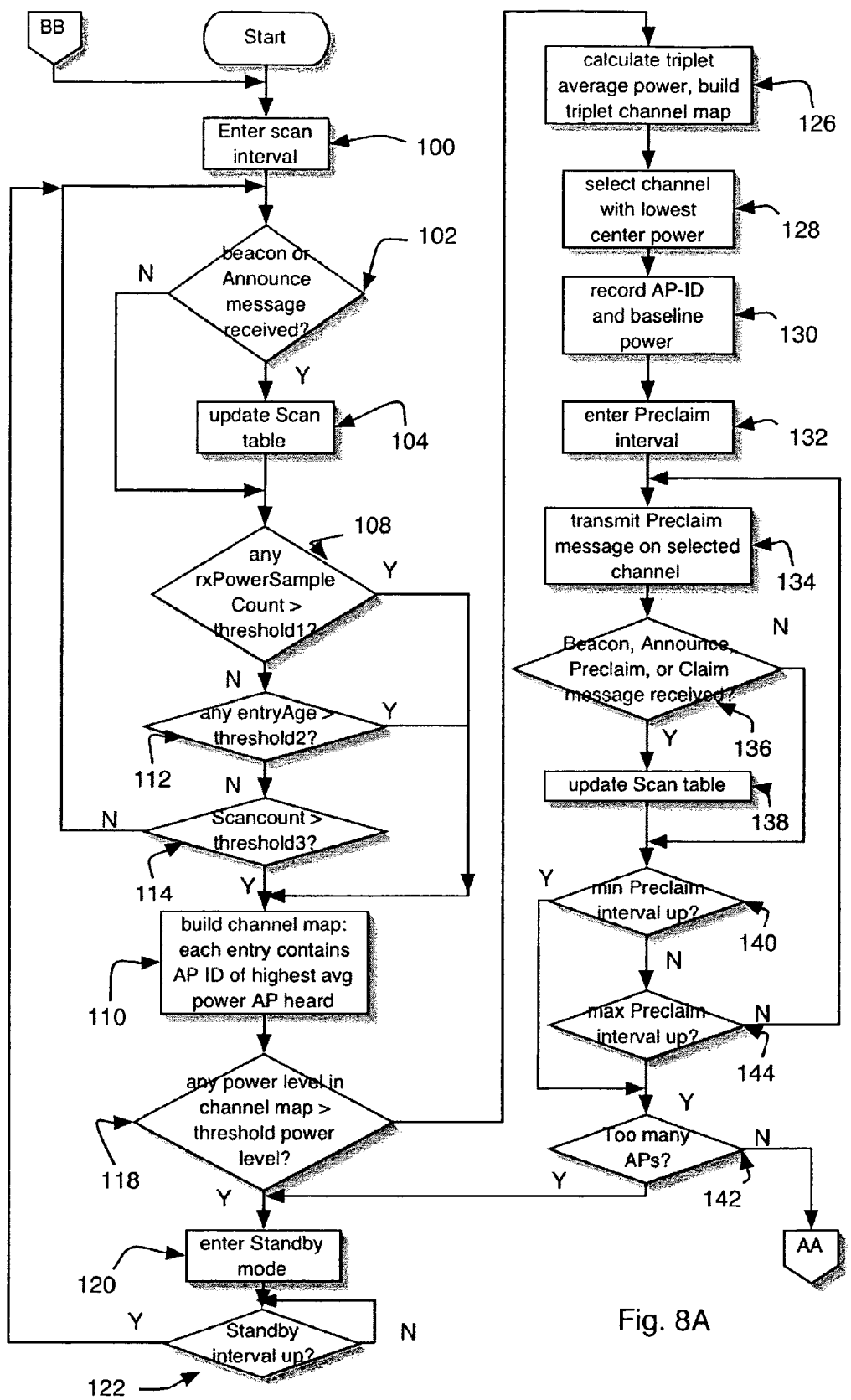
FIGS. 8A and 8B are flow diagrams representing a preferred embodiment of an automatic channel selection scheme.
Figure 8B:
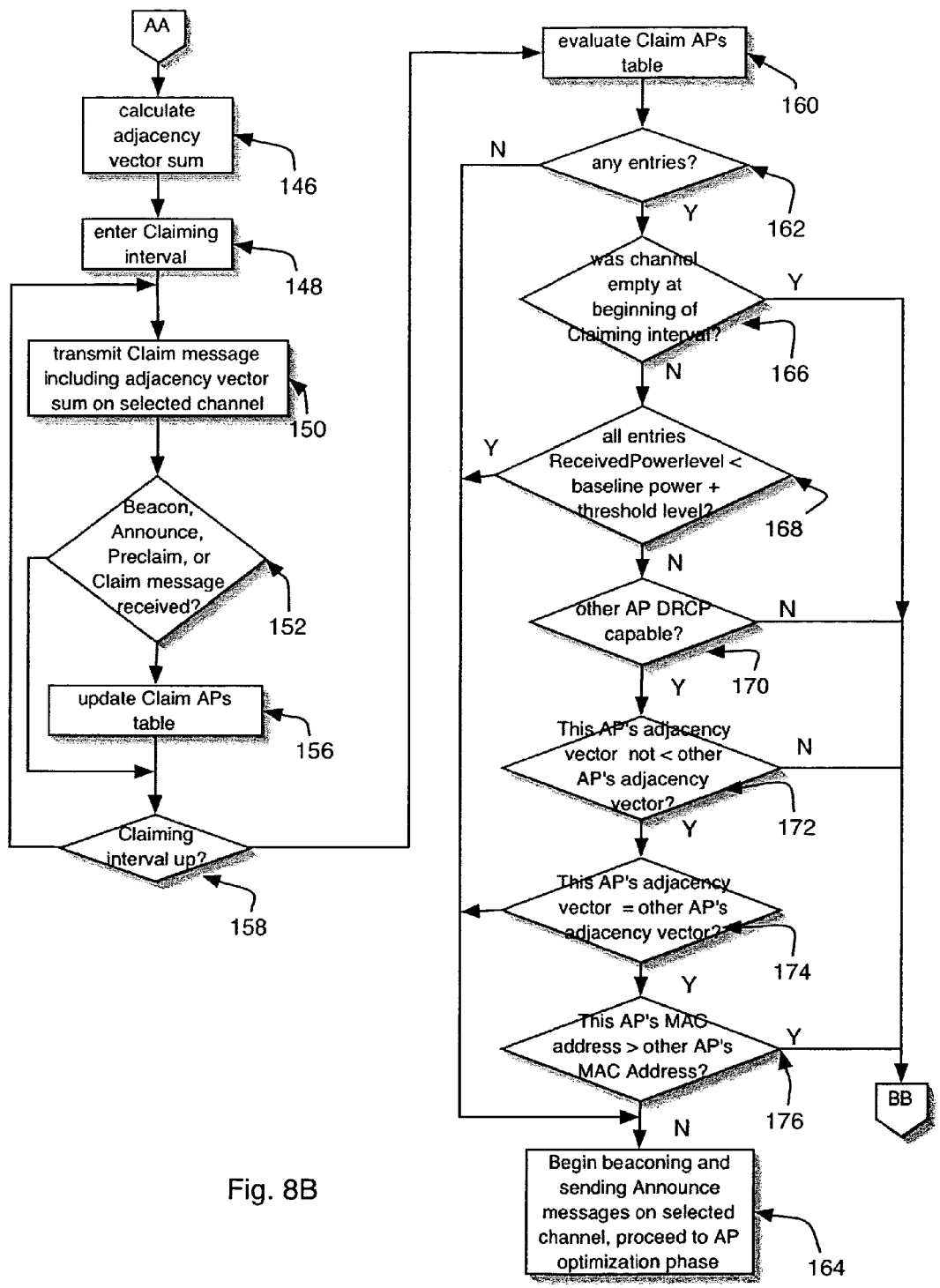
Figure 9:
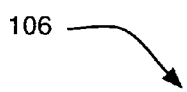
FIG. 9 is a representation of a Scan Table kept by APs for use in the automatic channel selection scheme of FIG. 8.

Referring to FIGS. 8A and 8B, a preferred embodiment of the automatic channel selection algorithm is shown. For each band:

Scan Intervals occur periodically. During a Scan Interval (step 100), the AP 12 scans all channels which the AP supports within the band, receiving Beacons and Announce messages (step 102). The information received in the Beacon and Announce messages is used to build a table called the "Scan table" (step 104). An example of a Scan table 106 is shown in FIG. 9. The Scan table 106 includes an entry for each AP 12 from which a Beacon or Announce message has been received. For each entry, there is stored the AP-ID and the channel on which that AP 12 was heard. Also stored is a "rxPowerRunningTotal" value that represents the sum of the signal strengths of each message received from that AP 12. Also stored is a "rxPowerSampleCount" value that represents the number of messages received from the AP 12. A DRCP flag is set if an Announce message has been received from the AP 12. The entryAge entry is incremented every time the channel is scanned. The "rxPowerAvg" is calculated during a Preclaim interval as will be further described.

As the scan progresses, the rxPowerSampleCount values in the Scan table 106 are monitored, and if any one of them exceeds a threshold, herein labeled "threshold1" (step 108), the AP 12 proceeds to step 110 to build a channel map. In addition, if any entryAge value in the table exceeds a certain threshold "threshold2" (step 112), the AP 12 will proceed to step 110. Also, if the number of scans completed exceeds a certain threshold "threshold3" (step 114), the AP 12 will proceed to step 110. Otherwise the AP 12 continues scanning and updating the Scan table 106.

An example of a preferred channel map 116 is shown in FIG. 10. The channel map 116 contains an entry for each channel ID. To build the channel map, the AP 12 peruses the Scan table 106 and calculates the "rxPowerAvg" value for each entry, as:

$$RxPowerAvg[I] = \text{Scan table}[i].rxPowerRunningTotal / \text{Scan table}[i].rxPowerSamplecount;$$

For each channel, the AP-ID with the highest rxPowerAvg value is entered in the channel map 116. The AP's rxPowerAvg value is entered into the channel map 116 as the highestPwrlevel parameter.

In certain network implementations, it is undesirable to locate two operating APs 12 within a certain distance of each other, because doing so does not increase network performance and may reduce it. So, according to a preferred option, once the channel map has been assembled, the AP 12 checks the channel map to see if any of the highestPwrlevel values in the map exceed a certain threshold power level (step 118). The threshold power level is chosen to indicate that the AP 12 is located too close to another AP. If any highestPwrlevel exceeds the threshold power level, the AP 12 is placed in "Standby mode" (step 120). The AP 12 in Standby mode waits for a period of time herein referred to as "Standby Interval" before returning to start another scan interval (step 122).

If no highestPwrlevel values are found to exceed the threshold power level, the AP proceeds to assemble a triplet channel map 124 (step 126). As shown in FIG. 11, the AP 12 sorts a channel map into triplets, for example, channels 1, 2 and 3, channels 2, 3 and 4, channels 3, 4 and 5, etc. The power heard on each channel in the triplet is averaged into a triplet average. The list of triplets is sorted in ascending order, with the triplet with the lowest average power at the top of the list. The AP 12 starts at the top of the list and looks for the first triplet in which the power heard on the center channel of the triplet is less than or equal to the power heard on the two adjacent channels, and selects this channel (step 128). If no such triplet is available, the AP selects the channel with the lowest triplet average. In the example shown in FIG. 11, AP 12 chooses channel 3. This process advantageously minimizes interference between channels by selecting channels that do not tend to have high power adjacent channel usage.

The AP 12 then records the baseline power for the selected channel as the highestPwrlevel value for the channel, and records the AP-ID of the AP at that power level (step 130). A Preclaim Interval is now entered (step 132). During the Preclaim interval, the AP transmits Preclaim messages on the selected channel (step 134). The AP 12 also receives Beacon, Announce, and Preclaim messages on the channel (step 136). The AP 12 uses the received messages to update the Scan table (step 138). The AP 12 continues to update the Scan table until one of two Preclaim intervals expires. During the min Preclaim interval (step 140), the rxPowerSampleCount value for each AP-ID on the selected channel is checked to see if a minimum sample size threshold has been exceeded. If so, the Preclaiming interval ends and the AP proceeds to check to see whether too many APs are operating on the selected channel (step 142). Otherwise, the Preclaiming period extends until the end of the max Preclaim interval (step 144).

In some network environments, and in particular environments of limited area, the operation of too many APs on the same channel does not increase network performance and may cause a performance reduction. So, according to a preferred option, the AP checks to see if there are too many APs operating on the network (step 142). The number of different AP-IDs present in the Preclaim APs table is used to make this determination. If there are too many APs operating on the selected channel at a power level greater than a defined threshold, the AP 12 enters Standby mode If there are not too many APs operating on the selected channel, the AP 12 calculates an "adjacency vector sum" (step 146). The adjacency vector sum is calculated over all APs on all channels as:

$$\text{Adjacency vector sum} = \text{sum}(\text{Preclaim } APs[i].\text{ReceivedPowerTotal}/\text{Preclaim } APs[i].\text{count})$$

The adjacency vector sum is used as a tiebreaker if necessary during the Claiming interval, to be further described.

The AP 12 now enters the Claiming interval (step 148). During the Claiming interval, the AP 12 transmits Claim messages on the selected channel (step 150). Claim messages include the adjacency vector sum. The AP 12 also receives all Beacon, Announce, and Claim messages on the selected channel (step 152). The AP 12 uses the information contained in the received messages to build a "Claim APs table" 154 (step 156). An example of the Claim APs table is shown in FIG. 12. The Claim APs table 154 contains an entry for each AP-ID. The received power level of each message received from a given AP is stored in the Claim APs table 154 as a list of values (shown as column "ReceivedPowerlevel"). Furthermore, for each Announce or Claim message received, a DRCP flag is set. The AP continues to update the Claim APs table until the end of the Claiming interval (step 158).

The AP 12 then evaluates the Claim APs table 154 (step 160) to ascertain whether any other APs were heard from. If no entries exist in the Claim APs table 154 (step 162), the AP 12 has "won" the selected channel. The AP 12 can then begin Beaconing and sending Announce messages on the channel (step 164). If the Claim APs table 154 includes one or more entries, then if the selected channel was empty at the beginning of the Claiming Interval (step 166), the AP 12 concedes the channel and returns to re-scan (step 100). Otherwise, if the channel was not empty, then if the ReceivedPowerlevel values for all entries in the table are less than the baseline level recorded during Preclaiming plus a threshold level (e.g. 2 db) (step 168), then the AP has won the channel (step 164). However, if the AP does find a ReceivedPowerlevel value that exceeds the baseline power level plus the threshold level, and that entry is associated with an AP-ID that was not the one recorded on the channel during the Preclaiming Interval, then the AP checks the entry's DRCP flag (step 170). If the DRCP flag indicates that the AP-ID associated with the entry is not DRCP capable, then the AP returns back to the scan interval to re-start the channel selection process. If the DRCP flag indicates that the AP-ID associated with the entry is DRCP capable, then the AP compares its adjacency vector with the adjacency vector received in the other AP's claim messages (step 172). If the AP's adjacency vector is less than the other AP's adjacency vector, the AP concedes the channel and returns to re-scan. If the AP's adjacency vector is not less than the other AP's adjacency vector, then the AP checks to see if the adjacency vectors are equal (step 174). If they are, the MAC addresses of the two APs are compared (step 176). If the AP's MAC address is greater than the other AP's MAC address, the AP has "won" the channel (step 164). Otherwise, the AP concedes the channel and returns to re-scan (step 100). One skilled in the art will realize that the MAC address comparison decision is arbitrary and can be made in the opposite manner.

2. AP Optimization

Once an AP is running on a channel, it continuously performs the following functions to optimize its configuration in the wireless LAN:

Radio Power Adjustment. Each DRCP-enabled AP adjusts its power as appropriate, to accommodate the nearest AP operating on its channel while maintaining its connection to its farthest associated STA. The AP conveys a TP_backoff parameter in its Announce messages. The TP_backoff value provides an indication of how far the sending AP has turned its transmit radio down. This TP_backoff value is used by other APs to determine their own TP_backoff values. A STA that is associated to the AP can then adopt the communicated TP_backoff value to adjust its radio power, and can track this value as it changes.

Auction. The AP runs the Auction process to accept new DRCP STAs for association, as appropriate, based on received DRCP Bid messages. These two functions are now described in terms of a preferred embodiment.

2.a. Radio Power Adjustment 2.a.1 AP Maintained Tables

In order to perform Radio Power Adjustment, the AP 12 maintains a number of tables. The tables include information received from other APs and STAs operating on the selected channel. This information is used to ascertain such things as power levels of other devices on the channel, and distances between devices on the channel, in order to control the AP's power level.

2.a.1.1 AP KnownAPs Table

Figure 13:
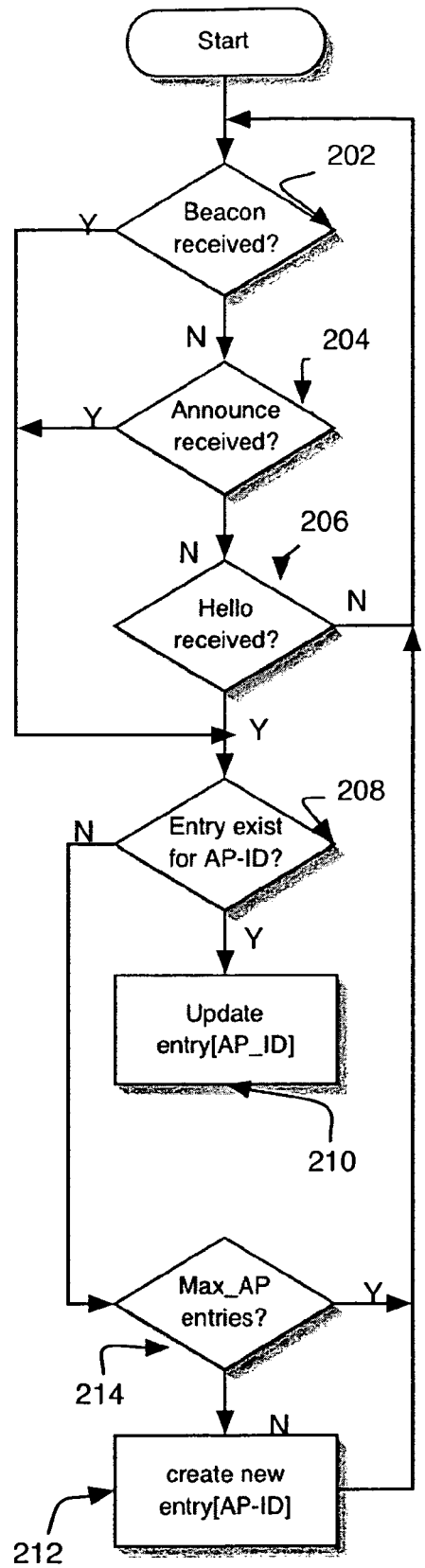
FIG. 13 is a flow diagram showing how an AP builds an AP KnownAPs table.

Each AP 12 maintains a number of tables that it consults to perform power adjustment. One such table is the AP KnownAPs Table 200. As shown in FIG. 13, once initialized on a channel, an AP 12 receives Beacons and DRCP Announce messages from all other APs 12 operating within the range of its radio, on its channel (steps 202, 204, 206). The AP 12 uses these received messages to build the AP KnownAPs table 200. For each message it receives, the AP 12 checks to see if it has an entry in the AP knownAPs table for the AP-ID in the message (step 208). If found, the AP 12 updates the entry (step 210), otherwise it creates a new one (step 212), up to a maximum of Max_APs entries (step 214). The value of Max_AP is design dependent.

Referring to FIG. 14, the AP 12 stores the following fields in the corresponding AP knownAPs table 200 entries:

AP-ID
TP Backoff
Max Power
DRCP capable
Age
Normalized power
Sample size
Corrected power The AP-ID, TP Backoff, and Max Power fields are extracted from each DRCP Announce and Hello message received. The TP Backoff value is stored as a list of values for each message received from each AP-ID. The sample size is the number of TP Backoff values received for each AP-ID.

Since Announce messages are only sent by DRCP-enabled APs, the AP 12 also marks the entry as DRCP-active. APs sending Beacons which contain no DRCP fields are not marked DRCP-active. For each message received, the AP adds the TP Backoff value to the received power level to determine a normalized received power level, as follows:

normalized_power=avg(received_power+*tp*_backoff);

Accounting for the TP backoff in the normalized power level provides a value that is consistent and can be used for comparison with power level measurements from other APs.

Received beacons do not explicitly carry a TP backoff value, however, since beacons are always transmitted at full power they effectively carry a TP backoff value of zero. Thus, the AP 12 can update the AP KnownAPs table 200 based on a received Beacon. In this case the AP 12 stores the TP backoff value as zero, and sets the normalized power and the Max Power to the received power level value.

Additionally, the AP 12 keeps an Age for each entry. The Age is reset to zero, "0", each time a Beacon or DRCP Announce is received from the AP corresponding to the entry. Entries are aged as part of the AP Power Adjustment process.

2.a.1.2 AP AssociatedSTAs Table

Figure 15:
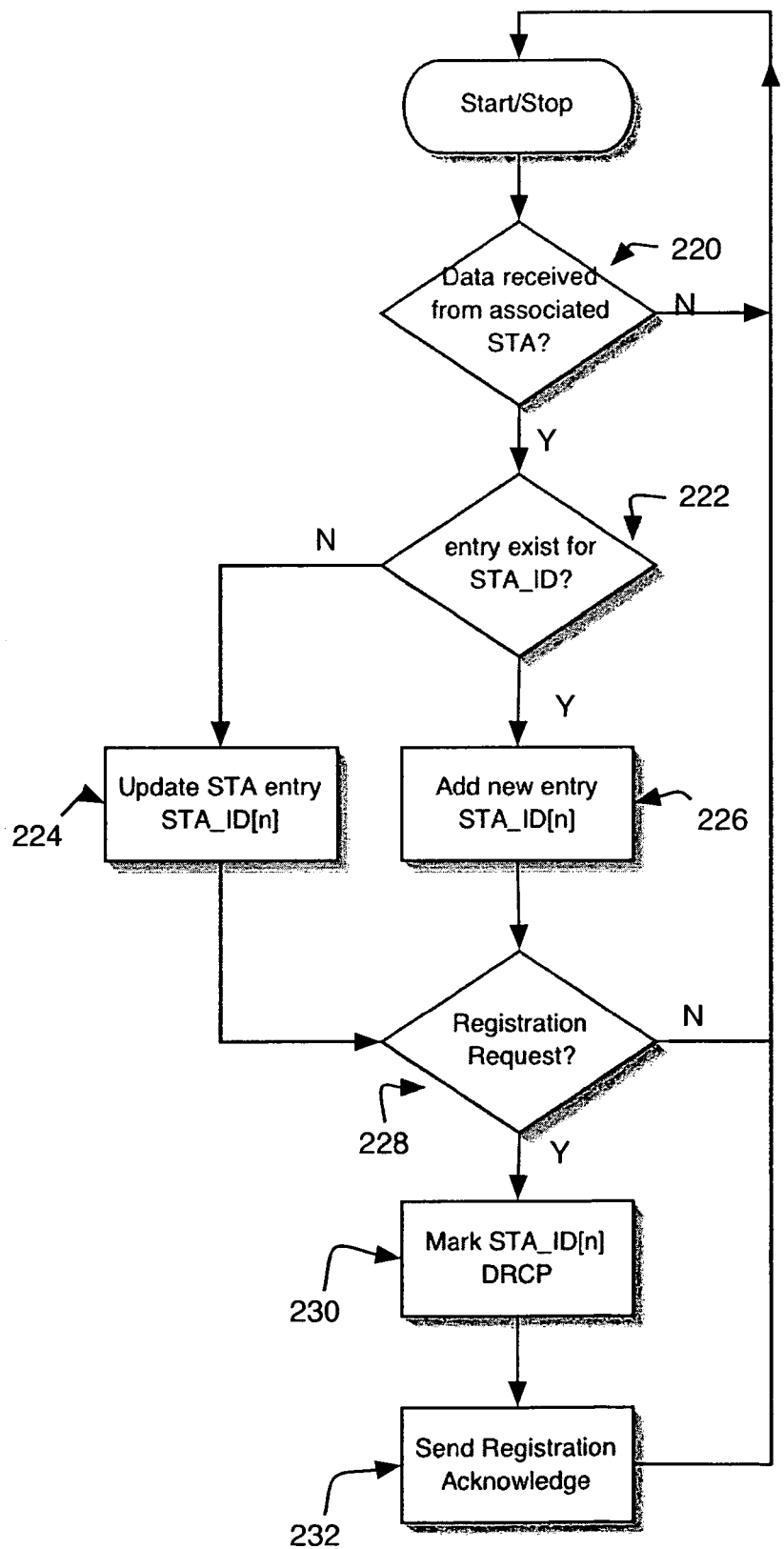
FIG. 15 is a flow diagram representing the process by which an AP builds an AP AssociatedSTA table, for use in load balancing.

APs 12 also continuously maintain a table of the STAs 16 that are associated with it—the AP AssociatedSTA table. Referring to FIG. 15, for every associated STA 16, the AP 12 monitors and collects signal strength information for data packets received (step 220). If an entry for the STA already exists in the AP AssociatedSTAs table (step 222), that entry is updated (step 224). Otherwise a new entry is created for the STA (step 226). The collected data is periodically analyzed by the AP for AP power adjustment purposes. In addition, whenever a DRCP-active STA 16 becomes associated with an AP 12, it sends a Registration Request message to the AP 12. Registration Request messages are sent by the STA 16 to the AP 12 periodically until a Registration Acknowledge message is received by the STA 16. Upon receipt of a Registration Request from an STA 16 (step 228), the AP 12 updates the entry in the AssociatedSTA Table and marks it as a DRCP-active STA (step 230) and sends a Registration Acknowledge message to the STA 16 (step 232).

Figure 16:
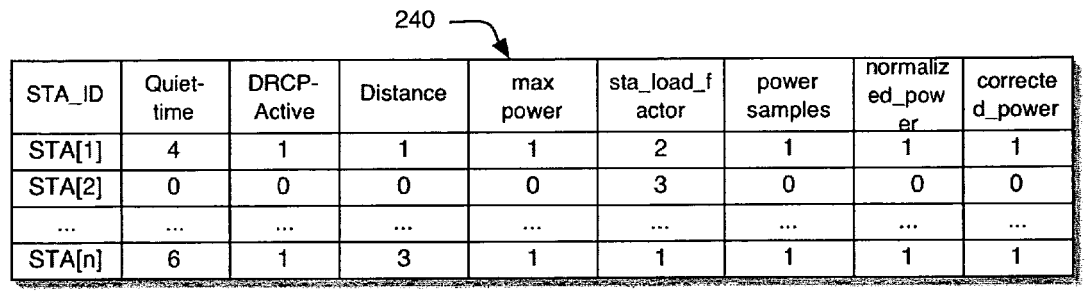
FIG. 16 is an example of an AP AssociatedSTA table.

As shown in FIG. 16, the AP 12's AP AssociatedSTA Table 240 maintains the following information about each STA:

STA-ID—MAC Address of the Station
Quiet-time—A value representative of the amount of time since data was last received from this STA
DRCP-Active—defaults to false, set to true upon receipt of a Registration Request
Distance—Distance (in Banzais, to be further described) to this STA, calculated based on signal strength information and TP Backoff
Max Power—list of power values
Power samples—number of power samples received
Normalized_power
Corrected_power
sta_load_factor—The load of this STA on this AP, see section 4.*c*.

2.a.1.3 AP Power Adjustment

During the channel selection process, the AP 12 transmits at maximum power, that is, it uses a TP backoff value of zero. Once the AP 12 has successfully claimed a channel, it calculates a TP Backoff value and adjust its transmit power for data transmissions down, in accordance with this value to minimize same channel interference and maximize channel coverage. The calculation of the TP Backoff value is now further described.

Figure 17:
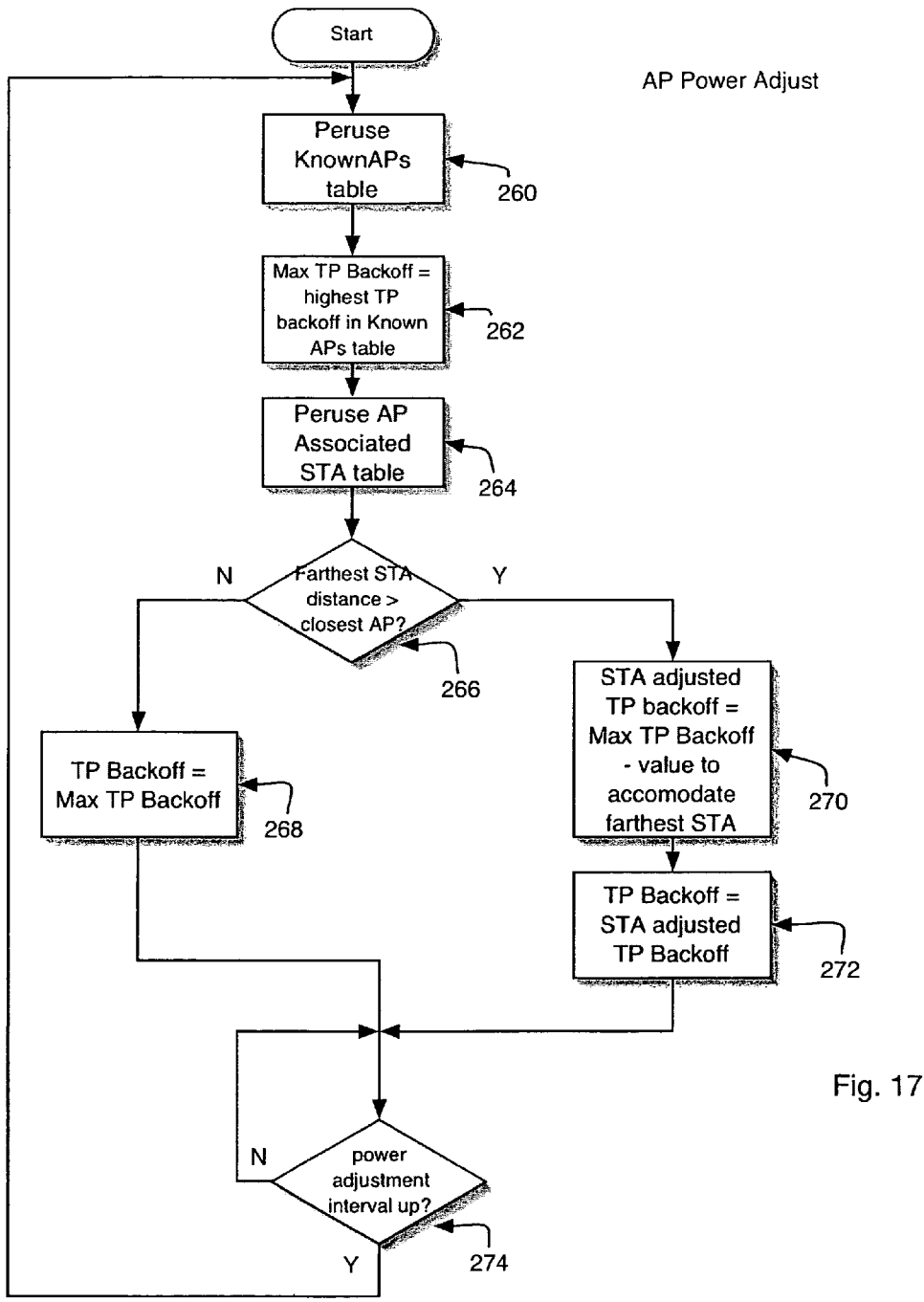
FIG. 17 is a block diagram representing a general mechanism by which an AP adjusts its transmit power backoff.

Generally, with reference to FIG. 17, AP power adjustment is accomplished as follows: The AP 12 peruses its AP KnownAPs table (step 260). The AP 12 finds the AP in the table with the highest TP Backoff value. The AP 12 then sets its own Max TP backoff value to the highest TP Backoff value (step 262). This Max TP Backoff value, if used as the AP 12's TP Backoff value, would reduce the AP 12's transmit power to a level just below the range of the nearest AP operating on the same channel.

Once the Max TP backoff is calculated, the AP then scans the AssociatedSTA table to ascertain the distance to the farthest associated STA 16 (step 264). The distance to the farthest associated STA 16 is compared to the distance to the closest AP 12 operating on the same channel (step 266). If the distance to the farthest associated STA 16 is less than the distance to the closest AP 12, the AP's TP Backoff value is left at Max TP Backoff (step 268). If the distance to the farthest associated STA is greater than the distance to the closest AP operating on the same channel (step 266), then the Max TP backoff value is adjusted back down to accommodate this STA (step 270), and the AP's TP backoff is set to this adjusted value (step 272). This power adjustment is periodically repeated to account for changes in the AP KnownAPs table and the AP AssociatedSTAs tables change (step 274). Power adjustment may be repeated every second, for example, in an 802.11 environment.

Figure 18A:
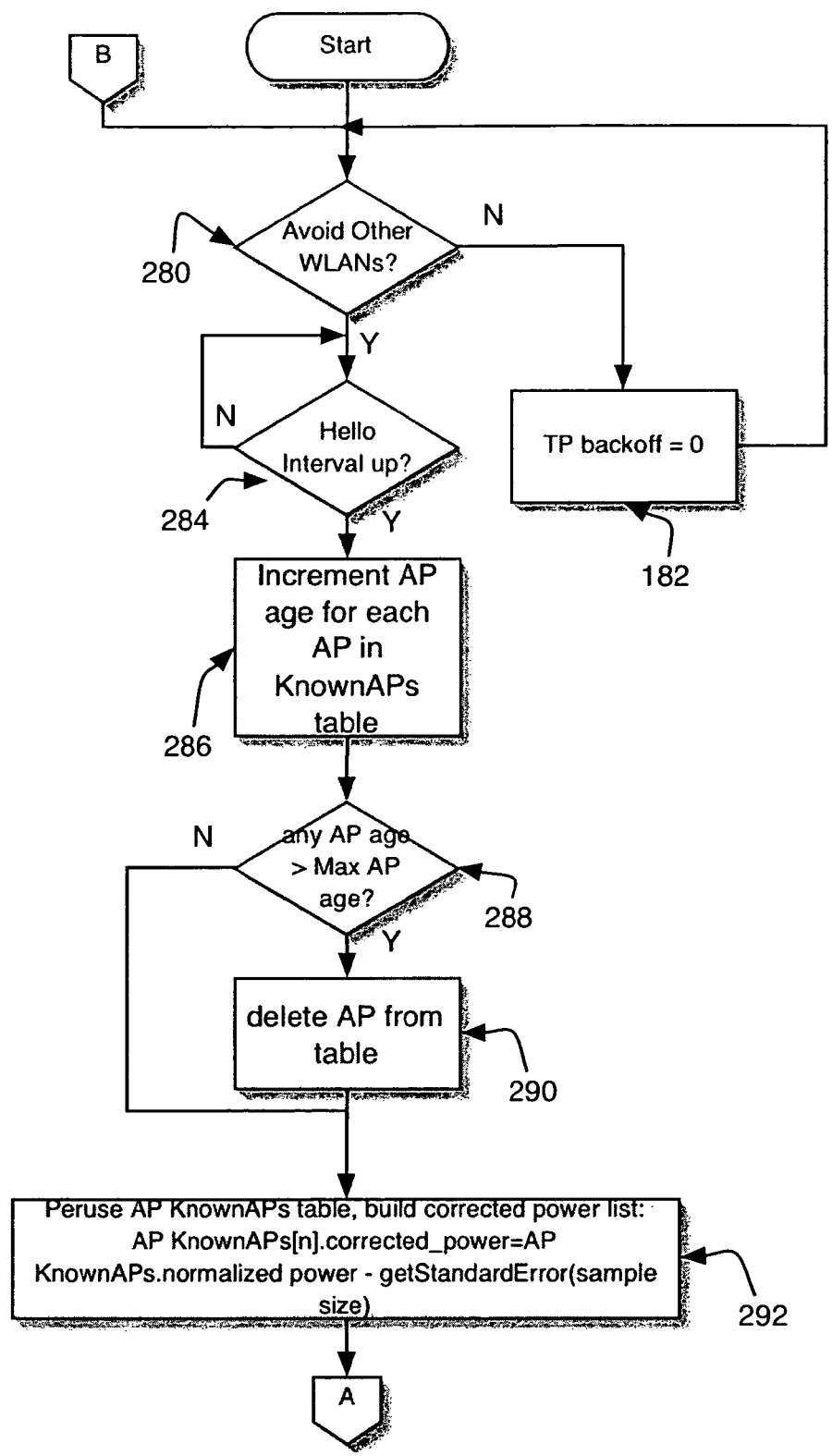
FIGS. 18A and 18B are block diagrams representing a preferred embodiment of the transmit power backoff mechanism of FIG. 13.
Figure 18B:
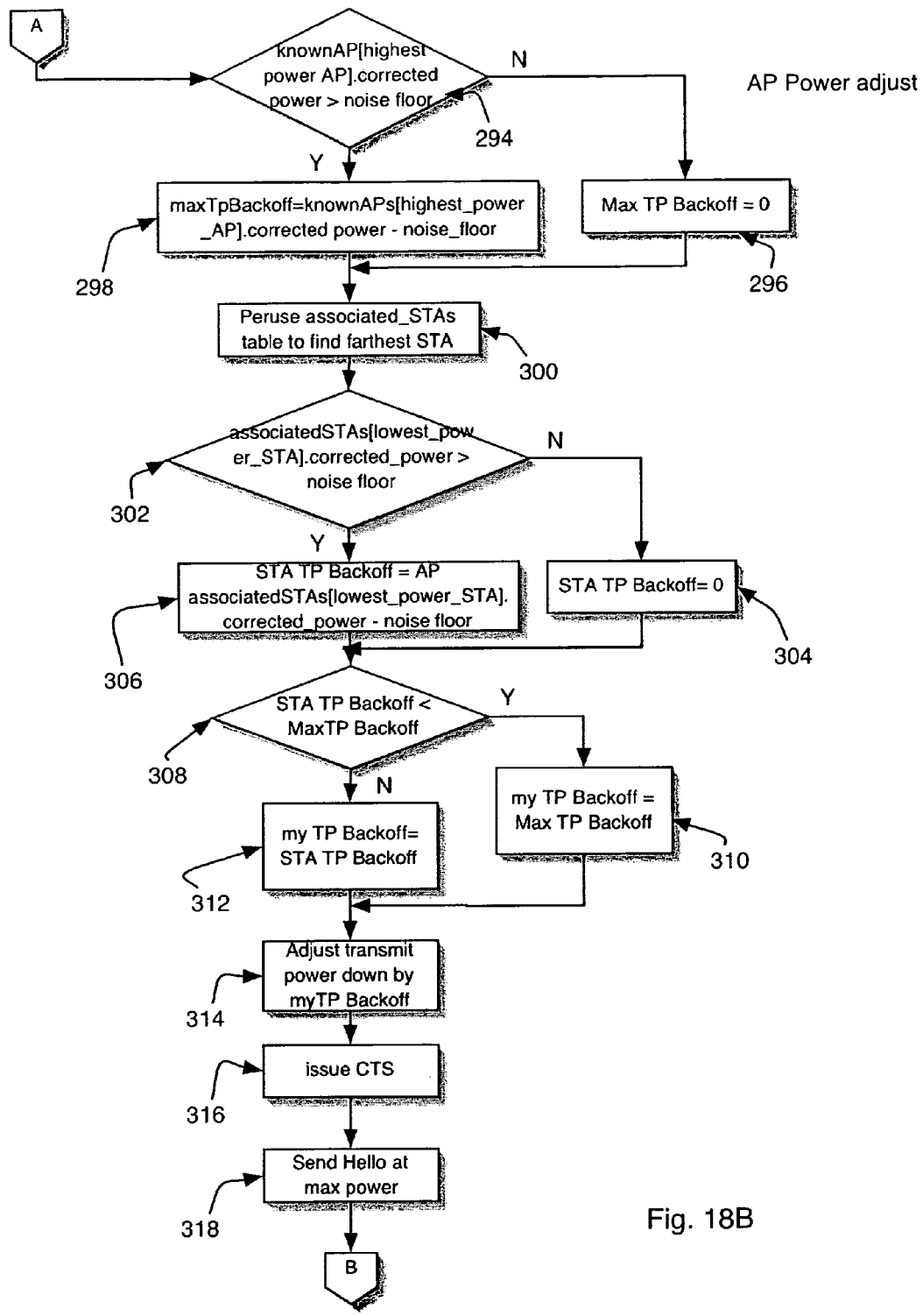

In accordance with the preferred embodiment for use in a wireless data networking environment, as shown in FIGS. 18A and 18B, APs perform the above described power adjustment as follows. First, the AP 12 checks to see if its Avoid Other WLANs flag is set (step 280). The AvoidOtherWLANs flag is a configuration parameter which can affect Power Adjustment. In many wireless networking architectures, it is possible for several APs to occupy the same channel while serving different physical networks. For example, in the 802.11 architecture, several APs can serve different ESSs. The AvoidOther WLANs flag is false by default. When set to false, the AP 12 will ignore any other APs on the same channel who's physical network is different from this AP 12's physical network (e.g. ESS ID). This option is useful for cases when there are multiple APs in relatively close proximity that are on different networks. In this case, the operator may prefer to run his AP at the maximum power level to provide the best possible signal for all stations on his network.

If the Avoid Other WLANs flag is not set, the AP 12 sets its TP Backoff to 0 (step 282). The AP 12 will therefore transmit at full power as long as the Avoid Other WLANs flag is not set. If the Avoid Other WLANs flag is set, the AP proceeds with the power adjustment process and will not interfere with other APs even if they are operating on a different network.

The AP 12 processes the information in the AP KnownAPs table every Hello Interval (step 284), to perform power adjustment. The Hello Interval is architecturally and design dependent. In an 802.11 environment, the Hello Interval may be for example the 100 ms beacon interval. The knownAPs table entries are first aged before other processing is performed. The age of each entry is incremented (step 286), and any entries whose age exceeds Max AP Entry Age are deleted (steps 288, 290). Thus, if an AP hasn't been heard from in a while, it is aged out of the table to prevent it from affecting this AP 12's power adjustment calculations.

As previously described, the normalized power field of an entry, "n", of the AP KnownAPs table is determined by averaging over several received power measurement samples. The greater the number of samples used to derive the value, the more accurate the measurement. The AP accounts for the inaccuracy in this value by subtracting a standard error, based on the sample size, from the normalized power level, as shown in the following formula. Note, in an 802.11 environment, the normalized power level is expected be a negative number, ranging in value from −25 to −90 dBm.

*AP knownAPs[n].corrected_power=AP knownAPs[n] .normalized_power−getStandardError(sample_size);*

In this formula, the function "getStandardError" would return the standard error for the sample size of "sample_size" in each entry "n". For example, table I in FIG. 19 shows the standard error values for a number of sample sizes for RF signal measurements. This formula is applied to each entry "n" in the AP KnownAPs table to calculate the corrected_power values for each entry (step 292).

The AP KnownAPs table is then scanned for the entry corresponding to the AP which was heard at the highest corrected_power level. This corrected_power level is compared to the AP 12's noise floor (step 294). (The AP's noise floor is a measure of background power on the channel.) If the AP 12 finds that the highest corrected_power level is less than the AP 12's noise floor, then the AP 12 may transmit at maximum power without interfering with the other APs on the channel. It therefore leaves its Max TP Backoff value at 0 (step 296). If the AP 12, however, finds that the highest corrected_power level is higher than the AP 12's noise floor, it needs to set a TP Backoff to avoid interfering with that AP. In this case the AP 12 calculates Max TP Backoff by subtracting its noise floor from the corrected_power associated with that AP (step 298).

Once it has calculated Max TP Backoff, the AP 12 must then determine if there are any associated STAs 16 that are farther away (ie who's signal strength is weaker than) the highest_power_AP. The AP 12's AssociatedSTAs table is analyzed to find the STA 16 that is the greatest distance from the AP (step 300). The normalized_power and sample size values for this STA are used to calculate a corrected_power value for this STA as previously described. The lowest power STA's corrected_power level is compared to the AP 12's noise floor (step 302). If the corrected_power level is less than the noise floor, then the AP 12 needs to run at full power to cover the STA, so the AP TP Backoff value is set to 0 (step 304). If the corrected_power level is greater than the AP 12's noise floor, then the STA TP Backoff value is set to the corrected_power level minus the noise floor (step 306).

Next, Max TP Backoff is compared to STA TP Backoff (step 308). The AP's TP Backoff ("my TP Backoff") is set to the lower of the two backoff values to avoid interference with the closest AP while ensuring coverage for the farthest STA. So, If STA TP Backoff is less than Max TP Backoff, then my TP Backoff is set to the Max TP Backoff value (step 310). If STA TP Backoff is greater than Max TP Backoff then the my TP Backoff value is set to the STA TP Backoff value (step 312).

The AP 12 then adjusts its transmit power by the value of my TP Backoff (step 314), and uses my TP Backoff as the value of TP Backoff in its Announce messages. According to the preferred embodiment, the AP will transmit data at a power level adjusted by TP Backoff, but will transmit DRCP management messages (e.g. Claim, Announce, Accept) at full power. So, APs can always hear management messages passed between each other.

Furthermore, various different wireless networking architectures may provide a mechanism for clearing the wireless channel, further increasing the probability that the management messages will be received. For example, in the 802.11 architecture, the AP issues a Clear to Send (CTS) message to clear the channel (step 316), and then sends a DRCP Announce message at maximum power (step 318). After sending the Announce message at maximum power level, the AP resumes use of its calculated TP backoff value for data packets to minimize same-channel interference, as described above.

2.a.1.3.i AP Power Adjustment During Station Movement

When a STA 16 is associated with an AP 12, the AP 12 keeps track of the distance between the STA 16 and the AP 12. If the AP 12 is using a non-zero TP Backoff value, and the AP 12 ascertains that the STA 16 is moving out of range of the AP 12 at backed off power, then the AP 12 can adjust its TP Backoff value to accommodate the STA 16's movement.

The distance between an AP 12 and an associated STA 16 is calculated and stored in the AssociatedSTAs table in units of "Banzais". The Banzai is a unit of distance derived from a measurement of received signal strength from an AP 12 operating with a known transmit power backoff. In an 802.11 environment, for example, a received signal strength measurement is generally expected to range in value from −25 dBm to −90 dBm, but depending upon possible antenna gain at the high end or sensitivity at the low end, may range from 0 dBm down to −100 dBm. A transmit power backoff is generally expected to range in value from 0 dB to 65 dB. Given a received signal strength measurement of "received_ power" and transmit power backoff of "TP Backoff" from an AP, the distance to that AP in Banzais is calculated as follows:

$$\text{distance\_in\_banzais} = ABS[\text{MIN}[0, (\text{received\_power} + tp\text{backoff})]]$$

Algorithms for movement detection are described in more detail later. For purposes of AP power adjustment, as previously described, the AP 12 collects multiple samples of received_power and TP Backoff values for each STA 16 over time, and the distance between the AP and the STA is calculated over all these samples. The AP 12 detects movement by continuously checking to see if the difference between the distance to each station, derived from a set of long term samples, is sufficiently smaller that the current distance measurement based on the most recently collected samples, to indicate that the STA 16 is moving away from its AP 12.

If the AP 12 detects that the STA 16 is moving away and the STA 16 is within a given Short Term Standard Error Banzais of the current edge of the transmit signal (based on the current TP Backoff), then the AP 12 switches to a TP Backoff of 0 until it no longer has any moving STAs associated with it.

Figure 20:
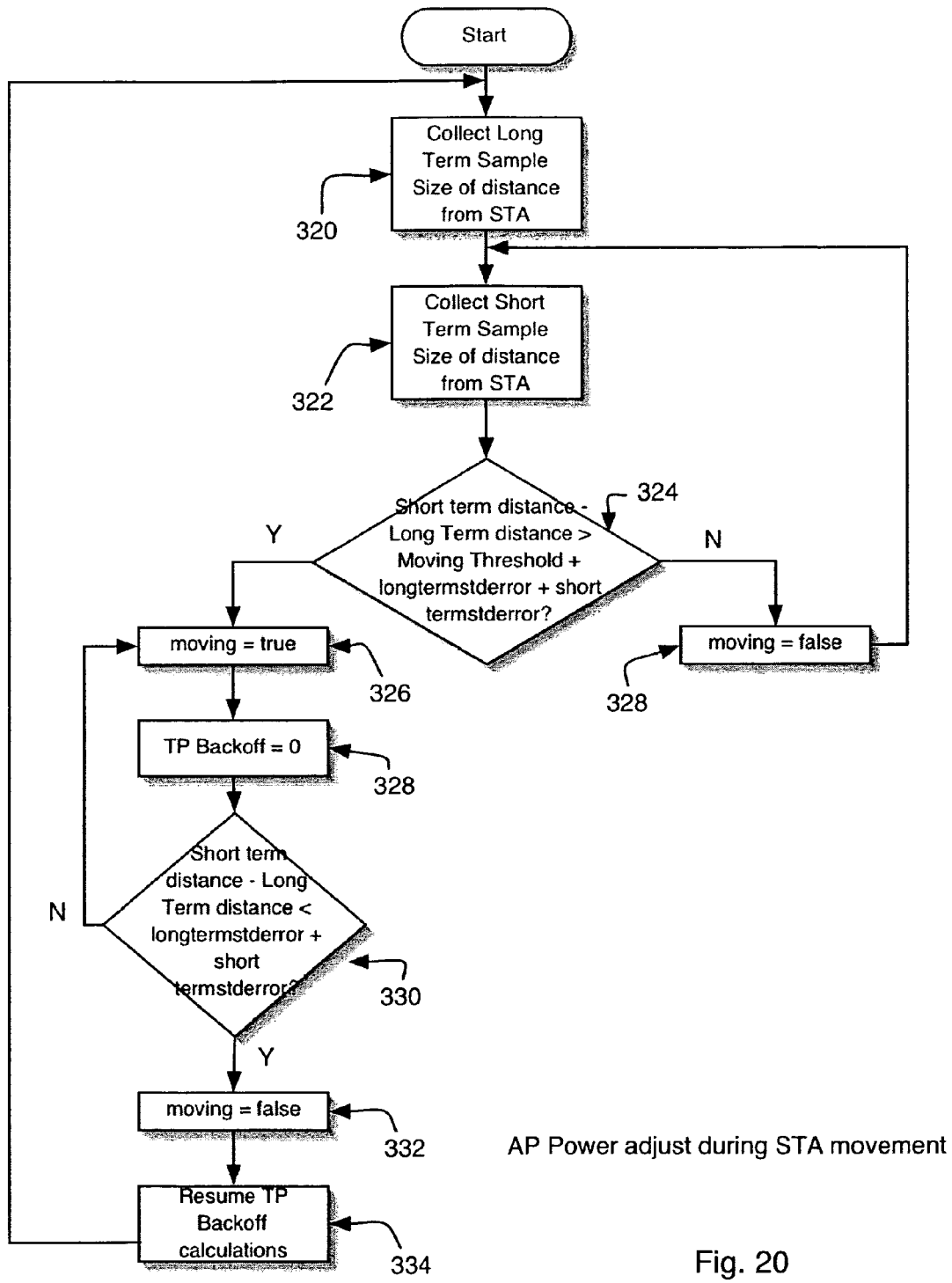
FIG. 20 is a flow diagram representing the process by which an AP adjusts its transmit power backoff during STA movement.

More particularly, referring to FIG. 20, to detect STA movement, the AP 12 collects a long term samples of distance values for a STA 16 (step 320), and then continuously collects short term sample size distance values for the STA 16 (step 322). The difference between the long term distance and short term distance values is compared to a Moving Threshold value plus the standard error in the two distance measurements in order to eliminate false movement detection. (See section 6 for more information.) A station is considered to be moving when the short term distance exceeds the long term distance by more than the Moving Threshold plus the sum of the errors in the two measurements. The following pseudo code describes this comparison.

```
IF ((AssociatedSTAs[n].short_term_distance −
    AssociatedSTAs[n].distance) > (movingThreshold +
    longTermStdError + shortTermStdError)) (step 324)
THEN
    moving = TRUE (step 326)
ELSE moving = FALSE; (step 328)
```

If the AP 12 detects that the STA 16 is moving, the AP 12 sets its TP Backoff to 0 so that it transmits data at maximum power (step 328). The AP 12 remains at maximum power until it detects that the STA 16 is no longer moving, or quiet. If the AP 12 determines that it is no longer moving before the STA 16 loses the association to its AP, the AP 12 resumes normal processing of received signal strength to determine a new appropriate TP Backoff value as previously described (step 334).

Once the AP 12 detects that the STA 16 is moving, it begins using another test to detect when the STA 16 has stopped moving. To detect that the STA 16 has stopped moving, the AP 12 compares the distance to the STA 16, derived using the Long Term Sample Size, to the distance derived from the most recent Short Term Sample Size samples. The AP 12 looks to see when this difference is less than just the standard error in the two measurements to determine that the STA 16 has stopped moving. This test is performed as follows (step 330):

```
IF ((AssociatedSTAs[n].short_term_distance −
    AssociatedSTAs[myAP].distance) < (longTermStdError +
    shortTermStdError)) THEN
    moving = FALSE; (step 332)
```

2.b AP Auction

The purpose of the Auction is to accomplish the distribution of STAs 16 across APs 12 in a manner that optimizes wireless communications performance. The goal is to have STAs 16 associate to their nearest AP 12 while taking loading (the sum of the individual loads of the STAs 16 already associated to the AP 12) into account. This allows the RF footprints of the APs 12 and STAs 16 to be minimized, while ensuring that no AP 12 is overloaded.

STAs 16 learn of available APs 12 through the Announce messages transmitted by the APs 12. As will be further described with regard to STA optimization, a STA 16 calculates a "biased distance" to each AP 12 it hears from, including its own AP, using the received power and loading information from the Announce messages. A STA 16 will send a Bid message to an AP that is "better" than the STA's current AP, where better means that the AP has a lower biased distance. The Bid message contains the value of the difference between the biased distance from the STA 16 to the destination AP 12 and the biased distance to the STA 16's current AP. This value is called the biased distance delta.

Figure 21:
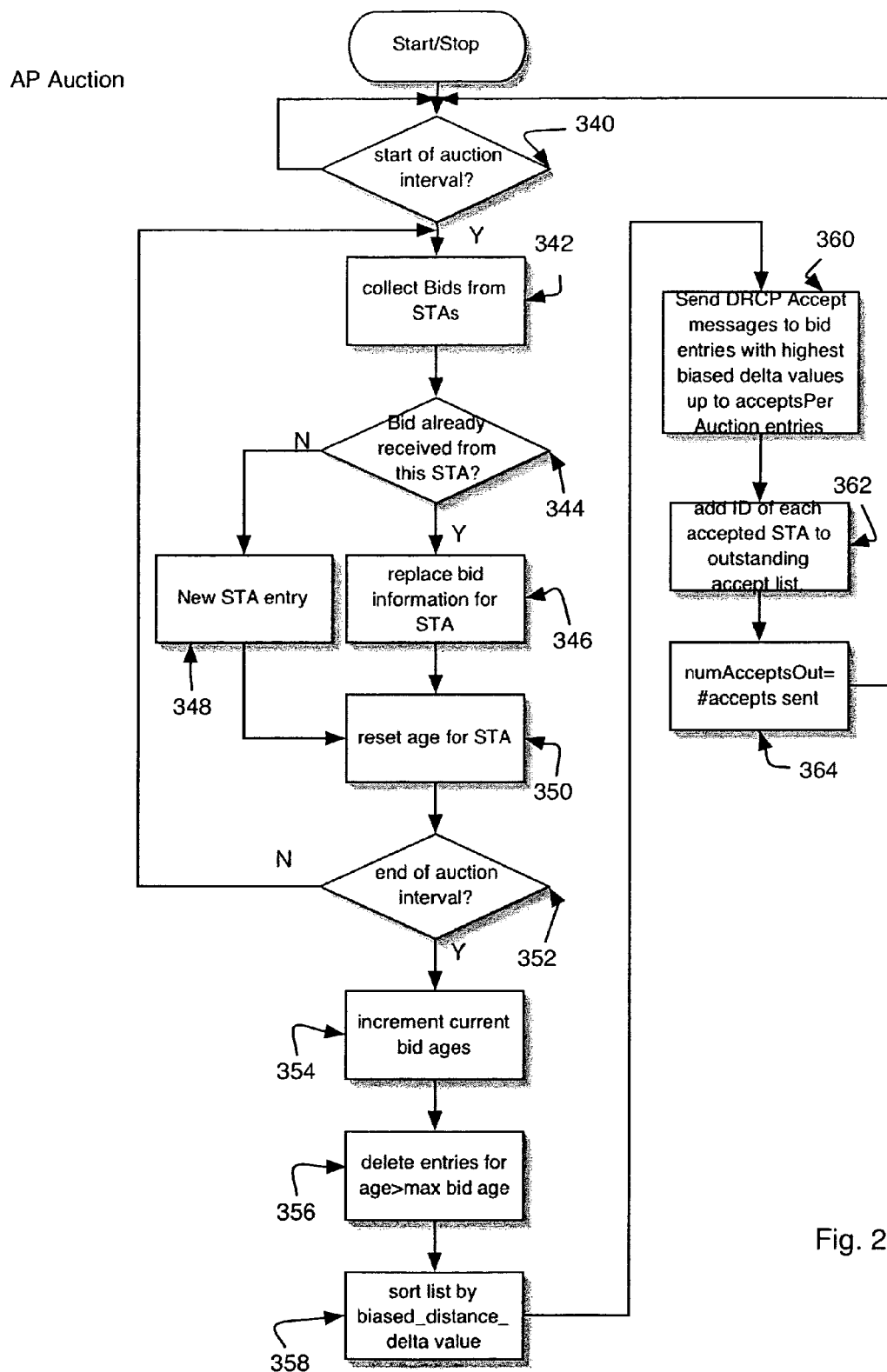
FIG. 21 is a flow diagram representing an AP auction process, used for load balancing of STAs across APs.

In particular, referring to FIG. 21, the AP 12 collects any received Bids over a period of Auction Interval (steps 340, 342). If a Bid is received from a STA 16 from which a Bid has already been received (step 344), the new bid information replaces the previous bid information (step 346). Otherwise a new entry is created for the STA 16 (step 348). In either case the bid entry's age is reset (step 350).

At the end of Auction Interval (step 352), the AP 12 processes the received bid information. (The Auction Interval in an exemplary 802.11 environment may be on the order of, for example, 7.5 seconds.) The age of all bid entries is incremented by one (step 354) and then any bid entry whose age is greater than Max Bid Age is deleted (step 356). The list is then sorted by biased_distance_delta value (step 358).

The AP 12 selects the bid entries with the highest biased distance delta values, up to acceptsPerAuction entries, and sends a DRCP Accept message to each of the STAs 16 corresponding to those entries (step 360). The IDs of each STA 16 being sent an Accept is put in a list of outstanding accepts (step 362), and a count of accepted STAs who have not yet associated and registered is noted as numAcceptsOut (step 364). At this point the next auction period begins.

Figure 22:
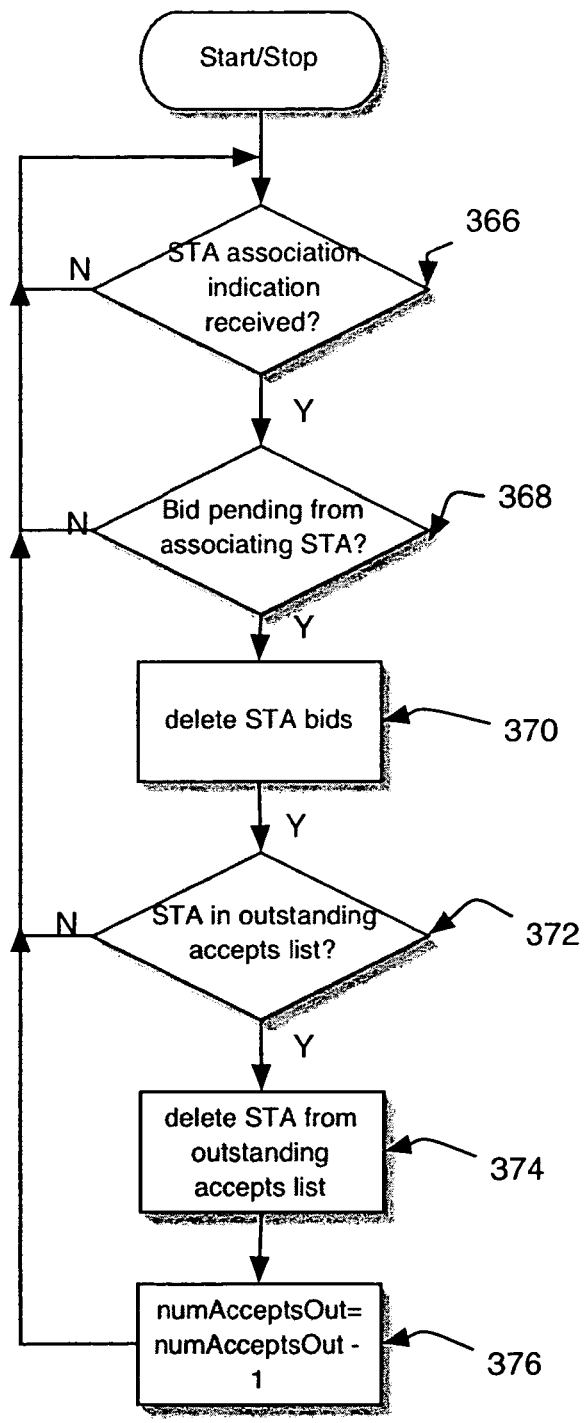
FIG. 22 is a flow diagram representing the AP's handling of bids during the auction.

In addition to receiving DRCP Bids, the AP 12 also receives an indication any time a STA 16 associates to the AP 12. Referring to FIG. 22, on receipt of the indication (step 366), the AP checks to see if it has bid information from the newly associated STA 16 (step 368). Any bid information found for the newly associated STA 16 is deleted (step 370). The AP 12 also checks to see if the STA 16 is in the list of outstanding accepts (step 372), and if the STA 16 is in the accepts outstanding list that entry is deleted (step 374) and the numAcceptsOut count is decremented (step 376). At the end of the Auction Interval, any outstanding accepts from the previous auction cycle are considered to have timed out, hence the list of outstanding accepts is emptied and numAcceptsOut is reset. These processes continue as long as the AP 12 is active on a given channel.

3. STA Initialization:

The purpose of the STA initialization phase is to find and associate to a suitable AP 12 to provide the STA 16 with access to the wireless LAN, and to prepare for the operation of the DRCP protocol and algorithms.

Figure 23:
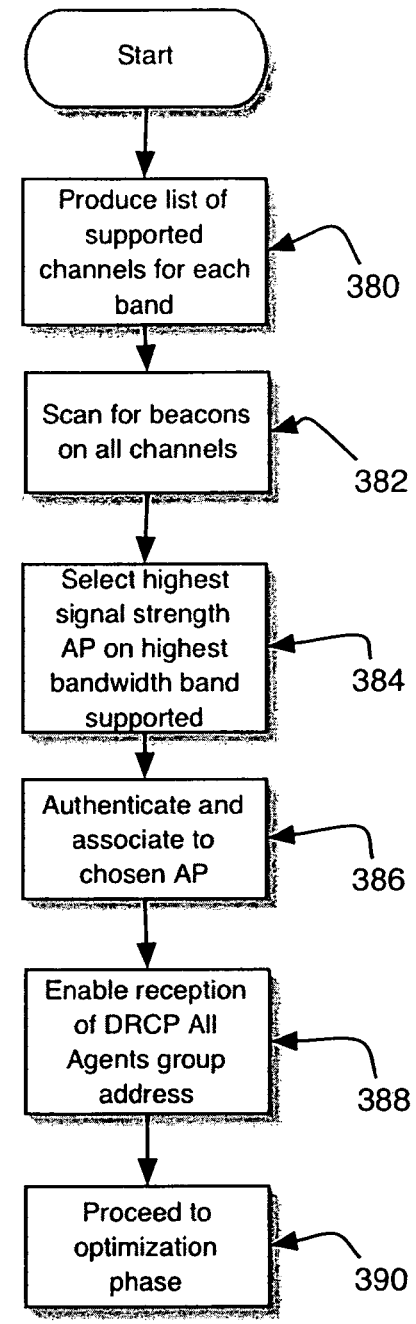
FIG. 23 is a flow diagram representing the STA initialization process.

Referring to FIG. 23, when started, the STA 16 produces a list of channels supported by the STA 16 (step 380). In multi-PHY-variant STAs (e.g., STAs supporting multiple bands such as 802.11a/b/g), the channel list will include all of the channels that are supported across the various supported bands.

First, the STA 16 scans for beacons on all channels across all supported bands (e.g., STAs supporting multiple bands such as 802.11a/b/g will scan all channels in each of the a, b, and g bands.) (step 382) The AP 12 that is received at the greatest signal strength is selected (step 384).

Preferably, where multiple bands are supported, the selection of an AP 12 also takes into account a preference for the higher bandwidth bands so that, for example as implemented in an 802.11 environment, an AP 12 on an 802.11a or 802.11g channel is given some preference to one operating on an 802.11b channel.

Once an AP 12 is chosen, the STA 16 authenticates and associates to that AP (step 386). Any security policies that control association are executed at this point.

During initialization, the STA 16 also enables the DRCP protocol so that the STA 16 will receive DRCP Announce messages (step 388). The STA 16 then proceeds to the STA optimization phase (step 390).

4. STA Optimization

Once it has made its initial association and has access to the wireless LAN, the STA continuously performs the following functions to optimize its configuration:

Canvassing. The STA periodically tunes its radio to listen on other channels, while retaining its association to its AP on its operating channel. This canvassing of other channels is done to allow the STA to receive DRCP Announce messages from APs operating on other channels.

Bidding. The STA receives and processes DRCP Announcements from all APs that are operating within its range on any of its supported channels. It evaluates the received power and loading information from the Announce messages and if it finds an AP to which it would be more optimally associated than its current AP, the STA makes a bid to move to that AP.

Radio Power Adjustment. The STA adopts the TP Backoff value communicated in Announce messages from its AP, tracking this value as it changes.

Movement Detection. The STA continuously checks to see if it is moving away from the AP to which it is currently associated. If it detects that it is moving, it stops participating in the DRCP bidding process and adopts a process of next AP selection that is invoked when the association to its AP degrades.

These functions are described more particularly as follows:

4.a STA Canvassing

The process by which the STA 16 canvasses the other channels to determine whether to send a DRCP Bid message is now described in further detail. In order to monitor DRCP Announce messages, a STA 16 periodically tunes its radio to the channels other than the one to which it is currently associated. However, the STA 16 must remain associated to its current AP 12 so that it does not lose data packets. So, packets must be buffered during the time that the STA 16 is canvassing. Various wireless communications architectures may provide different means for packet buffering.

Figure 24:
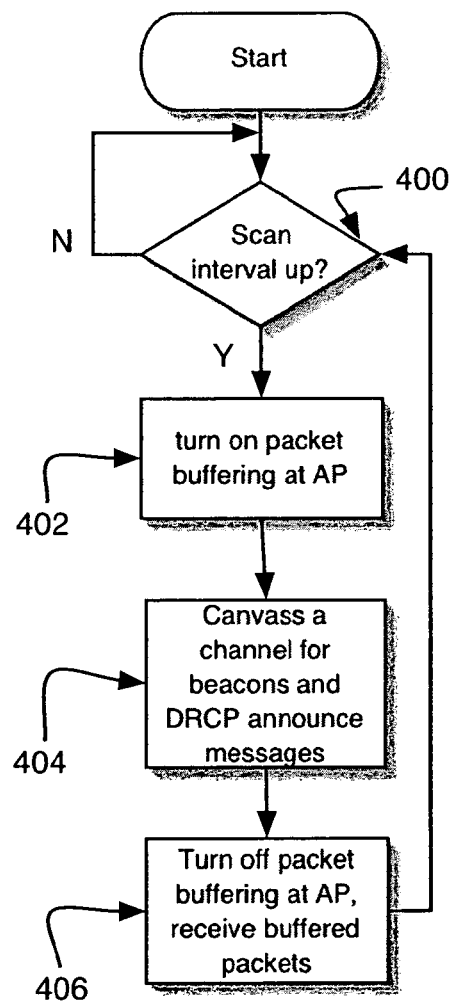
FIG. 24 is a flow diagram representing a general mechanism by which a STA in a wireless communications environment canvasses channels.

Generally, referring to FIG. 24, during a periodic scan interval (step 400), the STA 16 causes the AP 12 to which it is currently associated to temporarily buffer the packets destined for the STA 16 (step 402). Packet buffering can be initiated in a variety of ways. For example, the STA 16 may send a DRCP message to the AP 12 to cause the buffering, or the AP 12 may periodically turn on buffering and notify the STA 16 that it has done so. While the STA 16's packets are being buffered, the STA 16 tunes its radio to another channel and listens for Beacons and DRCP Announce messages on that channel (step 404). This information is used by the AP 12 to determine whether to bid for another AP. When the scan interval is complete, packet buffering is turned off and the STA 16 receives its buffered packets from the AP 12 (step 406).

Figure 25:
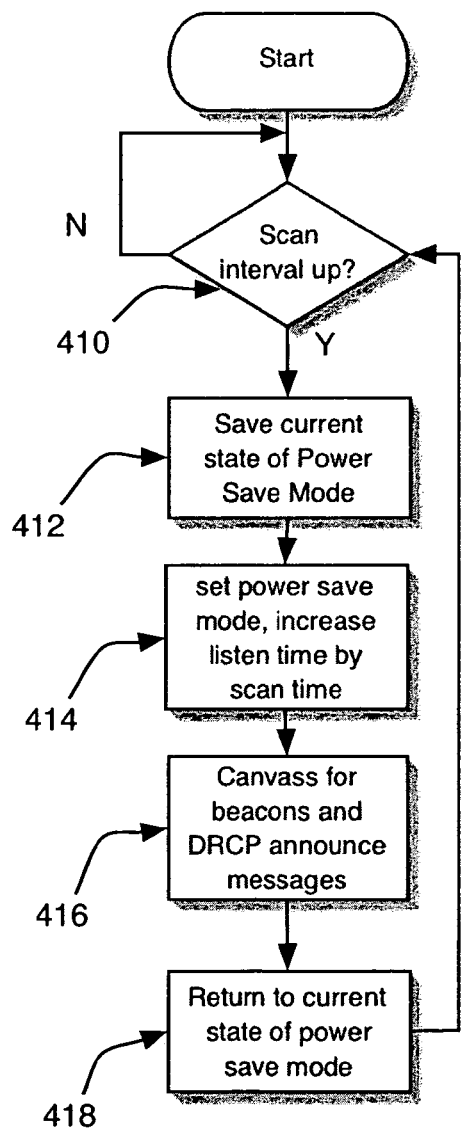
FIG. 25 is a flow diagram representing the preferred embodiment of FIG. 20 as implemented in an 802.11 wireless networking environment.

FIG. 25 sets forth a STA canvassing mechanism for use in an 802.11 wireless networking environment. The 802.11 architecture conveniently provides a power save mode that, in accordance with the principles of the invention, can be used for this purpose.

The 802.11 power save mode is intended for use by STAs 16 so that they can turn off their radios for periods of time in order to save power. STAs 16 can indicate to APs 12 that they are entering this power save mode. In response, APs 12 buffer the STAs' packets while the STAs 16 are "sleeping". APs 12 periodically send special Beacon messages to the STAs 16. STAs 16 wake up in response to these special Beacon messages. These Beacon messages include information as to whether any data is buffered for the STA 16. The STA 16 "wakes up" if data is buffered for it.

STAs 16 operating in an 802.11 environment in accordance with the preferred embodiment of the invention use the 802.11 power save mode to go off-channel and canvass other channels for DRCP Announce messages. After the channel canvass is complete, the STA 16 reverts to normal power save mode. Stations that have not been set to Power Save Mode by management are caused by the STA 16 to act as if they've been set to the Power Save Mode. STAs 16 that have already been set to Power Save Mode by management will have even more time to canvass.

In particular, referring to FIG. 25, at the start of a scan interval (step 410), the STA 16 inquires about the current state of its power save mode. The power save mode that was set by management (active, power save) is remembered (step 412). The power save mode is set to power save, and the listen time (time the STA 16 stays asleep), if any, is increased by a period of time herein referred to as scan time (step 414). At the beginning of the power save cycle, the STA 16 actually stays awake temporarily, instead of dozing as it told the AP it was going to do. It is during this time that other channels are canvassed for beacons and DRCP Announce messages (step 416). After the canvass is done the STA 16 resumes its power save cycle (step 418). This process repeats every scan interval. Whenever the STA 16 is not canvassing, it restores the remembered management set power save mode. The scan interval may be for example twice per Beacon interval.

Stations that have not been set to Power Save Mode by management are caused by the STA 16 to act as if they've been set to Power Save Mode, with listen interval set to the minimum value (i.e., every Beacon). STAs 16 that have already been set to Power Save Mode by management will have the most amount of time to canvass.

During the canvass time the STA 16 tunes its radio to a different channel in order to passively listen for beacons and DRCP Announce messages. The STA 16 keeps track of which channels have been canvassed, stepping through all of the channels until all supported channels have been canvassed. The STA 16 keeps track of all DRCP Announce messages, and the power level at which they were received.

4.a.1 STA KnownAPs Table

Figure 27:
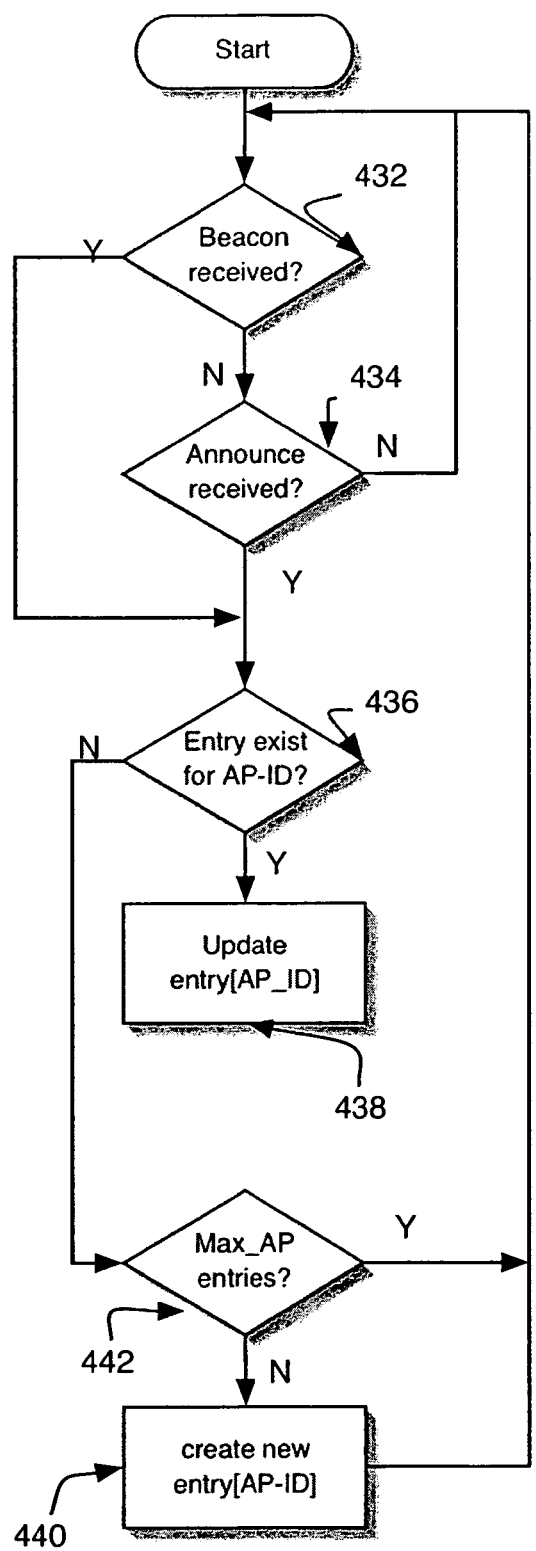
FIG. 27 is a flow diagram representing the process by which the STA Known APs table is built by a STA.

The STA 16 receives beacons and DRCP Announce messages from all APs 12 within the range of its radio. These are processed to build a table of all known APs 12, the "STA knownAPs" table 430, as shown in FIG. 26. The STA knownAPs table includes the following parameters for each entry:

AP-ID
age
Channel ID
Load factor
TP Backoff
Max Power
Distance_samples
Distance
My_load_factor
Biased_distance The STA KnownAPs table 430 is built as shown in FIG. 27. For each Beacon or Announce message received (steps 432, 434), the STA 16 checks to see if it has an entry in the STA KnownAPs table 430 for the AP-ID in the message (step 436). If found, the STA updates the entry (step 438), otherwise it creates a new one (step 340), up to a previously set maximum herein referred to as Max APs entries (step 442).

The STA 16 stores the following fields from received beacons in the STA knownAPs table entries:

AP-ID
Channel ID
Max Power

The STA 16 stores the following fields from received Announce messages in the corresponding STA knownAPs table entry:

AP-ID
Channel ID
Received Power
Load Factor
TP Backoff

The STA 16 also notes the received power level that accompanied the beacons and Announce messages and uses these values along with the TP backoff values to calculate the distance to the APs in Banzais, as previously described. (Again, since non-DRCP APs will always send beacons at full-power, the TP Backoff value for these is set to 0.)

The Received Power and TP Backoff entries are lists, where each entry in each list corresponds to a Beacon or Announce message received for the corresponding AP-ID. The received power level value and correspondingly, the distance in Banzais, are subject to variability in the RF channel. The STA 16 saves a number of these distance measurements for each entry in the knownAPs table, so that it can use averaging to compensate for this variance, to be further described. For its own AP (i.e. the AP to which the STA is currently associated), the STA 16 averages over a relatively large number of distance values, herein referred to as "Long Term Sample Size" distance values. For all other entries, the STA uses fewer, "Bid Sample Size", distance values.

Additionally, the STA keeps an Age for each entry. The Age is reset to zero, "0", each time an Announce message is received from the AP corresponding to the entry. Entries are aged as part of the STA Bidding process, described below.

4.b STA Power Adjustment

Figure 28:
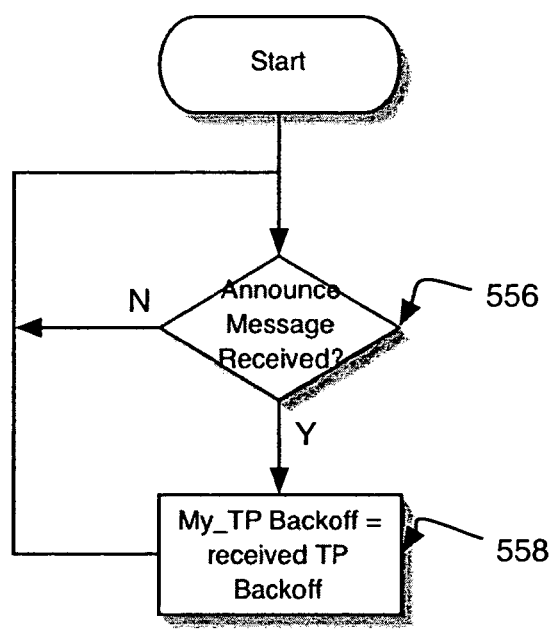
FIG. 28 is a flow diagram representing the STA power adjustment process.

Referring to FIG. 28, an associated and registered STA 16 receives all Announce messages from the AP 12 to which it is associated. Upon receipt of an Announce message (step 556), the STA notes the TP Backoff value in the Announce message and adopts that value as the STA's own TP Backoff (step 558).

4.c STA Bidding

Each time the STA Canvassing function completes a canvass of all channels, the STA 16 analyzes the information in the STA knownAPs table to see if there is a potential "better" AP 12 with which to associate. The notion of what constitutes a better AP takes into account the distance to the AP in Banzais, the available data rate, and the loading (number of associated STAs) on the AP, if known.

Figure 29:
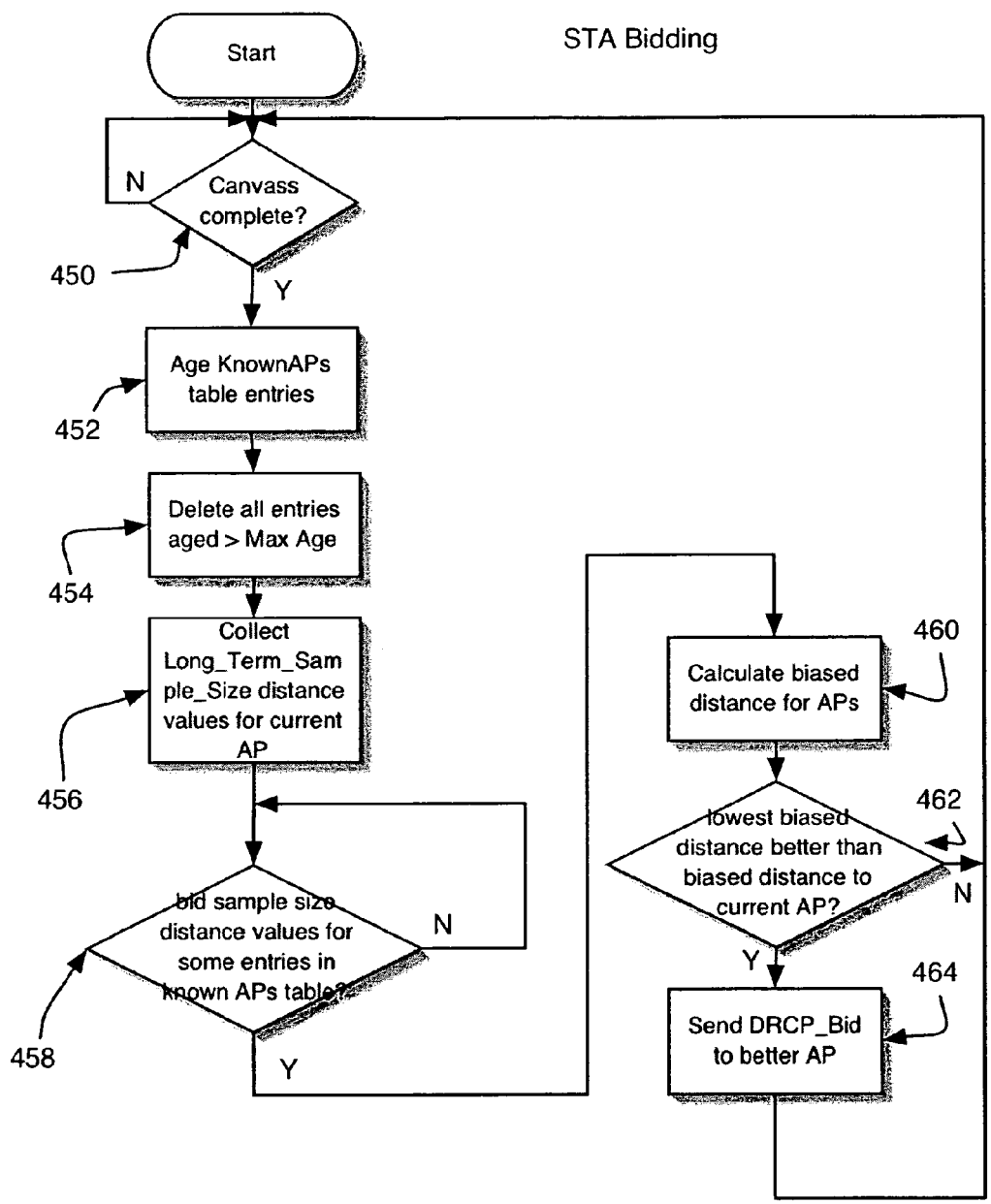
FIG. 29 is a flow diagram representing the STA Bidding process.

Referring to FIG. 29, the STA Bidding process operates generally as follows. When the canvass is complete and a sufficient number of samples have been collected on each channel (step 450), the STA knownAPs table 330 entries are aged before other processing is performed (step 452). The age of each entry is incremented, and any entries whose age exceeds Max AP Entry Age are deleted (step 454). Since the age field is cleared each time an Announce message or Beacon is received, this aging process will eliminate APs from whom nothing has been heard for "Max AP Entry Age" bidding cycles.

As mentioned, the STA 16 uses averaging to compensate for variance in its distance measurements. It requires Long Term Sample Size distance values for the STA knownAPs entry corresponding to its AP, before it performs further processing of the table (step 456). Once the STA 16 has Long Term Sample Size distance values for its own AP, it then waits until it has Bid Sample Size distance values for all entries in the knownAPs list at that time before it begins looking for a better AP (step 458). This is to avoid making a decision to move to a new AP before it has sufficient information about the other APs in the network. However, to avoid the potential for waiting indefinitely, it will not delay processing the knownAPs list for any new APs that were added after it has Long Term Sample Size distance values for its own AP.

Working with the entries for which there are sufficient distance measurement samples, the STA 16 looks for a potential better AP. In summary, a biased distance is calculated for each entry, which takes into account the available data rate as well as the loads on the APs (step 460). The data rate is deduced based on the received signal strength and the technology being used (i.e., in an 802.11 environment, the 802.11 mode of operation (a,b,g)). After calculating the biased distances for all of the entries in the STA knownAP table, the AP with the lowest biased distance is considered to be the best candidate and, if it appears better than its current AP (step 462), a Bid is sent (step 464).

Figure 30:
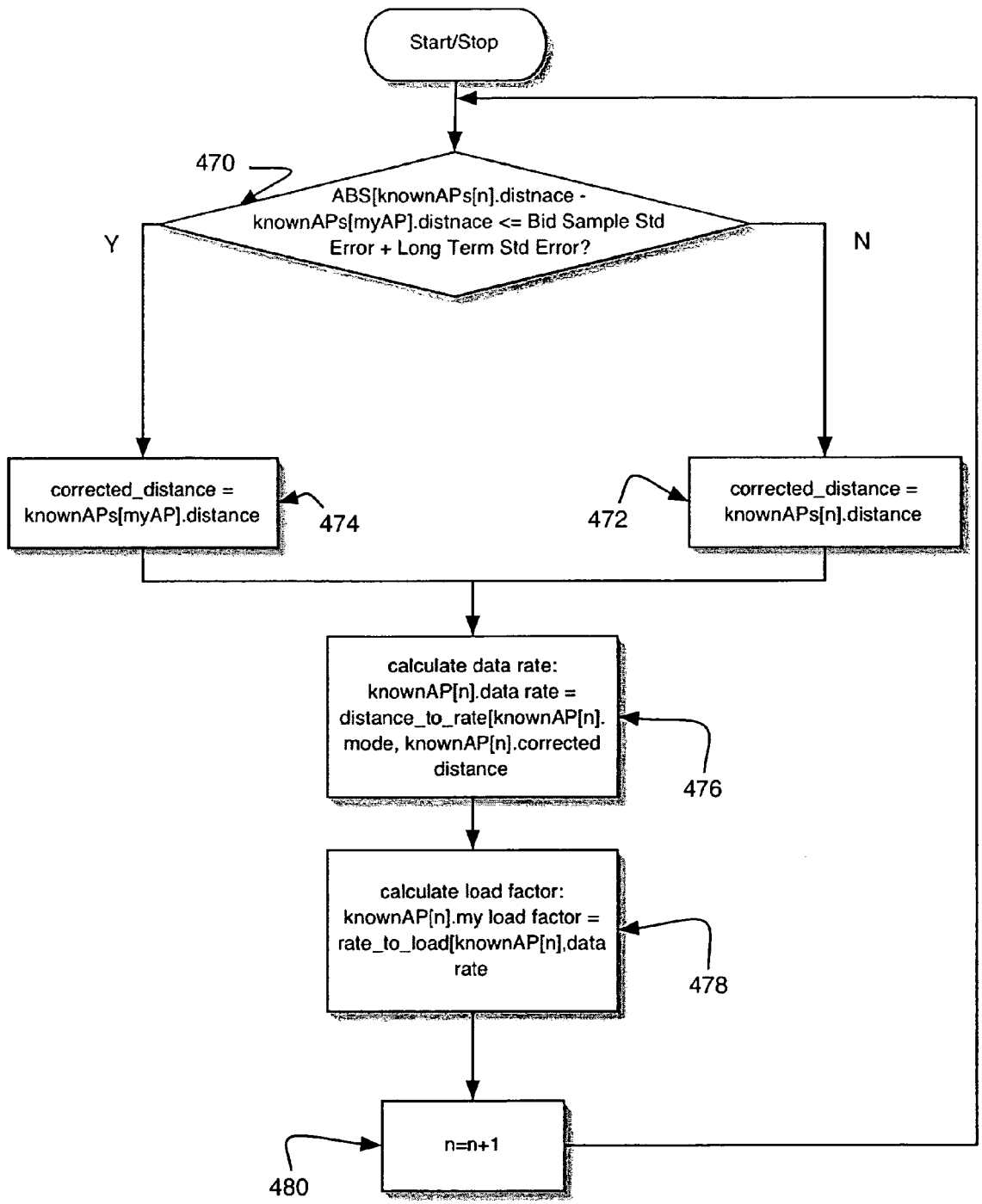
FIG. 30 is a flow diagram representing the process by which a STA calculates corrected distances for use in determining whether to bid for an AP.
Figure 33A:
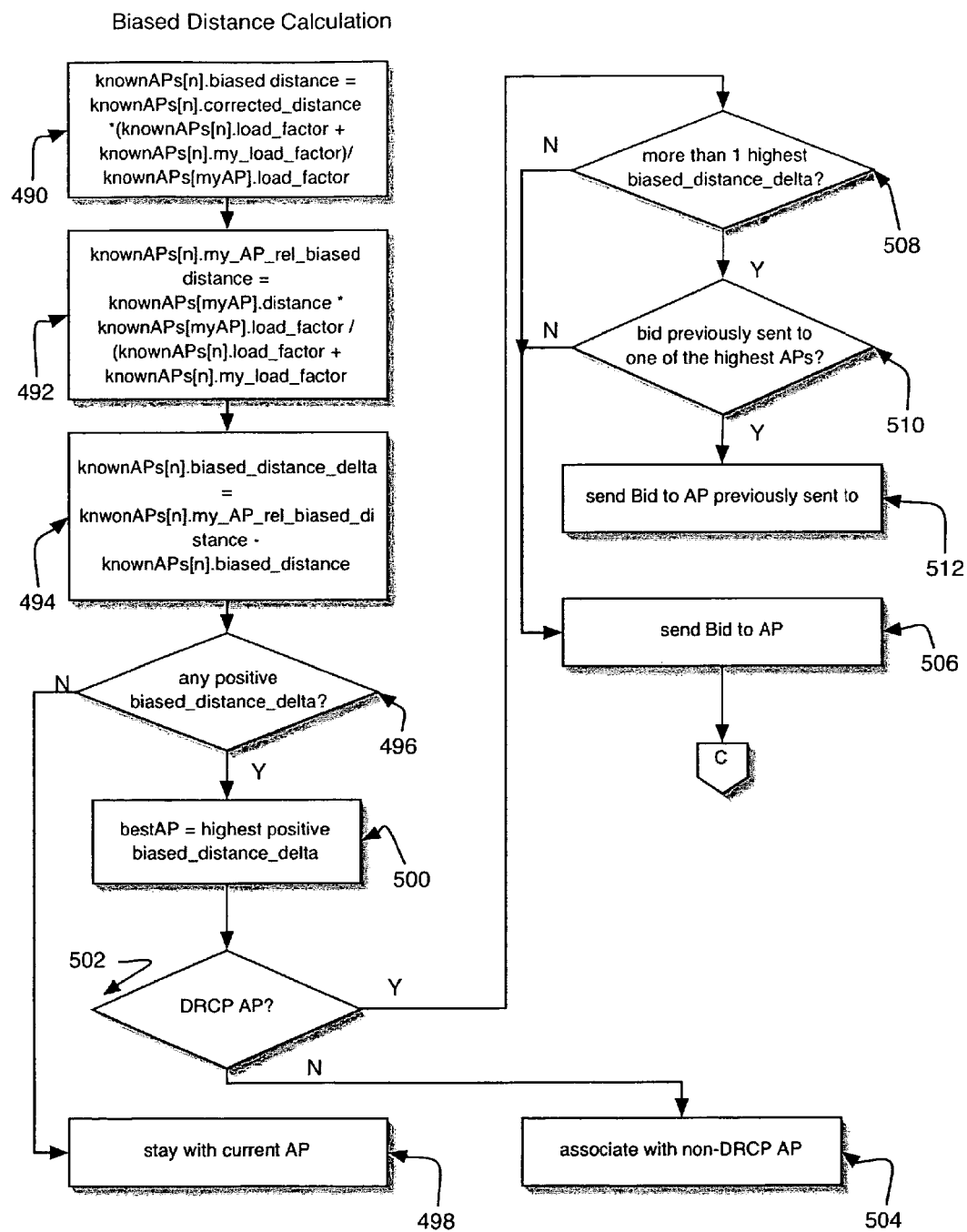
FIGS. 33A and 33B are flow diagrams representing the STA Bidding process in more detail.
Figure 33B:
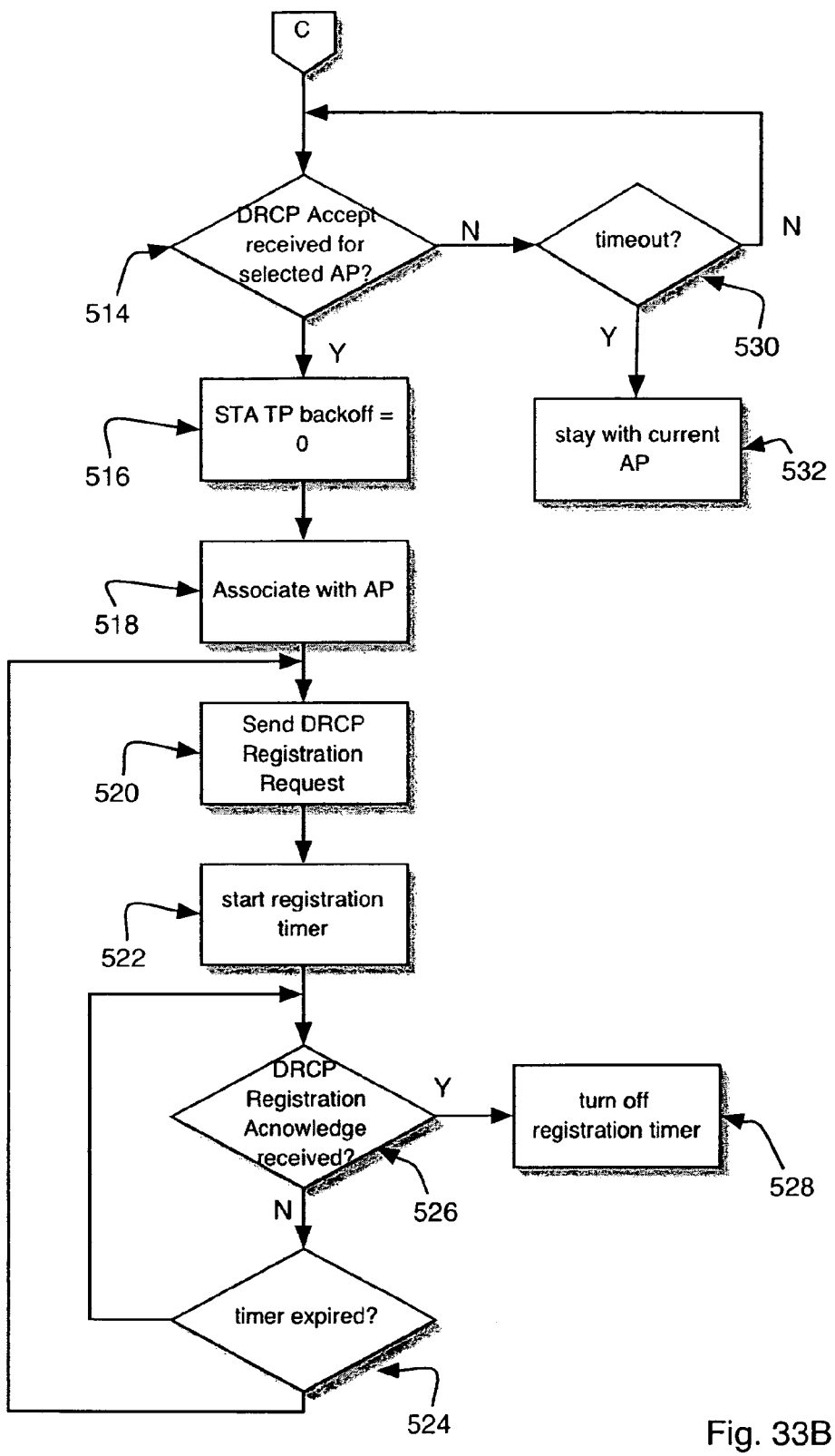

More particularly, referring to FIG. 30, for each entry "n" in the STA knownAPs table (denoted KnownAPs[n]), the following processing is performed on entry knownAPs[n]. An index of "myAP" corresponds to the entry for the AP to which the STA is currently associated, i.e., knownAPs[myAP] is the entry for the STA 16's current AP.

As previously described, the distance field in the STA knownAPs table 430, knownAPs[n].distance per entry, is the distance in Banzais, to the corresponding AP, averaged over a number, Bid Sample Size, of measurement samples. As previously noted, this value is subject to variance in the RF channel. The bid selection process should preferably yield the choice of a "better" AP only when the new AP actually would provide better performance for the STA, and not when the new AP simply appears to be better due to this variance. The variance in the new AP's distance measurement is represented by a "Bid Sample Std Error" value related to the bid sample size, and the variance in the current AP's distance measurement is represented by a "Long Term Std Error" value related to the long term distance sample size. It is advantageous to minimize the error in the distance measurement for a given entry n, in comparison to the STA's current AP. This is done by using a corrected distance that is set to the distance to the STA's current AP, if the entry falls within the sum of the standard errors on the two distance measurements.

The corrected distance, "corrected_distance", is determined as follows:

```
IF ( ABS [knownAPs[n].distance − knownAPs[myAP].distance] ≤
    (Bid Sample Std Error + Long Term Std Error) ) (step 470) THEN
    corrected_distance = knownAPs[myAP].distance (step 472)
ELSE corrected_distance = knownAPs[n].distance; (step 474)
```

4.c.1 Distance to Load Factor Conversion

The corrected distance to each AP 12 is recorded in the STA knownAPs list. This distance is then used in conjunction with data related to the particular wireless environment in which the AP 12 is operating to derive an estimate on the expected load factor for the STA. For example, in an 802.11 environment, the distance and 802.11 mode (a,b,g) are used to retrieve the expected data rate for the STA 16 from the distance_to_rate table:

```
knownAPs[n].data_rate=distance_to_rate[knownAPs
    [n].mode][knownAPs[n].corrected_distance];
    (step 376)
```

An example of distance to rate calculations for 802.11 modes is shown in Table II in FIG. 31.

Then, the expected load for this datarate is retrieved from the rate_to_load table:

```
knownAPs[n].my_load_factor=rate_to_load
    [knownAPs[n].data_rate]; (step 478)
```

An example of a rate_to_load table for 802.11 networks is shown in Table III in FIG. 32. One skilled in the art will realize how to implement distance-to-rate and rate-to-load tables from specifications for other wireless environments. The corrected_distance and my_load_factor parameters are determined in this manner for each entry n in the STA Known APs table 430.

Any entries in the knownAPs list that represent non-DRCP APs need to be given default values for their load_factors so that they can be considered by the Stations for associations as well. These default load_factors are derived from a default number of STAs per AP value that should be consistent across the network and a default "average data rate" per technology. That is:

```
if (knownAPs[n].DRCP_Enabled == FALSE) then
    knownAPs[n].load_factor = STAs_per_AP *
    rate_to_load [ default_rate [ knownAPs[n].mode ] ];
```

When determining the load of the STA 16's current AP (myAP), when myAP is a non-DRCP AP, then its default load_factor value is preferably incremented by the STA's load on that AP. This helps to support a consistent view of the load of that AP both before and after a STA associates with it—that is, since the STA adds its own load to the default load of its prospective (non-DRCP) AP before it makes a decision to associate with it, it must also add its load to the default load for this AP after it has associated with it.

4.c.2 Biased Distance Calculation

Using the my_load_factor to the AP 12, the load_factor currently on the AP 12 (received from Announce messages) and the corrected distance to the AP 12, the STA 16 calculates a biased_distance value to account for the loading on the prospective AP 12 in comparison to the loading on the STA 16's current AP, as shown in FIG. 29. The biased distance is calculated as described by the following formula:

```
knownAPs[n].biased_distance =
    knownAPs[n].corrected_distance *
    (knownAPs[n].load_factor+knownAPs[n].my_load_factor)/
    knownAPs[myAP].load_factor)   (step 490)
```

Next, a biased distance to the STA 16's current AP 12 is calculated to account for the loading on the current AP 12 relative to the loading on the prospective AP. This calculation is made as follows:

```
knownAPs[n].my_ap_rel_biased_distance =
    knownAPs[myAP].distance *
    knownAPs[myAP].load_factor/
    (knownAPs[n].load_factor+knownAPs[n].my_load_factor)
    (step 492)
```

Finally, the difference between the biased distance to the prospective AP and the relative, biased distance to the STA 16's current AP is determined, as follows:

```
knownAPs[n].biased_distance_delta =
    knownAPs[n].my_ap_rel_biased_distance −
    knownAPs[n].biased_distance
    (step 494)
```

After calculating the biased_distances and biased_distance_deltas for all of the APs in the known APs list, the STA 16 checks to see if any of the biased_distance_delta values are positive (step 496). If not, then the STA 16's current AP is still the best AP, so the STA 16 remains associated with its current AP (step 498). Of any positive biased_distance_delta values, the best AP is the one with the highest positive biased_distance_delta value (step 500). If the best AP is not DRCP enabled (step 502), then the STA 16 associates with that AP (step 504). If the best AP is a DRCP AP (step 502), then a Bid is sent (step 506) and the STA 16 resumes normal operation until it either receives a DRCP Accept or it completes another Canvass Sample Number passes of all channels. If there is more than one AP with the same highest biased_distance_delta values (step 508), the STA 16 checks to see if any of them is the last AP to which it Bid (step 510) and if so, it selects that one again (step 512).

If a DRCP Accept is received with the AP-ID matching the selected APs AP-ID (step 514), the STA sets its TP backoff value to zero (step 516) and associates with the AP from which the Accept was received (step 518). The STA 16 now sends a DRCP Registration Request to the AP (step 520) and starts a timer (step 522) to go off every Registration Timeout Interval. When the timer expires (step 524), the STA 16 sends out another DRCP Registration Request and resets the timer. Upon receipt of a DRCP Registration Acknowledge (step 526), the timer is disabled (step 528).

If no DRCP Accept is received (step 414) in response to the STA's Bid message after a certain period of time (step 530), the STA remains associated with its current AP.

After the STA 16 has associated with a new AP, the STA 16 waits until it has collected a large number, Long Term Sample Size, of distance measurements to its new AP before it resumes this process of evaluating the knownAPs table for bidding.

4.d STA Movement Detection

Figure 34:
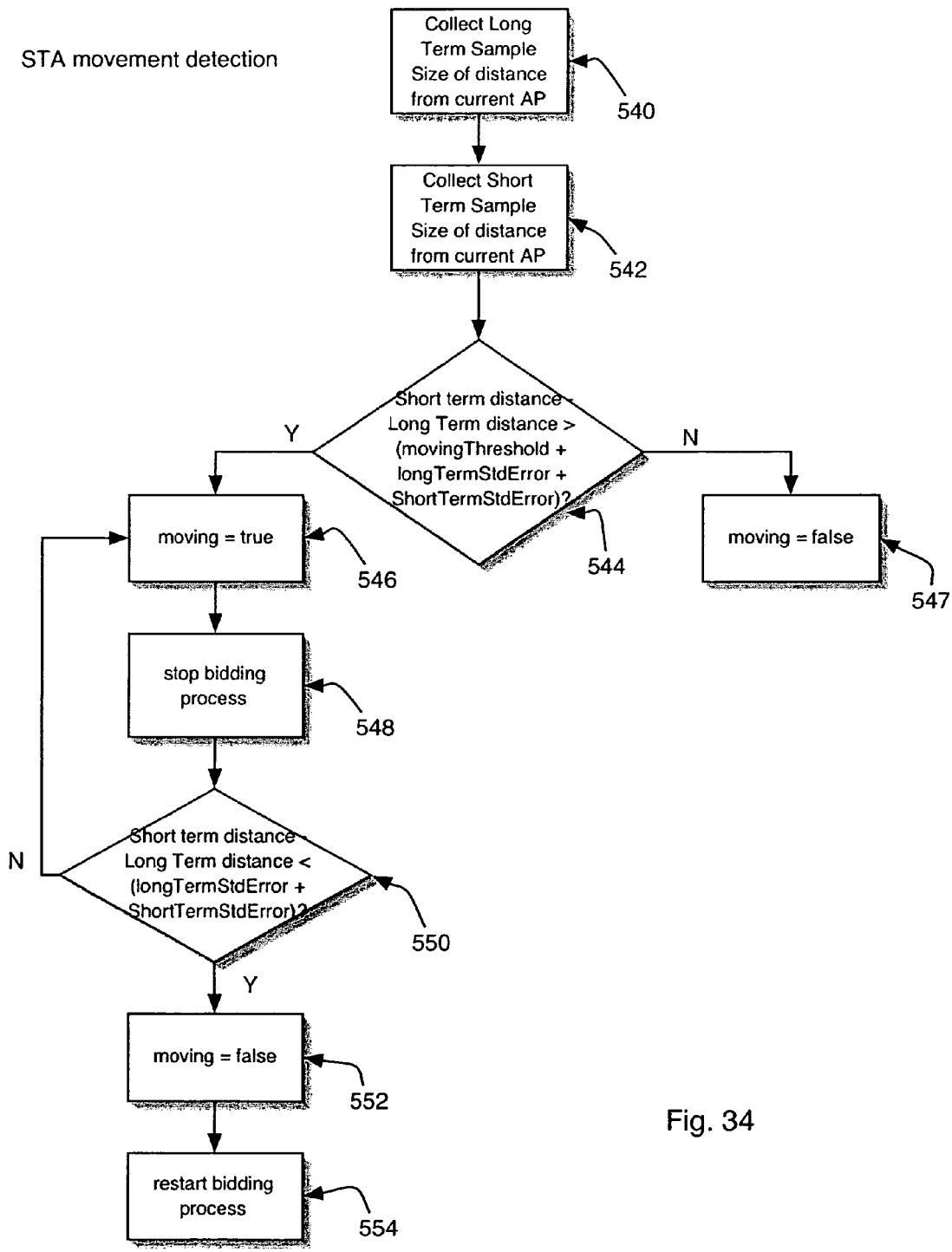
FIG. 34 is a flow diagram representing the process by which a STA detects its own movement.

When a STA 16 is associated with an AP 12, the STA 16 receives DRCP Announce messages from all APs 12 within the range of its radio. Referring to FIG. 34, once the STA 16 has collected Long Term Sample Size of distance measurements from Announce messages received from its AP 12 (step 540), it can begin the movement detection process.

The STA 16 continuously collects Short Term Sample Size distance values to the current AP (step 542). To detect movement, the STA 16 compares the distance to its AP 12, derived from averaging over the long term using Long Term Sample Size, to the short term distance, derived from averaging the most recent Short Term Sample Size samples. This difference is compared to a Moving Threshold value plus the standard error in these two measurements in order to eliminate false movement detection. A station is considered to be moving when the short term distance exceeds the long term distance by more than the Moving Threshold plus the sum of the errors in the two measurements. The following pseudo code describes this comparison.

```
IF ((knownAPs[myAP].short_term_distance –
       knownAPs[myAP].distance) > (movingThreshold +
   longTermStdError + shortTermStdError)) (step 544) THEN
       moving = TRUE     (step 546)
   ELSE moving = FALSE;  (step 547)
```

Once the STA 16 detects that it is moving (step 446), and as long as the STA 16 does not detect that it has stopped moving, the STA 16 refrains from participating in the bidding process (step 548), seeking a new AP only if warranted by the deterioration of its current association. If the STA 16 determines that it is no longer moving before the STA 16 loses the association to its AP, the STA 16 resumes normal operation including participation in the bidding process.

As in movement detection, to detect that the STA 16 has stopped moving, the STA 16 compares the distance to its AP 12, derived using the Long Term Sample Size, to the distance derived from the most recent Short Term Sample Size samples. The STA 16 looks to see when this difference is less than just the standard error in the two measurements to determine that the STA 16 has stopped moving. The following pseudo code describes this test.

```
IF ((knownAPs[myAP].short_term_distance –
       knownAPs[myAP].distance) < (longTermStdError +
    shortTermStdError)) (step 550) THEN
    moving = FALSE (step 552)
```

If the STA 16 determines that it has stopped moving, the bidding process is restarted (step 554).

5. Software Architecture

Figure 35:
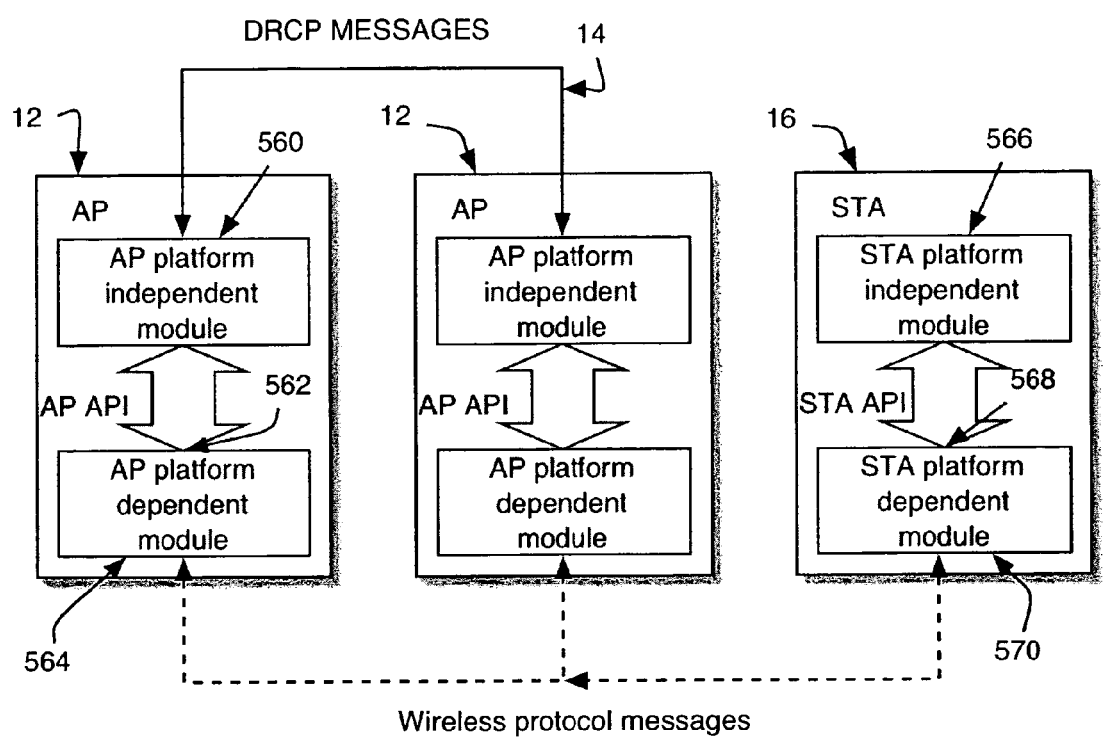
FIG. 35 is a block diagram showing the software architectures of APs and STAs.

In accordance with the preferred embodiment, the previously described functionality is implemented in software in APs 12 and STAs 16 respectively. Referring to FIG. 35, the software is implemented in accordance with a layered architecture, such that it contains a platform dependent module that interacts with a platform independent module. This architecture is advantageous for porting the inventive functionality between different wireless architecture platforms. As shown each AP 12 includes a platform independent module 560 that interacts via an AP API 562 with an AP platform dependent module 564. Likewise, each STA 16 (one shown) includes a STA platform independent module 566 that interacts via a STA API 568 with a STA platform dependent module 570. In environments where the APs 12 are connected to each other via a wired network 14, DRCP messages may be passed directly between the APs 12 via the wired network 14. In environments where the APs are interconnected via only the wireless network 15, APs 12 interact with each other and with STAs 16 by passing DRCP messages to the respective platform dependent layer, which causes wireless platform specific protocol messages to be passed between the APs 12 and STAs 16 to implement the DRCP protocol.

Figure 36:
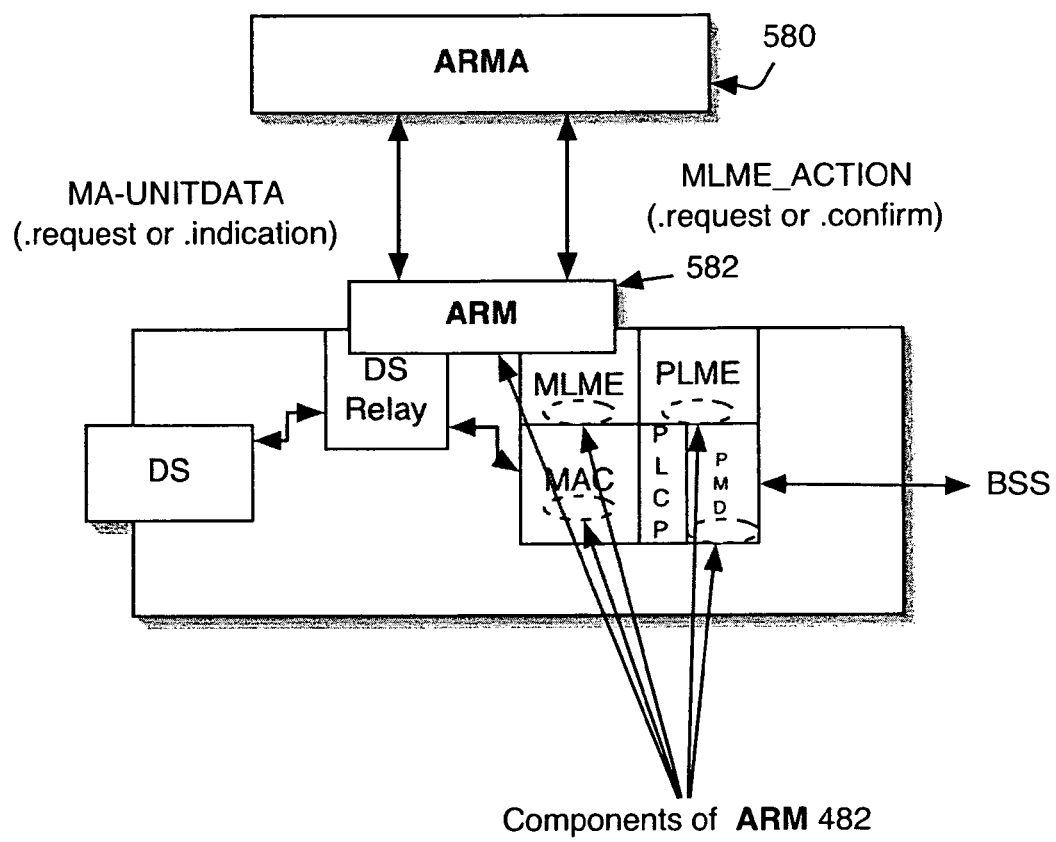
FIG. 36 is a more detailed block diagram of the software architecture of an AP implementing the invention in an 802.11 wireless networking environment.

Referring to FIG. 36, there is shown a representation of the AP architecture of FIG. 35 as it applies to in an 802.11 networking environment. The AP Radio Management Agent (ARMA) 580 is the platform independent layer of the software. The AP Radio Manager (ARM) 582 is the platform dependent layer of the software. The ARM software is actually implemented within several different 802.11 platform specific elements of the AP. More information on these elements can be found in the incorporated 802.11 specification.

Figure 37:
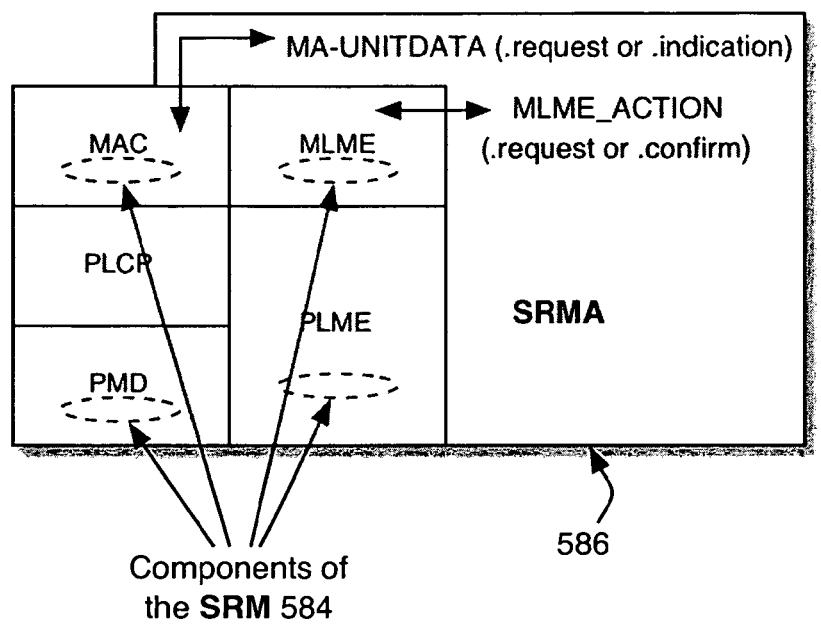
FIG. 37 is a more detailed block diagram of the software architecture of a STA implementing the invention in an 802.11 wireless networking environment.

Referring to FIG. 37, the Station Radio Manager (SRM) 584 is the platform dependent portion of the STA software. As shown, the SRM communicates with various 802.11 platform specific elements. The Station Radio Management Agent (SRMA) 586 is the platform independent portion of the STA software. Likewise, the AP radio manager is the platform dependent portion of the AP software, communicating with 802.11 platform specific elements. SRMAs communicate with ARMAs through the use of DRCP messages as previously described.

These DRCP messages are now described in further detail. Generally, DRCP messages could be encoded as standard LLC data frames, and the invention does not preclude such an implementation. But, according to the preferred embodiment as implemented in an 802.11 networking environment, DRCP management messages are encoded as new types in existing Class 1 Frames. DRCP messages are addressed either to a Group MAC Address, or to an individual MAC address, and are distinguished by the presence of the DRCP Protocol Identifier in the Protocol Identification Field of a SNAP PDU.

The DRCP messages are now described in detail as they operate on an IP WLAN. Some DRCP messages are transmitted as IEEE 802.11 MAC management frames of subtype Beacon on the wireless LAN only, while others are transmitted as data frames encoded as LLC 1 Unnumbered SNAP PDUs on the wireless LAN or the wired/wireless network between APs.

Figure 38:
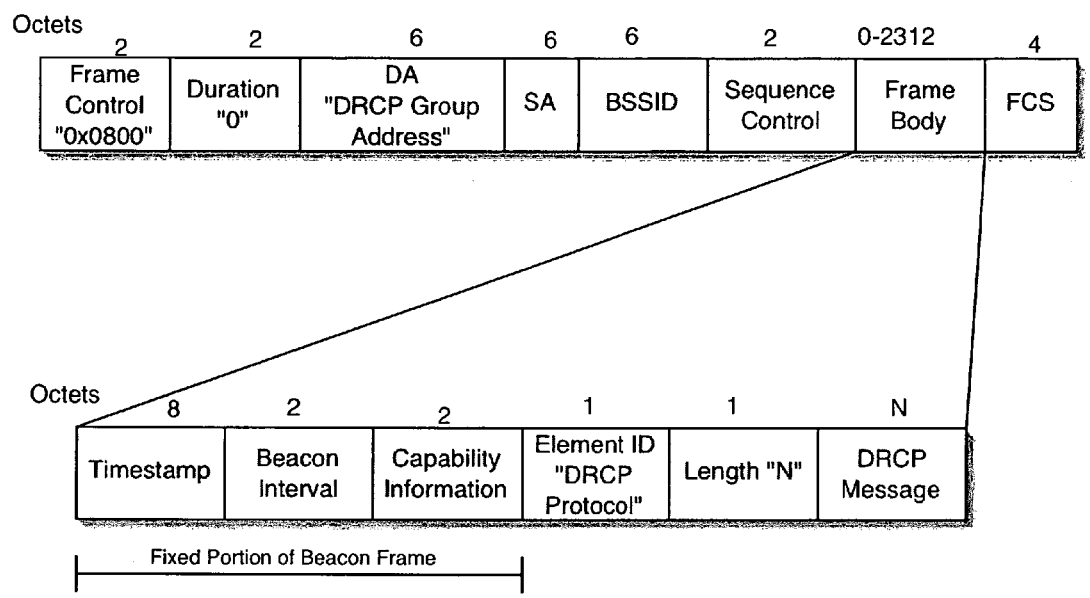
FIG. 38 represents the encoding of a DRCP (Dynamic Radio Control Protocol) message in an 802.11 beacon frame.

FIG. 38 shows the encoding of a DRCP message in an IEEE 802.11 Beacon frame. The DA field is set to a specific DRCP group MAC address as appropriate to the message type, and the BSS ID is a DRCP specific BSS-ID. The fixed portion of the Beacon frame is as defined in the 802.11 standard, and the variable portion of the frame is replaced by the information element created to carry a DRCP protocol message. In accordance with a preferred embodiment, it is desirable for DRCP enabled APs to perform automatic channel selection and load balancing by exchanging DRCP Claim, Preclaim, and Announce messages in management frames of subtype Beacon, while preventing STAs from attempting to associate with an AP in response to receipt of one of these messages. Several steps are therefore taken in addition to the DRCP protocol specific address fields already mentioned. First of all, the "Element ID" field includes an OUI specific to the DRCP protocol, which alerts DRCP enabled APs and STAs that the frame holds a DRCP message. Furthermore, standard (non-DRCP) 802.11 Beacons include in the body of the frame field certain fields such as "Supported Rates", "FH Parameter Set", "DS Parameter Set", "CF Parameter Set", etc. (Refer to the incorporated 802.11 standard document for more information.) Management frames of type Beacon encoding 802.11 Claim, Preclaim, and Announce messages either do not include these fields, or set them to a null value. Non-DRCP STAs that might otherwise attempt to use the DRCP Beacon type frames for association cannot do so due to the lack of this information.

Figure 39:
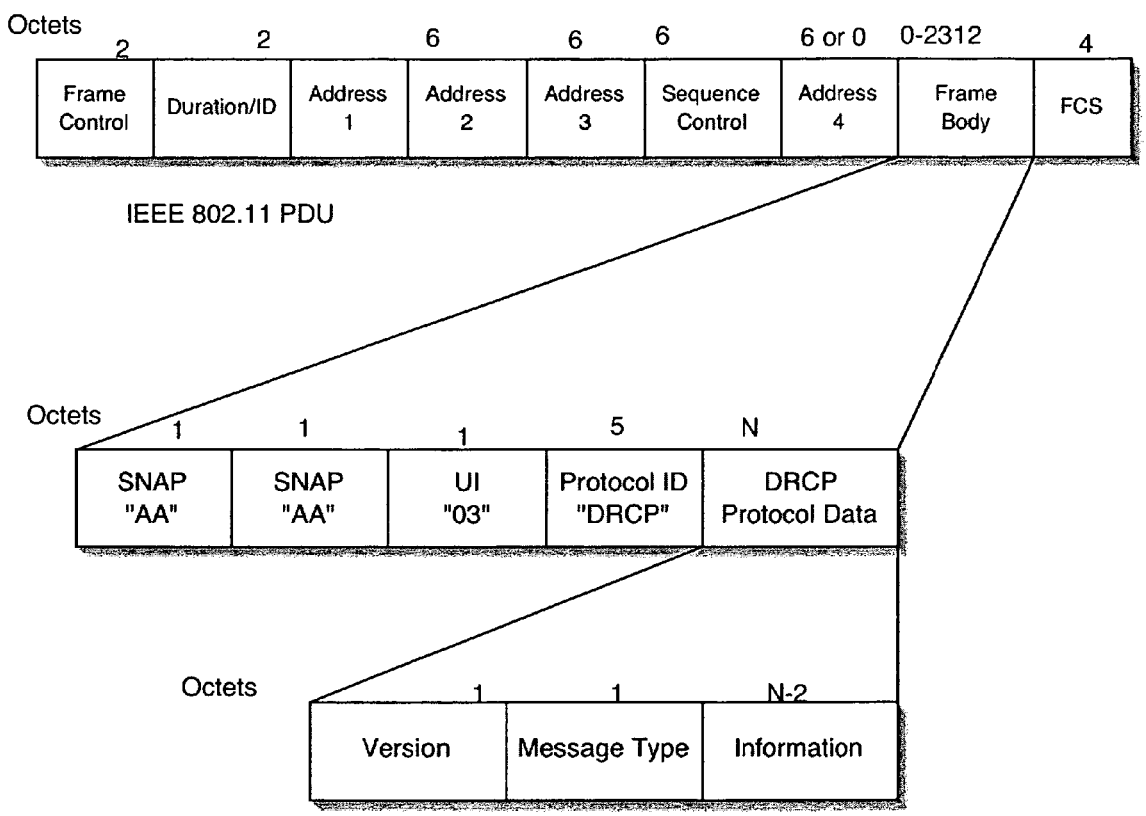
FIG. 39 represents the encoding of a DRCP message in an 802.11 data frame.

FIG. 39 shows the encoding of a DRCP message within an 802.11 MAC Data frame, of subtype Data. DRCP messages are addressed either to an individual MAC address or to one of the DRCP Group MAC addresses, and are distinguished by the presence of the DRCP Protocol Identifier in the Protocol Identification Field of a SNAP PDU. DRCP messages that are transmitted over the DS may be formatted as shown, or may be similarly encoded in another MAC data frame depending upon the DS media.

In accordance with the preferred embodiment, the SRMAs and ARMAs interact with the SRMs and ARMs to generate and/or collect information needed to produce or interpret DRCP protocol messages. It is noted that the DRCP protocol could be implemented over non-802-11 primitives without departing from the principles of the invention. The following describes the primitives used in an 802.11 environment.

5.a Enhancements to Standard 802.11 MAC Service Interface

The ARMAs and SRMAs transmit and receive DRCP messages over a standard 802 MAC Service Interface, with some enhancement. The receive interface is enhanced in both the STA and the AP to allow the SRM and the ARM to indicate to the SRMA and ARMA respectively, the power at which DRCP messages are received. In particular, the semantics of the 802.11 MA-UNITDATA.indication service primitive are modified as shown by the underlined text, to add a received power parameter as follows:

```
MA-UNITDATA.indication (
                        source address,
                        destination address,
                        routing information,
                        data,
                        reception status,
                        priority,
```

-continued

```
                        service class,
                        received power
                        )
```

The received power parameter specifies the signal strength, expressed in dBm, at which the MSDU was received. The received power value indicates the current level at which the sending device is heard, but does not provide an indication of whether or not the sending device is transmitting at full power. The potential power level at which a device might be heard can be determined when the transmit power backoff (i.e., the amount, in dB, by which the radio is turned down) in use by the device is also known.

5.b Enhancements to the Standard 802.11 Management Interface

BSS Description

The BSSDescription Parameter contains a list of elements that describe the BSS. An additional element is added to this list:

| Name | Type | Valid Range | Description |
| --- | --- | --- | --- |
| Received Power | Integer | −1 to −99 | Indicates the power (in dBm) at which the Beacon from this BSS was received. |

Send DRCP

This mechanism is provided to allow the ARMA to send DRCP Messages encoded in 802.11 Management frames of type Beacon.

MLME-SENDDRCP.request

This primitive is used by the ARMA to request that the ARM send a DRCP Message over the wireless media, encoded in an 802.11 Management frame of type Beacon. As shown in FIG. 34, this is a special type of Beacon frame wherein the fixed portion of the Beacon frame is as defined as in the 802.11 standard, and the variable portion of the frame is replaced by a single information element that carries the DRCP message.

The primitive parameters are as follows:

```
MLME-SENDDRCP.request  (
                        Destination Address
                        Message Length
                        DRCP Message
                        Quiet Channel
                        CTS Duration
                        )
```

| Name | Type | Valid Range | Description |
| --- | --- | --- | --- |
| Destination Address | MAC Address | N/A | A specific DRCP group MAC address as appropriate to the message type. |
| Message Length | Unsigned Integer | 0 . . . 2312 | Indicates the number of octets in the DRCP Message field. |
| DRCP Message | DRCP Message | N/A | DRCP Message |
| Quiet Channel | Boolean | FALSE (0), TRUE (1) | Indicates whether the STAs associated to the AP should be quieted for the Beacon transfer by the transmission of a Clear To Send (CTS) frame immediately prior to the Beacon transfer. |

| | | | |
|---|---|---|---|
| CTS Duration | unsigned integer | 16 . . 255 μsec | Indicates the value to be placed in the duration field of the CTS frame. The value represents the time, in microseconds, required to transmit the pending Beacon frame, plus one short interframe space (SIFS) interval. This parameter is only used when the quiet channel parameter is true. |

This primitive is generated by an ARMA to request that a DRCP Message be sent on the wireless media encoded in an 802.11 Management frame of type Beacon. DRCP Claim and Hello messages are sent in this manner. As previously described, the ARMA may optionally quiet the channel before sending a DRCP Hello message by first by sending a CTS frame. In particular, if the Quiet Channel parameter is TRUE, the ARM transmits a Clear To Send (CTS) frame immediately prior to the Beacon transfer. The DRCP Hello CTS Destination MAC Address is placed in the Receiver Address (RA) of the CTS frame. The duration field of the CTS is set to the value of the CTS Duration parameter.

The fixed portion of the Beacon frame is as defined in the 802.11 standard. The DA is set to the Destination Address parameter value, the SA is the AP's MAC address, and the BSS ID is the DRCP Default BSS-ID. The variable portion of the frame is replaced by a single information element with an Element ID of DRCP Protocol, with a Length field value of the Message Length parameter and the Information field containing the DRCP Message.

MLME-SENDDRCP.confirm

This primitive confirms the transmission of a DRCP message to the ARMA. The primitive parameters are as follows:

| Name | Type | Valid Range | Description |
|---|---|---|---|
| ResultCode | Enumeration | SUCCESS, INVALID_PARAMETERS, NOT_SUPPORTED | Indicates the result of the MLME-SENDDRCP.request |

This primitive is generated by the MLME as a result of an MLME-SENDDRCP.request to send a DRCP message encoded in an 802.11 Management frame of type Beacon. The ARMA is thus notified of the result of the Send DRCP request.

Power Management Fib

As previously described, one way that a STA can support periodic canvassing is to indicate to the AP that it is in power save mode, thereby causing the AP to buffer the STAs packets while the STA is canvassing. This mechanism supports a STA's ability to indicate to the AP that it is in power save mode, without actually going into power save mode.

MLME-POWERMGTFIB.request

This primitive requests the SME to use the power save mode interaction with the AP to allow time to canvass other channels. The primitive parameters are as follows:

| MLME-POWERMGTFIB.request | ( ) | | |
|---|---|---|---|
| Name | Type | Valid Range | Description |
| Null | N/A | N/A | No parameters |

This primitive is generated by an SRMA to cause the MLME to borrow part of the doze time (if the STA is in power save mode) or all of the doze time (if the STA is in active mode) in order to canvass other channels.

This request causes the SRM to:
1. save the current power management mode settings
2. set:
   a. power management=Power_Save
   b. WakeUp=FALSE
   c. ReceiveDTIMs=FALSE
3. signal the AP that it is using power management mode.

This request prepares the SRM to:
1. at the start of the power save cycle, signal the SRMA by sending an MLME-PSSTART.indication while actually keeping the power on.
2. catch any user or net manager power mode management operations and cause them to use the saved settings, not the active settings.

MLME-POWERMGTFIB.confirm

This primitive confirms the change in power management mode to the SRMA. The primitive parameters are as follows:

| Name | Type | Valid Range | Description |
|---|---|---|---|
| ResultCode | Enumeration | SUCCESS, INVALID_PARAMETERS, NOT_SUPPORTED | Indicates the result of the MLME-POWERMGMTFIB.request |

This primitive is generated by the MLME as a result of an MLME-POWERMGTFIB.request to mimic power save mode. The SRMA is thus notified of the change of power mode indicated.

Power Save Start

This mechanism notifies the SRMA that it can begin to canvass.

MLME-PSSTART.indication

This primitive indicates to the SRMA the start of the power save cycle. The STA does not actually power off its radio and enter the sleep state at this point, but preferably, it should not transmit outgoing frames after sending this indication until it receives an MLME-PWRMGMTFIBCONTINUE.request. The primitive parameters are as follows:

| MLME-PSSTART.indication | ( ) | | |
|---|---|---|---|
| Name | Type | Valid Range | Description |
| Null | N/A | N/A | No parameters |

This primitive is generated by an SME to indicate the start of power save cycle. The SRMA is thereby notified of the start of the power save cycle.

Power Management Restore

This mechanism further supports a STA's ability to indicate to the AP that it is in power save mode, without actually going into power save mode.

MLME-PWRMGMTRESTORE.request

This primitive tells the MLME that it should restore the user-configured power save mode. This primitive allows the SRMA to tell the MLME that it no longer needs to lie to the AP about power save (that control over power save is passed back to the MLME). The primitive parameters are as follows:

| MLME-PWRMGMTRESTORE.request | ( ) | | |
|---|---|---|---|
| Name | Type | Valid Range | Description |
| Null | N/A | N/A | No parameters |

This primitive is generated when the canvass mechanism is taken out of service. The receipt of this primitive causes the SRM to restore the saved power management mode settings and:

1. if saved power mode was ACTIVE, immediately force the awake state;
2. if saved power mode was POWER_SAVE, continue normal power save mode operation.

MLME-PWRMGMTRESTORE.confirm

This primitive confirms the change in power management mode to the SRMA. The primitive parameters are as follows:

| Name | Type | Valid Range | Description |
|---|---|---|---|
| ResultCode | Enumeration | SUCCESS, INVALID_PARAMETERS, NOT_SUPPORTED | Indicates the result of the MLME.PWRMGMTRESTORE.request |

This primitive is generated by the MLME to confirm that the SME has executed an MLME-PWRMGMTRESTORE.request. It is not generated until the change has been indicated. Upon receipt of this primitive, the SRMA is notified of the change of power mode indicated.

Power Management Fib Continue

Once canvassing is complete, this mechanism informs the SRMA that it "has control" of the radio and communicates power save state (awake or doze).

MLME-PWRMGMTFIBCONTINUE.request

This primitive tells the MLME that it's safe to enter the awake state and transmit frames if desired. The primitive parameters are as follows:

| MLME-PWRMGMTFIBCONTINUE.request | ( ) | | |
|---|---|---|---|
| Name | Type | Valid Range | Description |
| Null | N/A | N/A | No parameters |

This primitive is generated when the SRMA is has completed canvassing. Upon receipt, the MLME enables transmission of user data frames, if necessary.

MLME-PWRMGMTFIBCONTINUE.confirm

This primitive confirms the change in allowed power management state. The primitive parameters are as follows:

| Name | Type | Valid Range | Description |
|---|---|---|---|
| ResultCode | Enumeration | SUCCESS, INVALID_PARAMETERS, NOT_SUPPORTED | Indicates the result of the MLME.PWRMGMTFIBCONTINUE.request |

This primitive is generated by the MLME to confirm that the SME has executed an MLME-PWRMGMTFIBCONTINUE.request. It is not generated until the change has been indicated. Receipt by the SRMA serves as notification of the change of the allowed power save mode.

Channel Out

This mechanism supports the ability to indicate to an ARMA that a channel has gone out of service.

MLME-CHANNELOUT.indication

This primitive reports to the ARMA that a channel that was previously available has become unavailable. The primitive parameters are as follows:

| MLME-CHANNELOUT.indication | ( Channel ) | | |
|---|---|---|---|
| Name | Type | Valid Range | Description |
| Channel | Integer | 0-255 | Channel identifier |

This primitive is generated by the MLME when a channel becomes unavailable. Receipt of this primitive causes the ARMA to remove the channel from its channel map.

Channel In

This mechanism provides the ability to indicate to an ARMA that a channel has gone into service.

MLME-CHANNELIN.indication

This primitive reports to the ARMA that a channel that was previously unavailable has become available. The primitive parameters are as follows:

| MLME-CHANNELIN.indication( Channel ) | | | |
|---|---|---|---|
| Name | Type | Valid Range | Description |
| Channel | Integer | 0-255 | Channel identifier |

This primitive is generated by the MLME when a channel becomes available. Receipt of this primitive causes the ARMA to add the channel to its channel map.

Beacon Notify

This mechanism supports the ability to detect any other APs using the same channel.

MLME-BEACONNOTIFY.request

This primitive requests the MLME to notify the ARMA whenever a beacon is received. There is one indication for each Beacon received. An indication is generated any time a Beacon is received on the current channel. The primitive parameters are as follows:

| MLME-BEACONNOTIFY.request ( Notify Enable ) | | | |
|---|---|---|---|
| Name | Type | Valid Range | Description |
| Notify Enable | Boolean | True or False | When True, indicates that the PIOTE is to be notified of any Beacons received. When False, this mechanism is to be disabled. |

This primitive is generated by an ARMA when it wants to be notified of any beacons received on its own channel. Receipt of this primitive by an MLME causes the MLME to enable a mode whereby the ARMA will be notified if any Beacon is received.

MLME-BEACONNOTIFY.confirm

This primitive confirms the change in the beacon notification mechanism. The primitive parameters are as follows:

| Name | Type | Valid Range | Description |
|---|---|---|---|
| ResultCode | Enumeration | SUCCESS, INVALID_PARAMETERS, NOT_SUPPORTED | Indicates the result of the MLME-BEACONNOTIFY.request |

This primitive is generated by the MLME as a result of an MLME-BEACONNOTIFY.request. Receipt of this primitive by the ARMA serves as notification of the change of Beacon Notify as indicated.

MLME-BEACONNOTIFY.indication

This primitive reports to the ARMA that a Beacon was received on the data channel. The primitive parameters are as follows:

| MLME-BEACONNOTIFY.indication ( BSSDescription ) | | | |
|---|---|---|---|
| Name | Type | Valid Range | Description |
| BSSDescription | BSSDescription | N/A | The BSS Description (including any additional Description Elements defined in 0) pertaining to an individual Beacon that was received. |

This primitive is generated by the MLME if a beacon is received on the data channel. Note that a separate MLME-BEACONNOTIFY.indication is generated for each beacon received, so the primitive parameter will only ever contain a single BSSDescription. Upon receipt of this primitive, The ARMA is notified of the Beacon and the signal strength at which it was received.

5.c DRCP Messages Preferred Implementation

The following describes the manner in which the above described primitives are used to implement DRCP messages in an 802.11 environment. FIG. 40 shows a summary of the DRCP messages that are used to implement the previously described functionality. FIG. 41 shows field definitions used in DRCP messages, as follows:

DRCP Preclaim

FIG. 42 shows the format of the DRCP Preclaim message. A DRCP Preclaim message is encoded in an 802.11 Management frame of type Beacon. The ARMA sends a DRCP Preclaim message using the MLME-SENDDRCP.request management primitive with the following parameters:

Destination Address—DRCP All ARMAs Group MAC Address
  Message Length—12
    DRCP Message—Preclaim Message
      Quiet Channel—FALSE (0)
      CTS Duration—0

DRCP Claim

FIG. 43 shows the format of the DRCP Claim message. A DRCP Claim message is encoded in an 802.11 Management frame of type Beacon. The ARMA sends a DRCP Claim message using the MLME-SENDDRCP.request management primitive with the following parameters:

Destination Address—DRCP All ARMAs Group MAC Address
  Message Length—16
    DRCP Message—Claim Message
      Quiet Channel—FALSE (0)
      CTS Duration—0

DRCP Announce

FIG. 44 shows the format of the DRCP Announce message. A DRCP Announce message is encoded in an 802.11 Management frame of type Beacon. The ARMA sends a DRCP Announce message using the MLME-SENDDRCP.request management primitive with the following parameters:

Destination Address—DRCP All Agents Group MAC Address

Message Length—16
DRCP Message—Announce Message
Quiet Channel—FALSE (0)
CTS Duration—0

DRCP Bid

FIG. 45 shows the format of the DRCP Bid message. A DRCP Bid message is encoded as an LLC 1 Unnumbered SNAP PDU in a data frame. The message is addressed to the Individual MAC Address of the AP in which the target ARMA is instantiated. The SRMA sends a DRCP Bid message over the standard MAC Service Interface.

DRCP Accept

FIG. 46 shows the format of the DRCP Accept message. A DRCP Accept message is encoded as an LLC 1 Unnumbered SNAP PDU in a data frame. The message is addressed to the Individual MAC Address of the STA in which the target SRMA is instantiated. The ARMA sends a DRCP Accept message over the standard MAC Service Interface for relay to the DS.

DRCP Registration Request

FIG. 47 shows the format of the DRCP Registration Request message. A DRCP Registration Request message is encoded as an LLC 1 Unnumbered SNAP PDU in a data frame. The message is addressed to the Individual MAC Address of the AP in which the target ARMA is instantiated. The SRMA sends a DRCP Registration Request message over the standard MAC Service Interface for relay to the DS.

DRCP Registration Acknowledge

FIG. 48 shows the format of the DRCP Registration Acknowledge message. A DRCP Registration Acknowledge message is encoded as an LLC 1 Unnumbered SNAP PDU in a data frame. The message is addressed to the Individual MAC Address of the AP in which the target SRMA is instantiated. The ARMA sends a DRCP Registration Request message over the standard MAC Service Interface for relay to the DS.

6. Movement Detection

As previously described, APs and STAs ascertain movement based upon evaluation of short and long term averages of parameters, along with expected error measurements. In accordance with an aspect of the invention, movement detection is achieved through application of a broader inventive concept that provides a way to ascertain the dynamic attributes of a system based upon short and long term averages of discrete data measurements. The principles of this invention apply to any system in which a discretely measured variable may change widely. For purposes of clarity, however, the invention is now described in terms of its particular application to wireless networks.

In a wireless network such as the one shown in FIG. 1, a wireless networking user (heretofore also referred to as "STA") is associated with an access point (AP). The AP provides associated users with network connectivity via radio frequency (RF) signals. Various APs are used to provide seamless RF coverage, so that when the user moves away from one AP toward another AP, the user will associate with the closer AP (or the AP that is more lightly loaded) and seamless network functionality is thereby maintained. It is therefore important to be able to ascertain the location of a user relative to an AP so that a determination can be made as to whether the user is currently moving. This allows the system to assure that the user rapidly becomes associated with the closest AP so the overall system performance is maximized. As a user moves toward or away from an AP, the received power level (i.e. the power of the RF signal received by the user from the AP) goes up or down respectively. Thus, one way to ascertain user movement is by monitoring received power levels.

Figure 49:
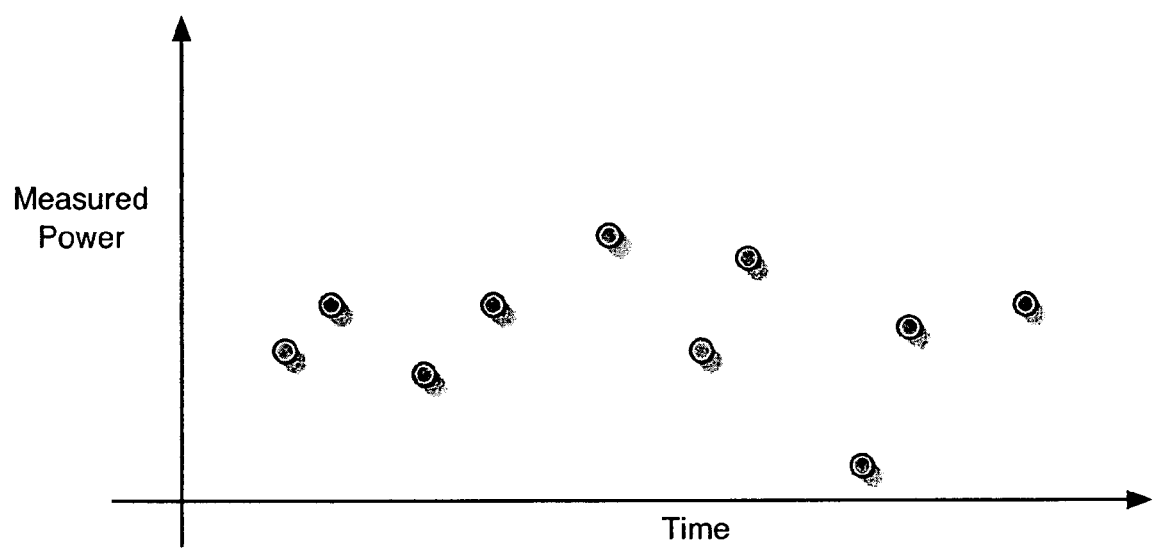
FIG. 49 is a graph showing discrete measurements of received power over time from the perspective of a wireless network user.

However, received power levels can appear to vary greatly even when a user is not moving. For example, the opening or closing of a doorway can cause either a gain or attenuation in the user's received power level. A person waving their hand near the user's antenna can even cause a gain or attenuation in received power level. Environmental interference can also cause changes in received power levels. These various changes in power level can cause a user to appear to be moving when in fact he or she is not. This can cause the user to roam needlessly between APs, particularly in environments where APs are close together and their transmit power levels are lower than maximum power. Alternatively, variations in signal power due to these effects can mask the fact that the user is indeed moving. In this case, the system could fail to detect the motion and fail to associate the user with the appropriate AP. FIG. 49 shows an example graph of discrete measurements of received power vs. time for a user who is not moving. As can be seen, the inaccuracies in data sampling prevent any assumption of movement in one direction or the other.

As a more particular example, consider an 802.11a wireless network. APs in such a network provide a maximum bandwidth of 54 Mbps. Bandwidth drops with distance from the AP. Assume that adjacent APs have their transmit power adjusted so that each provides a 54 Mbps cell on the order of about 10 feet in diameter. A walking user might be able to transition through such a cell in 2 seconds. On the other hand, a user sitting at his desk (near the center of the cell, right next to the AP) who gets up and leaves travels only 5 ft, not 10 ft to the edge of the cell—so, it may take the user only just over a second to be in the aisle and out of the cell. These examples provide a motivation for why rapid power estimates based on discrete measurements must be made. Increasing sampling rates increases accuracy, but this also causes more overhead in terms of wireless channel bandwidth, interrupt activity and processing overhead on the user device. Some user devices could be simple appliances such as phones, digital assistants, etc. and have very limited processing power. So a trade-off must be made between sample rate and overhead.

Figure 50:
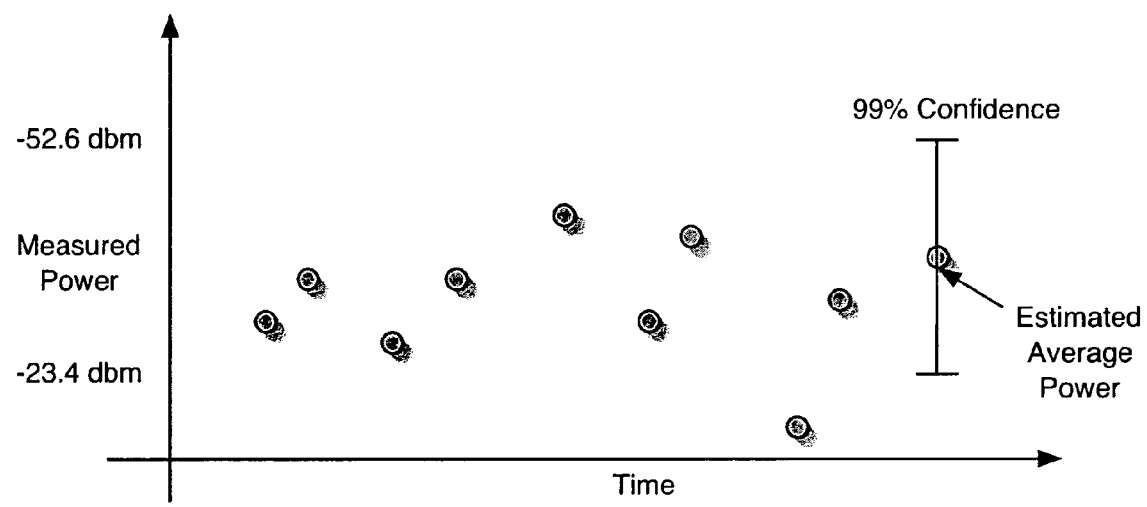
FIG. 50 is a graph showing discrete measurements of received power over time from the perspective of a wireless network user, and showing the estimated average received power for the user within a 99% confidence interval.

According to one possible implementation, power levels are measured at intervals over a window of time and a roaming decision is made. In an 802.11a network, when a user is about 1 ft from an AP whose power is set so that it has a 54 Mbps cell which is about 10 ft in diameter, the user's true mean power level should be about −38 dbm. Assume a 99% confidence interval around the true mean (i.e. the power level to be estimated) is desired. Yet, there is a variability to the measurements because of environmental effects (hand waving, etc.) as well as inherent inaccuracy in the implementation measurement itself. Assume these inaccuracies and statistical variability in the data result in distribution of the data with a standard deviation, $\sigma=15$ dbm. Referring to FIG. 50, if only 8 samples are taken in such a statistical distribution, then the 99% confidence interval around this (true) mean is −23.4 dbm to −52.6 dbm.

The 99% confidence interval has a range of |52.6−23.4|=29.2 dbm, or about 30 dbm. This is about ±15 dbm. So, because of the variability in the signal, if only 8 samples are taken, all that can be known is that the "true power" lies somewhere between −23.4 dbm and −52.6 dbm and that such conclusion can be drawn with 99% assurance.

If less accuracy can be tolerated, for example 95% or even 90% confidence, the resultant range would be narrower. But, lower confidence intervals increase the likelihood of "false positives". A false positive occurs when a user is ascertained to be moving when in fact he or she is not, causing the user to needlessly roam to another AP. It is desirable to minimize such false positives as they needlessly consume valuable bandwidth.

Figure 51:
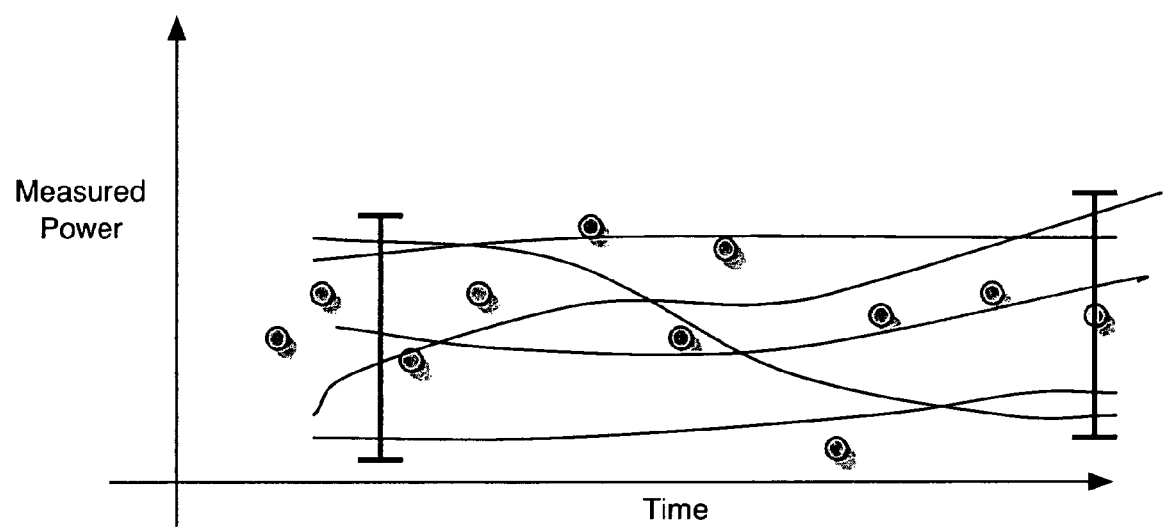
FIG. 51 is a graph similar to FIG. 3 showing two different estimated average received power measurements for small sample sizes and their 99% confidence intervals.

When a user doubles his or her distance from an AP, the user's received power decreases by 6 db. So, when a user moves from 1 foot away to 2 feet to 4 feet away from the AP (almost to the edge of the cell), the (true) average received power has decreased from −38 dbm to −44 dbm to −50 dbm respectively. But, as seen in FIG. 51, when trying to estimate the average received power from eight samples taken during this motion with a 99% confidence interval in the data, it cannot be ascertained that the user has moved. This is because the true mean is really unknown. All that is known is that it lies somewhere between −23.4 dbm and −52.6 dbm. So, when only these few samples are taken, it cannot be ascertained whether the user is moving away from the AP, getting closer to the AP, or not moving at all.

Of course increasing the number of samples taken decreases the range of error. If 20 power samples are taken, then the 99% confidence interval is −29.1 dbm to −46.9 dbm. But, taking lots and lots of samples will take too long unless channel overhead is increased.

Now consider taking n samples to produce an estimate, and then taking n more to produce a second estimate. The two estimates are then compared to see if a conclusion can be drawn as to whether the user is moving. If the confidence intervals around each estimator are large, e.g. 99%, then there exists a spectrum of outcomes and again it cannot be ascertained as to whether the user is moving toward or away from the AP, or not moving at all. In FIG. 51, to tell that the user is moving away from the AP with 99% assurance, the upper edge of the right confidence interval must be positioned below the lower edge of the left confidence interval.

Consider two basic scenarios regarding motion in wireless networks:
(1) The user stays in one place for a reasonable time and then moves to a new place. The user requires communication while moving, but, the user tends to move and then stop and stay somewhere for a while. Or similarly, the user may move very slowly within one confined area, and then move more rapidly to another area.
(2) The user is constantly in motion.

Figure 52:
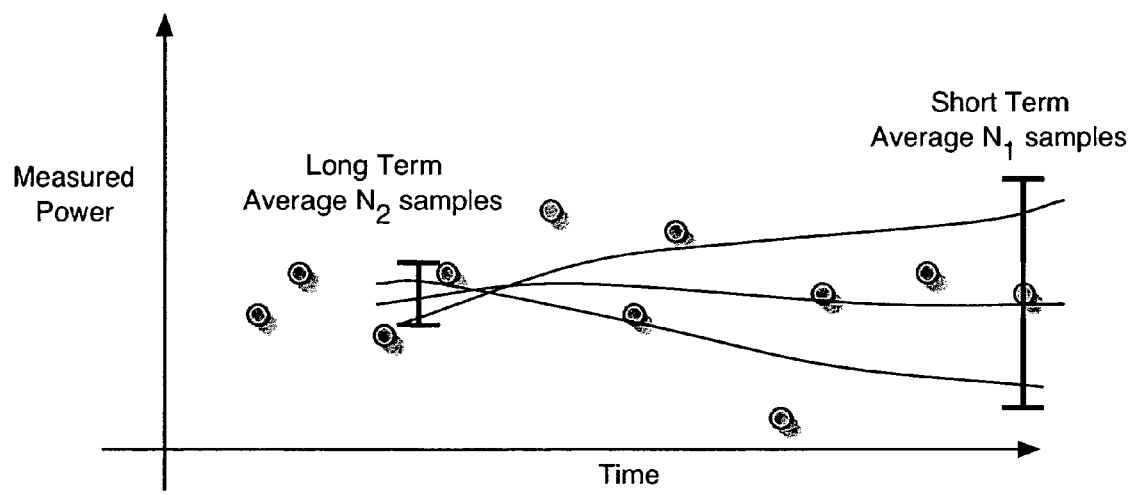
FIG. 52 is a graph showing two different estimated average received power measurements and their 99% confidence intervals, one for a large sample size and one for a small sample size.

In the instance of scenario #1, which describes the very large majority of user activity in wireless networks, the accuracy of the power estimate can be greatly improved. In accordance with the principles of the invention, two averages of the received signal strength are maintained as above. But, one is the most recent $N_1$ samples taken over a sliding window, and the other is a long term average, using $N_2$ samples. So both a long term average and a short term average are maintained. Referring to FIG. 52, the confidence interval around the long term average is very small. The error in the estimate is almost completely removed. Therefore, the potential uncertain outcomes in the decision are reduced.

Figure 53:
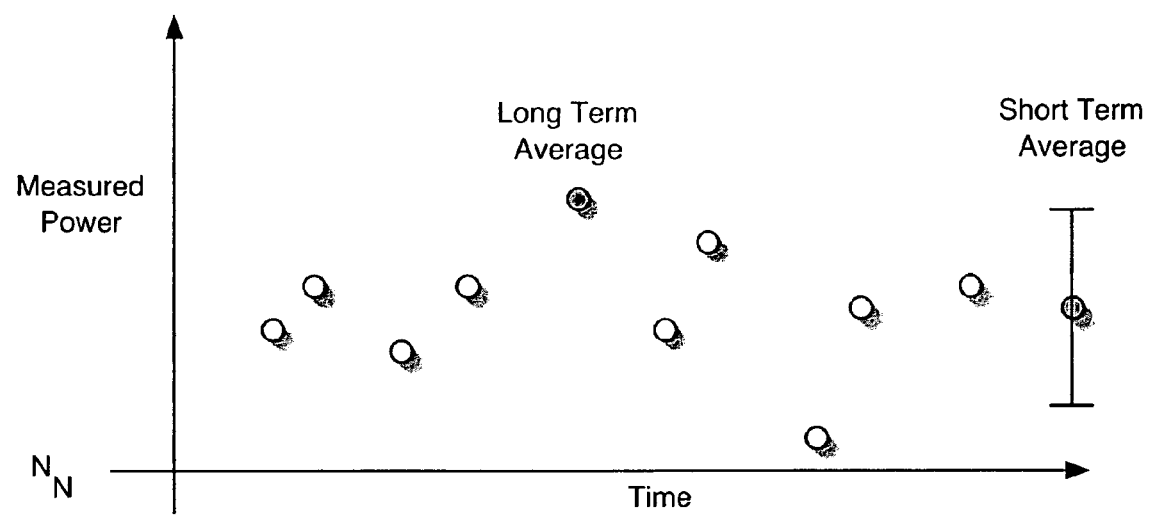
FIG. 53 is a graph showing a long term average measurement and a short term average measurement with 99% confidence interval, the comparison showing that it can be determined that a user has moved.

In FIG. 53, when the user is moving away from the AP, the upper edge of the right confidence interval will fall below the long term average (which has essentially a confidence interval of close to ±0 db.)

For a given application, one needs to ascertain how many samples ($N_2$) must be taken such that the long term average estimate has essentially 0 error. Also, it is desirable to ascertain how few samples ($N_1$) are needed in the short term average to be able to make a decision with 99% accuracy.

Assume a user starts at a position 1 foot away from the AP and moves towards the edge of the 10 ft cell. The goal is to find out how few samples are required to ascertain that the user is moving with 99% accuracy, in order to produce the most robust implementation from an overall performance perspective. If it were possible to "perfectly" measure power, a −6 db drop would be observed each time the user doubles his distance from the AP. Referring to FIG. 54, if the power level is −38 dbm when the user is at 1 foot, it is −44 dbm at 2 feet and −50 dbm at 4 feet which is almost at the edge of the cell. As can be seen in the Figure, when the short term average is −50 dbm and the upper edge of the 99% confidence interval is just below −38 dbm, then the confidence interval has a width of ±12 db. To achieve such a confidence interval, 14 samples ($N_1$) are required in the short term, given the previously assumed standard deviation of the data, σ=15 db. With these 14 samples, the 99% confidence interval is −60.7 dbm<−50<−39.2 dbm.

In this wireless network example, it has been assumed that a user can walk from the center of the cell to the edge of the cell in 1.5 seconds. So, samples need be taken every 1.5÷14≈100 milliseconds. As a further improvement, it would be desirable to use 16 samples so that division can be done by a processor via a shift operation. This increases computational efficiency on the user's machine. This increases the sample rate a negligible amount.

Regarding the long term average, it may be reasonable to tolerate a ±1 db confidence interval around the long term estimate. The tighter this interval needs to be, the longer the user has to stay near the AP, or stay relatively stationary within a certain area, to cause the average to converge. It is desirable to calculate how little time the user needs to stay in place to achieve an accuracy of ±1 db with 99% confidence. Assume, reasonably, that signal strength samples are taken based on messages received from the AP every 50 milliseconds. Referring to the table shown in FIG. 54, it is seen that if the user stays near the AP (1 ft) for about 1.5 minutes, and samples occur every 50 milliseconds, the accuracy of the power estimate becomes less than ±1 db.

The preferred implementation for the current wireless network example thus utilizes: (a) a short term average over $N_1$=16 samples, (b) a long term average over 2048 samples, and (c) "$N_2$" which is the number of samples taken so far in computing the long term average. The process is as follows:
(1) continually calculate the long term average. The long term average is not "stable" until at least 2000 samples have been taken. This takes 1.5 minutes at 50 milliseconds per sample. An implementation preferably accumulates 2048 samples to make the division a shift operation.
(2) calculate a short term average with the most recent $N_1$=16 samples. (16 is used instead of 14 so that the division is accomplished via a shift.)
(3) When the difference between the short term and long term averages is greater than 12 db then it is known with 99% accuracy that the user is moving.
(4) When the user roams to a new AP, the counter used to calculate the long term average samples is reset to 0. Then the long term average is not stable again for another 2048 samples.

In an environment where users tend to remain in a cell for less than 1 second, the long term estimate could be used based on fewer samples. However, this will result in an increased risk of false positives. Several alternatives can be considered to mitigate the occurrence of false positives:
(1) if the user has just arrived in a new cell (i.e. $N_2 \leq 32$) then require at least 32 samples before allowing a power-based roaming decision. This puts some hysteresis into the system. There will be some false positives though. If the user roams to a new AP and then back to the old one, false positives may be occurring. It may then help to require that $N_2 \leq 64$ for example. This helps the confidence interval making it −42.8 dbm<−38<−33.1 dbm.

(2) Take into account the signaling rate. For example, the long term average accumulates while the number of samples ($N_2$) grows. But, if the user's data rate has dropped, then the user has moved outside the 54 Mbps inner circle by definition. Roaming should be initiated at this point.

(3) Once a user has roamed to a new cell, the user should become "sticky" and try to stay there until the user is near the edge of the cell. Here it may be useful to require that $N_2 \geq 128$, for example, plus see the data rate drop.

To generalize, in a system wherein particular dynamic attributes are to be ascertained (e.g. "is the wireless network user in motion"), short term and long term averages of a system variable (e.g. signal strength) are calculated. An acceptable difference between the short and long term averages is calculated which positively identifies the system characteristic (e.g. the user has moved.)

Figure 55:
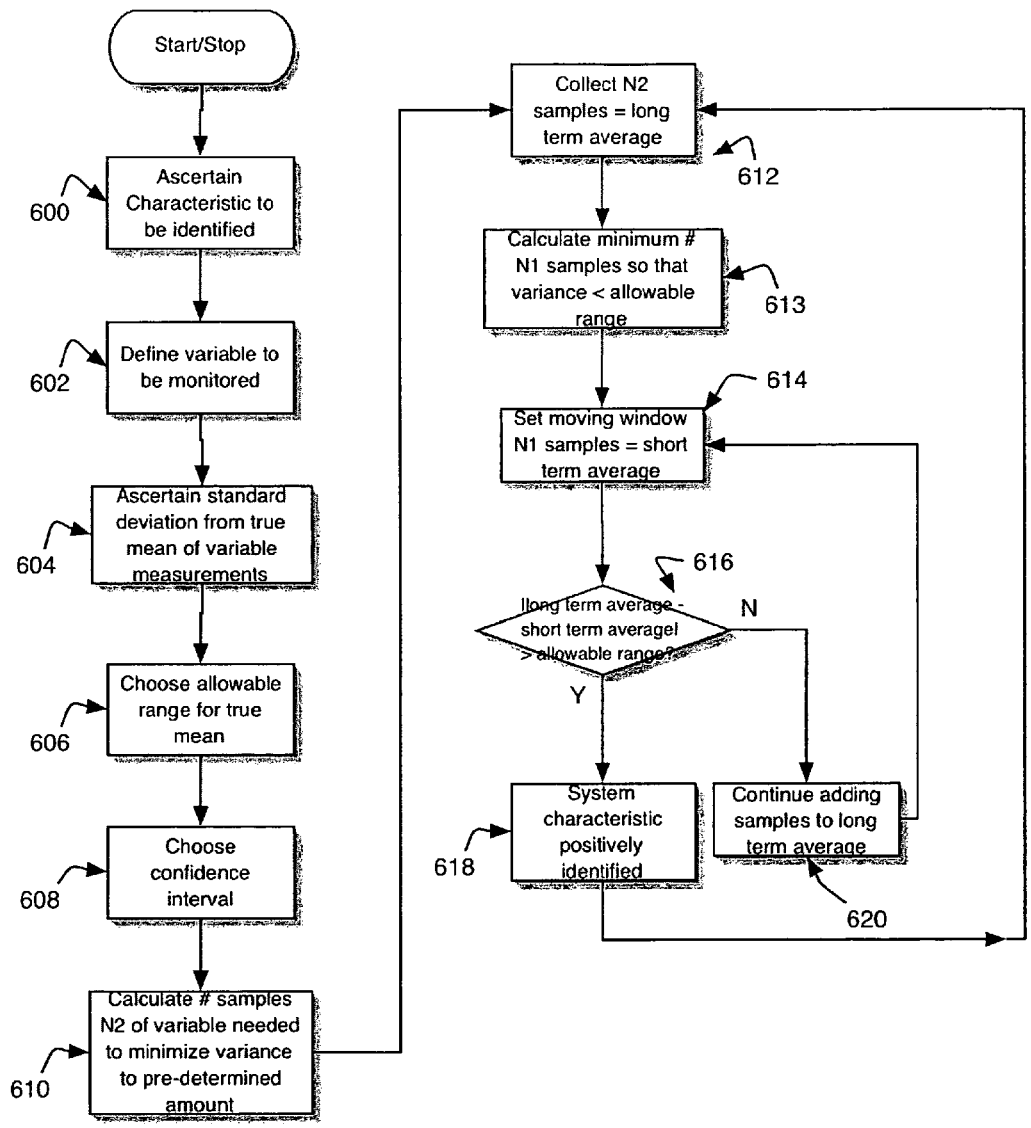
FIG. 55 is a flow diagram of the general operation of the method of the invention.

Referring to FIG. 55, the steps are generally as follows:
1. Define a system dynamic attribute to be ascertained (step 600). For example, in the wireless network example, the dynamic attribute to be ascertained is whether a user is moving. In the network usage example, the dynamic attribute to be ascertained is whether bandwidth for a user should be increased.
2. Define a system variable to be monitored to ascertain the dynamic attribute (step 602). For example, in the wireless network example, the variable is received signal strength. In the network usage example, the variable could be number of packets injected onto the network by the user.
3. Ascertain the statistical characteristics of the system variable measurements (step 604). This will include specification and analysis of individual system and environmental factors that contribute to statistical variations in the system variable(s). In the wireless network example, the standard deviation of the signal strength measurement is affected by environmental noise, implementation imprecision, spatial events and motion. In the network usage example the standard deviation is affected by the degree of burstiness in the traffic generated by the user, the speed of the user's computer, contention and interleaving effects with other network traffic, and higher layer network protocol parameters.
4. Choose the range of the true mean for the system variable that would indicate that the dynamic system attribute has been identified (step 606). For example, in the wireless network example, when the true mean of the signal strength has changed by 12 db, the system attribute—the user has moved—has been positively identified. In the network usage example, one may decide that when the true mean for number of packets injected into the network by a user has exceeded a threshold, the user's bandwidth should be increased.
5. Pick a confidence interval based on the accuracy of decisions to be made regarding the dynamic system attribute (step 608). The rate of "false positive" decisions and "false negative" decisions is controlled by how accurately the dynamic system attribute is estimated. Calculating that attribute with a higher confidence interval improves that accuracy. In the wireless network example, the confidence interval was 99%.
6. Calculate the number of samples of the variable that must be taken such that the confidence interval around a given metric (such as the average) results in a spread that is minimized to a pre-determined amount based on the decision accuracy desired (step 610). In the wireless network example, this was +/−1 db.
7. Set a long term average based on at least the number of samples obtained in step 6 (step 612). (This average is cumulative as opposed to a moving window.)
8. Given the range chosen in step 4, calculate the number of samples of the variable that must be taken such that the confidence interval around a given metric (such as the average) results in a spread that is less than the range (step 613). This calculation depends upon the standard deviation in a known manner. This calculation is well known in the field of statistics as "sample size estimation". Statistical studies which use a subset (N) of members of a population need to be designed so that inferences taken from the sample set are statistically significant and representative of the entire population. Specific knowledge, or implicit assumptions, regarding the statistical characteristics of the dynamic system variables obtained in Step 3 are used to compute the sample set size. For more information on known statistical methods for sample size computation, reference is made to "Statistical Analysis", Sam Kash Kachigan, Radius Press, NY 1986 (ISBN: 0-942154-99-1), and in particular to Section 8-11, pg 157, "Parameter Estimation, Sample Size Selection for Limiting Error", and Section 9-10, pg 189, "Sample Size Selection for Desired Power"
9. Set a short term average moving window based on the number of samples obtained in step 8 (step 614).
10. Calculate the absolute difference between the long term average and the short term average (step 516). If the difference is greater than the range chosen in step 4, then the dynamic system attribute has been positively identified (step 618). In the wireless network example, when the difference exceeded the range, it was known with 99% confidence that the user was moving or had moved. In the network usage example, if the difference between short term average packet count and long term average packet count exceeds the chosen range, this indicates that the user should be granted higher bandwidth. If the difference between the long term average and the short term average is greater than the range chosen in step 4, then the dynamic system attribute has not been positively identified (step 620), and N1 moving window samples continue to be collected.

Figure 56:
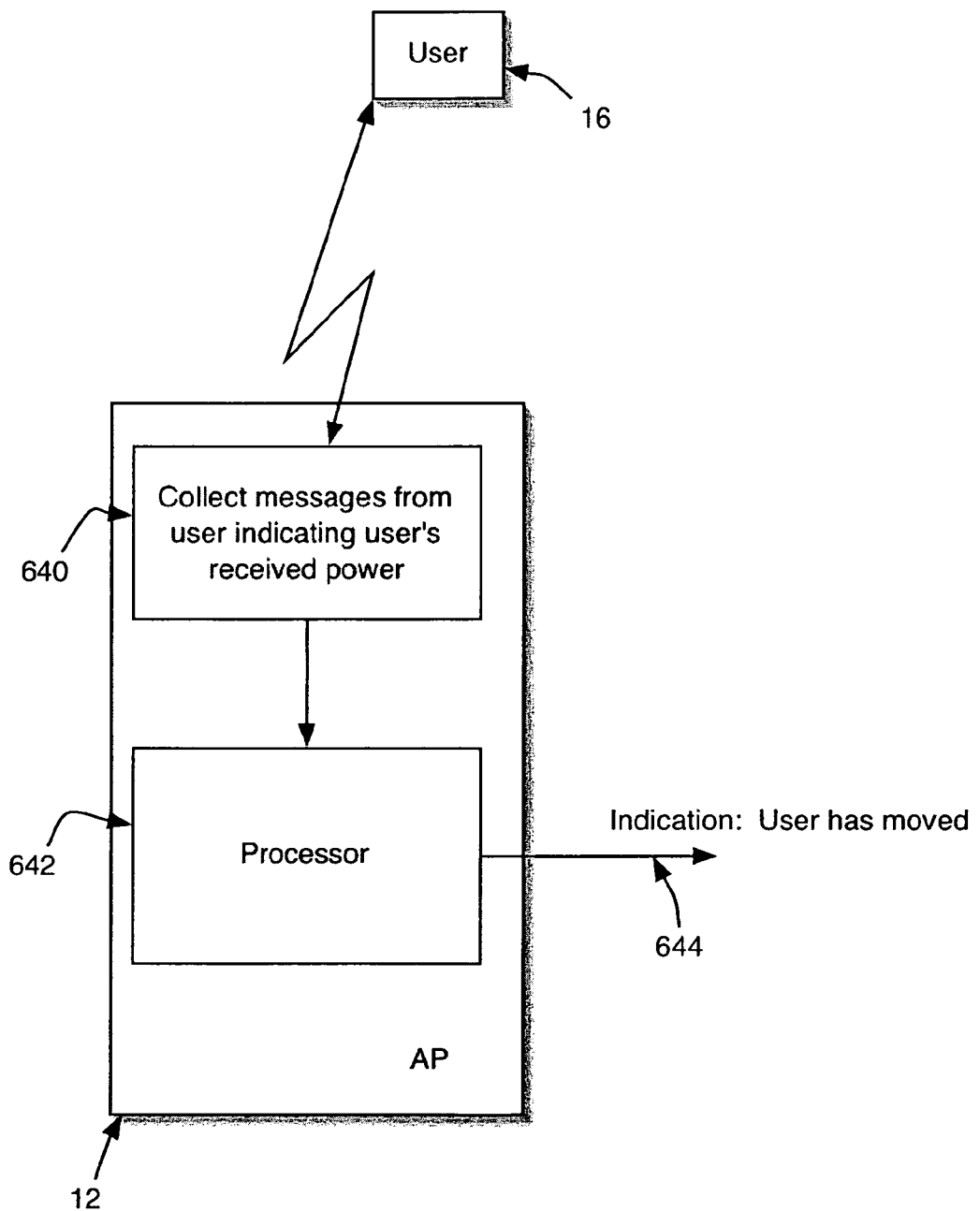
FIG. 56 is a block diagram of an embodiment of a wireless network in which the invention is deployed, wherein an AP ascertains that a user has moved.

In FIG. 56 there is shown a block diagram showing a wireless networking system that implements the invention. A user (STA 16) communicates with an AP 12 over the wireless network. The user sends messages to the AP that indicate the received signal strength from the AP as perceived by the user. These messages are collected by the AP (640). A processor 642 in the AP uses the messages to compute the short and long term averages according to the process as described in FIG. 55. When it is ascertained that the user has moved, an indication 644 is set.

Figure 57:
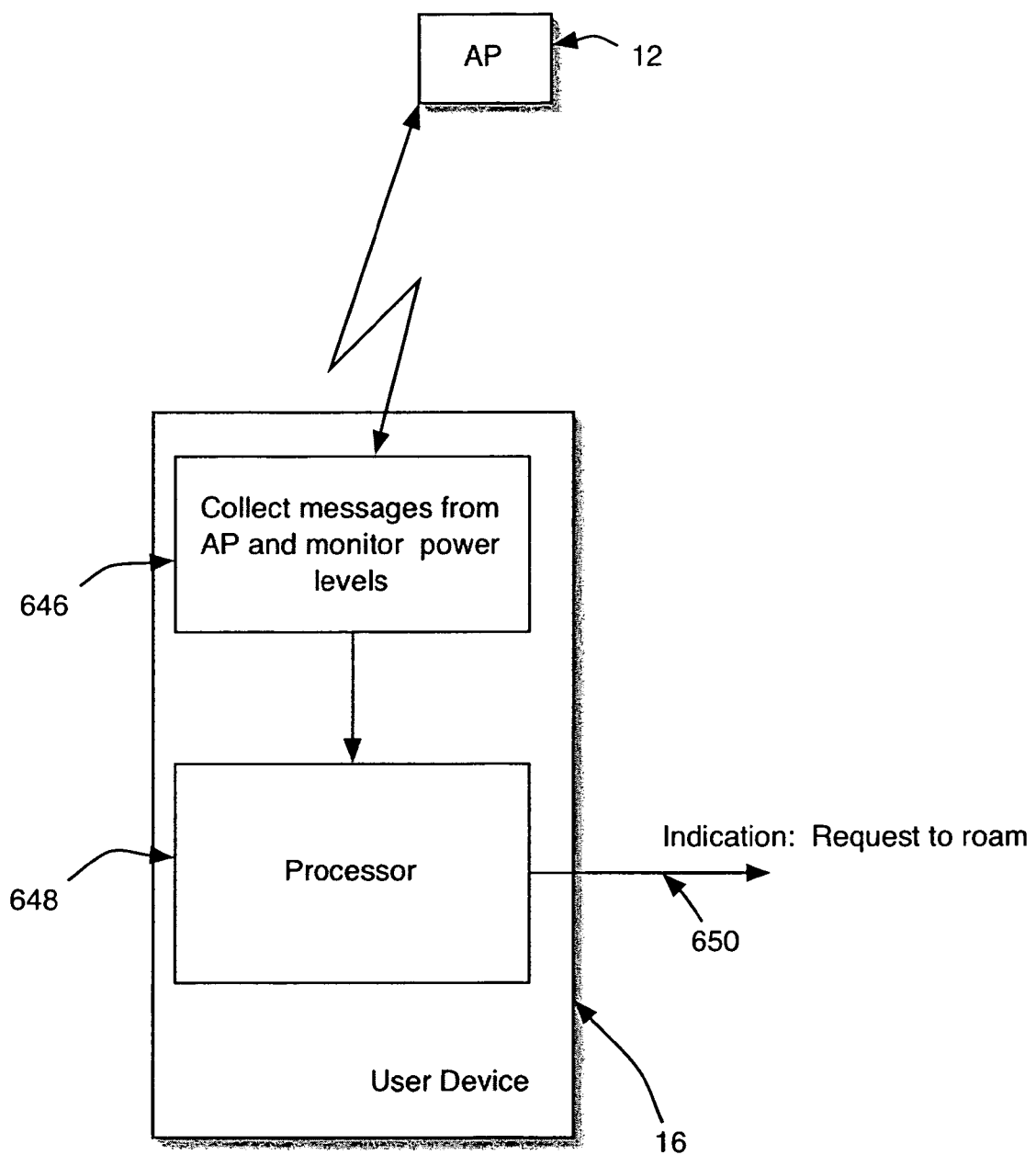
FIG. 57 is a block diagram of an alternate embodiment of the invention, wherein a user ascertains that the user has moved.

In FIG. 57 there is shown a block diagram of a preferred embodiment of a wireless networking system that implements the invention. A user device (STA 16) communicates with an AP over the wireless network. The user message collection mechanism 646 receives messages from the AP and monitors the received signal strength of the messages. A processor or hardware state machine 648 in the user device uses the signal strength of the messages to compute the short and long term averages according to the process as described in FIG. 55. When the user device ascertains that it is moving, the user sends an indication or message 650 to the AP requesting to roam.

Figure 58:
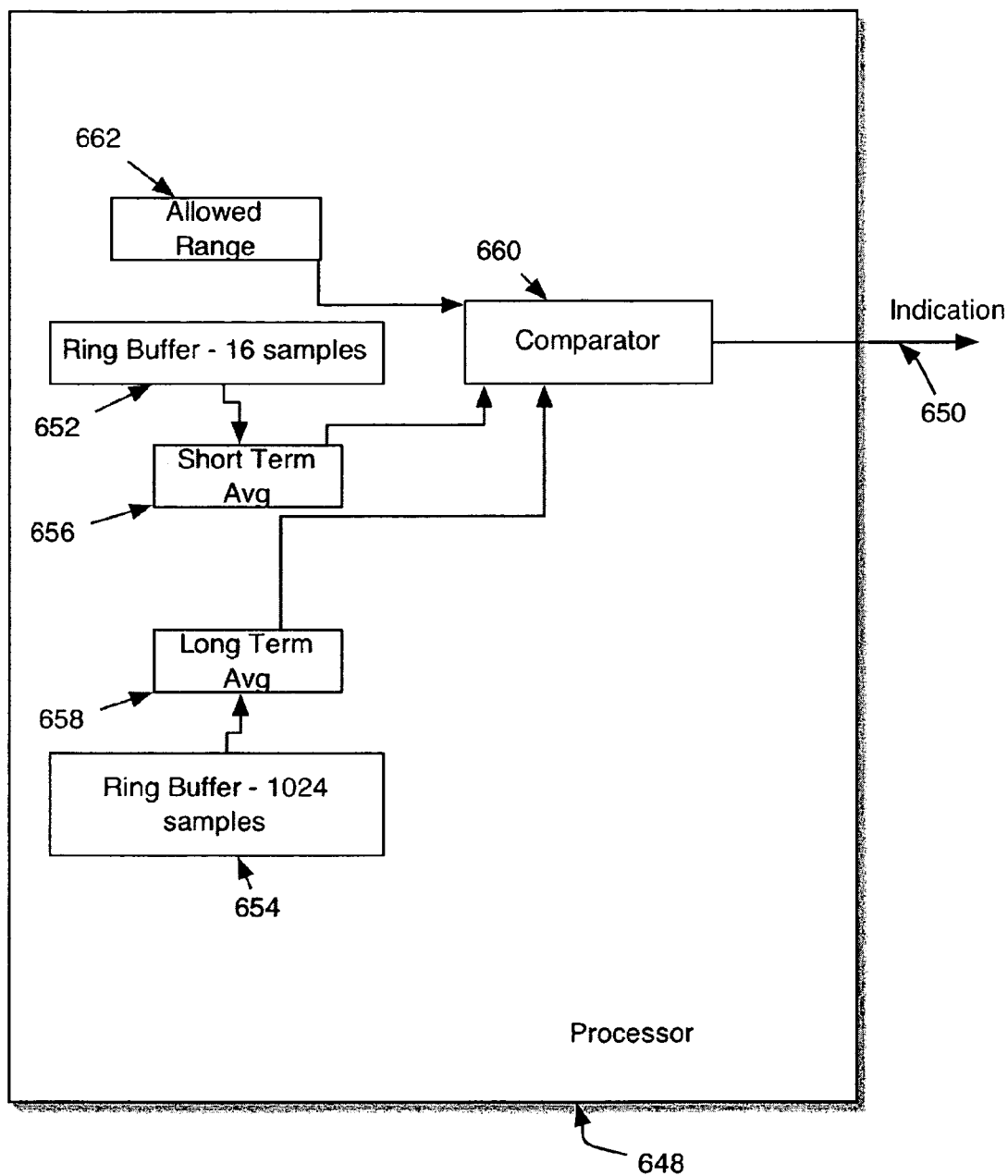
FIG. 58 is a block diagram of one embodiment of the invention employing ring buffers.

In FIG. 58 there is shown one mechanism that can be used by the processor in the implementations of either FIG. 56 or FIG. 57 to maintain the short and long term averages needed to perform the process of FIG. 55 to ascertain movement. Two ring buffers 652 and 654 are maintained—one for the short term average and one for the long term average. Ring buffers are used so that power sample averaging can be accomplished over a sliding window in time. In a ring buffer, as a new sampled is added to the buffer, the oldest sample is removed. In the wireless networking example previously described, the short term average ring buffer stores the most recent 16 samples, and the long term average ring buffer stores on the order of 1024 or 2048 samples. Of course these sample sizes will vary depending on the application. It may also be reasonable to use an accumulator-based average for the long term average, but such an approach could be subject to buffer overflow.

A short term average 656 and long term average 658 are calculated based on the contents of the respective ring buffers 652 and 654. A comparator 660 uses a stored allowed range 662 and the short term average 556 and long term average 658 to produce the movement indication 650 in accordance with the process of FIG. 55.

Figure 59:
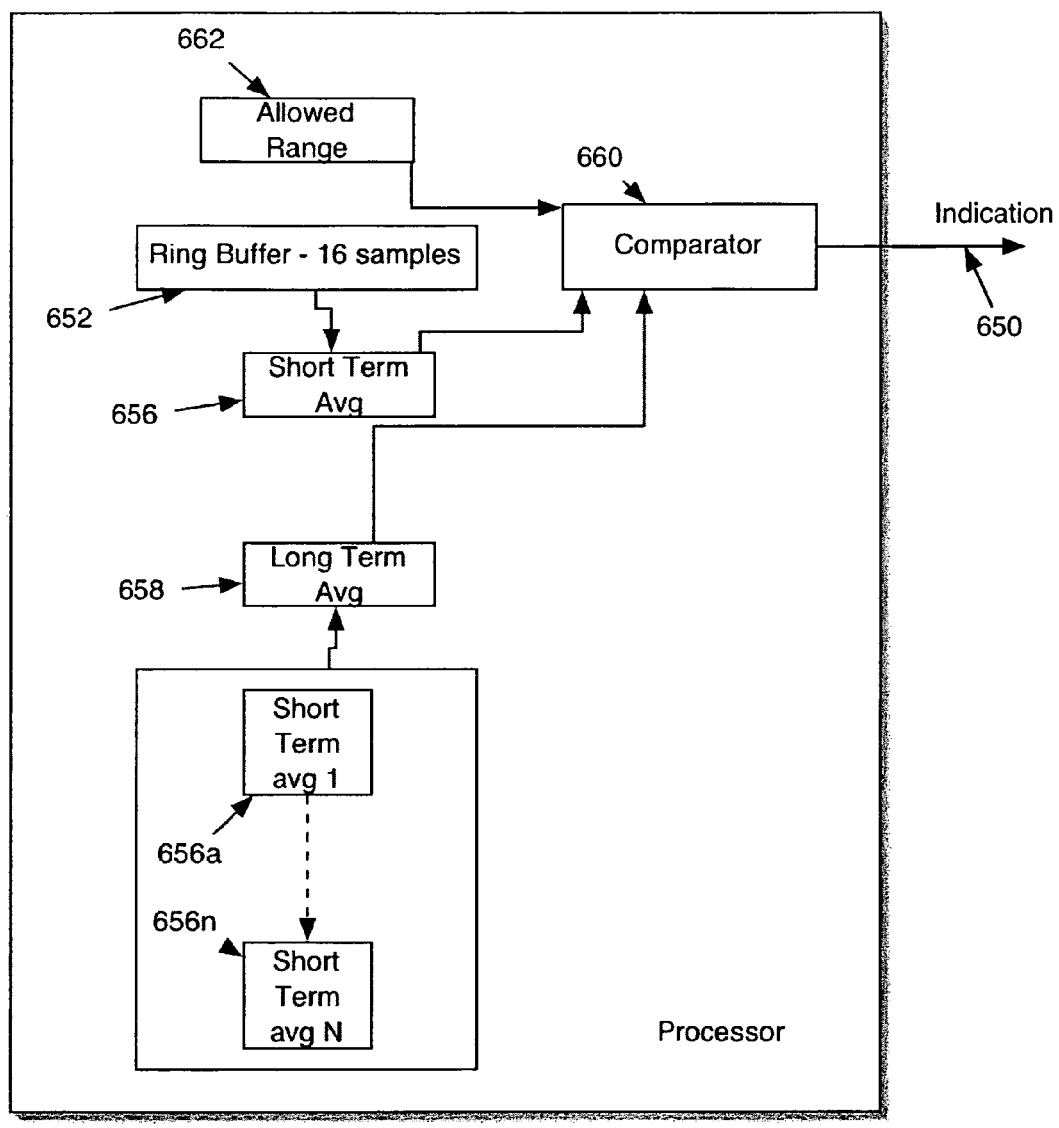
FIG. 59 is a block diagram of an alternate embodiment of the invention employing batched means.

In FIG. 59 there is shown an alternate mechanism that can be used by the processor in either FIG. 57 or FIG. 56 to maintain the short and long term averages needed to perform the process of FIG. 55 to ascertain movement. According to this mechanism, a ring buffer accumulates a small number of samples, for example 16, for computation of the short term average. Each short term average computation is saved (656a-656n). After a certain number of short term averages have been computed and saved, the long term average is computed as the average of all the accumulated short term averages. This approach is known as "batched means". This approach is advantageous for use in systems containing limited memory resources.

Though the above described aspects of the invention have been exemplified as they apply to wireless networks and, in some particularity, 802.11 networks, it will be clear to the skilled practitioner that the invention can be employed in any wireless communications environment, including wireless data networks, wireless phone networks, and wireless I/O channels. All aspects of the invention may be implemented in either hardware or software. The preferred embodiment has been described as a software architecture because of its advantageous ease of portability between various hardware platforms.

It will be understood that each block of the flowchart illustrations, and combinations of blocks in the flowchart illustrations, can be implemented by computer program instructions. These computer program instructions may be loaded onto a computer, embedded device microprocessor (such as that found in an AP or STA), or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that the system may be embodied using a variety of specific command structures. Accordingly, the invention should not be viewed as limited except by the scope and spirit of the appended claims.

The invention claimed is:

1. A computer program product for use in a wireless local area network communications environment including a plurality of access points and a plurality of mobile stations, the computer program product stored on non-transitory computer readable medium, comprising:
    code configured to, in response to restart, before transmitting regular beacons, cause a first access point to:
        select a wireless channel front a plurality of available channels;
        transmit, on the selected wireless channel, and before utilizing the channel for transmission of non-management data to a mobile station, a claim message indicative of an intent to utilize the selected channel for transmission of non-management data to a mobile station;
    code configured to select, in response to receipt of a claim message from at least one second access point indicative of utilization of or an intent to utilize the selected wireless channel, which of the first and at least one second access points will utilize the selected channel; and
    wherein when first access point is selected to utilize the selected channel, the first access point utilizes the selected channel,
    wherein when first access point is not selected to utilize the selected channel, the first access point will utilize another channel from the plurality of available channels, the another channel being different from the selected channel, and
    wherein the code configured to select is configured to make a non-random selection.

2. The program product of claim 1 further including causing the first access point to transmit announce messages to indicate presence and protocol capability.

3. The computer program product of claim 1, wherein the code configured to select is configured to give priority in the selection process to whichever of the first and at least one second access points is closer to the center of a network.

4. The computer program product of claim 1, wherein the claim message from the at least one second access point includes the number of access points that the corresponding at least one second access point has heard from, and the code configured to select includes code configured to:
  first compare (a) a number of access points that the first access point has heard from with (b) a number of access points identified in the claim message from the at least one second access point;
  assign priority in selection based on the comparing.

5. The computer program product of claim 1, wherein the code configured to assign comprises code configured to maintain a claim on the selected channel by the first access point when the number of access points that the first access point has heard from is greater than the number of access points identified in the claim message from the at least one second access point.

6. The computer program product of claim 1, further comprising, code configured to second compare, where the first code configured to compare results in a tie, (a) power level based data of access points that the first access point has heard from with (b) power level based data identified in the claim message from the at least one second access point.

7. The method of claim 1, further comprising, second comparing, when the first comparing results in a tie, (a) power level based data of access points that the first access point has heard from with (b) power level based data identified in the claim message from the at least one second access point.

8. The method of claim 1, wherein a higher number indicates that the particular access point is closer to the center of the network.

9. A method for managing channel use a wireless local area network communications environment including a plural of access points and a plurality of mobile stations, the method comprising:
  causing, in response to restart and before transmitting regular beacons, a first access point to:
    select a wireless channel from a plurality of available channels;
    transmit, on the selected wireless channel, and before utilizing the channel for transmission of non-management data to a mobile station, a claim message indicative of an intent to utilize the selected channel for transmission of non-management data to a mobile station;
  selecting, in response to receipt of a claim message from at least one second access point indicative of utilization of or an intent to utilize the selected wireless channel, which of the first and at least one second access points will utilize the selected channel; and
  wherein when first access point is selected to utilize the selected channel, the first access point utilizes the selected channel,
  wherein when first access point is not selected to utilize the selected channel, the first access point cannot use the selected channel and will instead utilize another channel from the plurality of available channels, and
  wherein the selecting comprises a non-random selection.

10. The method of claim 9, wherein the selecting gives priority to whichever of the first and at least one second access points is closer to a center of a network.

11. The method of claim 9, wherein the claim message from the at least one second access point includes the number of access points that the corresponding at least one second access point has heard from, and the selecting further comprises:
  first comparing (a) a number of access points that the first access point has heard from with (b) a number of access points identified in the claim message from the at least one second access point;
  assigning priority in selection based on the comparing.

12. The method of claim 9, wherein assigning comprises maintaining a claim on the selected channel by the first access point when the number of access points that the first access point has heard from is greater than the number of access points identified in the claim message from the at least one second access point.

13. A method for managing a plurality of access points in a WLAN, the network having a center and a periphery, at an access point in response to restart and before transmitting regular beacons:
  selecting a wireless channel from a plurality of available channels;
  transmitting, on the selected wireless channel and before utilizing the channel for transmission of non-management data to a mobile station, a transmitted claim message indicative of an intent to utilize the selected channel for transmission of non-management data to a mobile station;
  identifying, for the selected wireless channel, any conflicting use or intent to use of the selected wireless channel from competing access points within the plurality of access points;
  utilizing the selected wireless channel when the identifying fails to identify any conflict;
  resolving the conflict when identified, comprising:
    maintaining a claim to the selected channel when parameters indicate that the access point is likely closer to the center than competing access points; and
    surrendering the claim to the selected channel when parameters indicate that the access point is likely farther from the center than at least one of the competing access points;
  selecting a wireless channel from the plurality of available channels; and
  repeating the transmitting, identifying and resolving for the Previously Presented selected wireless channel.

14. The method of claim 13, wherein the parameters include a number of access points that a particular access point has heard from.

15. The method of claim 14, wherein the parameters include a power level based data of access points that the particular access point has heard from, and reliance is made on the power level data when the higher number results in a tie.

16. A method for managing channel use in a wireless local area network communications environment including a plurality of access points and a plurality of mobile stations, the method comprising at a first access point:
  first selecting, in response to restart, a wireless channel from a plurality of available channels;
  determining, in response to a competing claim for the selected wireless channel by at least one other second access point, whether the first access point will utilize the selected channel; and
  second selecting, when first access point is not determined to utilize the selected wireless channel, another channel from the plurality of available channels, and wherein the second selecting comprises:
    selecting a new wireless channel from the plurality of available channels; and
    repeating the determining for the new selected wireless channel; and repeating, when the repeated determining determines that the first access point will not utilize the new selected wireless channel, the second selecting.

17. The method of claim 16 further comprising utilizing the selected wireless channel when the determining fails to identify any competing claim.

18. A method for managing channel use in a wireless local area network communications environment including a plurality of access points and a plurality of mobile stations, the method comprising at a first access point:
first selecting, in response to restart, a wireless channel from a plurality of available channels;
determining, in response to a competing claim for the selected wireless channel by at least one other second access point, whether the first access point will utilize the selected channel, comprising:
maintaining a claim to the selected channel when parameters indicate that the access point is likely closer to the center than any competing access points; and
surrendering the claim to the selected channel when parameters indicate that the access point is likely farther from the center than at least one of the competing access points;
second selecting, when first access point is not determined to utilize the selected wireless channel, another channel from the plurality of available channels.

19. A computer program product for use in a wireless local area network communications environment including a plurality of access points and a plurality of mobile stations, the computer program product stored on a non-transitory computer readable medium, comprising:
code configured to, in response to restart, cause a first access point to:
select a wireless channel from a plurality of available channels;
determine, in response to a competing claim for the selected wireless channel by at least one other second access point, whether the first access point will utilize the selected channel; and
second select, when first access point is not determined to utilize the selected wireless channel, another channel from the plurality of available channels;
wherein the second select comprises:
select a new wireless channel from the plurality of available channels; and
repeat the execution of the code configured to determine for the new selected wireless channel; and
repeat, when the repeat the execution of the code configured to determine determines that the first access point will not utilize the new selected wireless channel, execution of the code configured to cause the first access point to second select.

20. The computer program product of claim 19 further comprising code configured to utilize the selected wireless channel when the code configured to determine fails to identify any competing claim.

21. A computer program product for use in a wireless local area network communications environment including a plurality of access points and a plurality of mobile stations, the computer program product stored on a non-transitory computer readable medium, comprising:
code configured to, in response to restart, cause a first access point to:
select a wireless channel from a plurality of available channels;
determine, in response to a competing claim for the selected wireless channel by at least one other second access point, whether the first access point will utilize the selected channel comprising:
maintain a claim to the selected channel when parameters indicate that the access point is likely closer to the center than any competing access points; and
surrender the claim to the selected channel when parameters indicate that the access point is likely farther from the center than at least one of the competing access points;
second select, when first access point is not determined to utilize the selected wireless channel, another channel from the plurality of available channels.

22. An access point configured to managing channel use in a wireless local area network communications environment with other access points and a plurality of mobile stations, the access comprising:
a memory;
a processor cooperating with the memory and being configured to:
select a wireless channel from a plurality of available channels;
determine, in response to a competing claim for the selected wireless channel by at least one other second access point, whether the first access point will utilize the selected channel; and
second select, when first access point is not determined to utilize the selected wireless channel, another channel from the plurality of available channels;
wherein the second select comprises:
select a new wireless channel from the plurality of available channels; and
repeat the determine for the new selected wireless channel; and
repeat, when the repeated determine determines that the first access point will not utilize the new selected wireless channel, the second selecting.

23. The access point of claim 22 wherein the processor is configured to utilize the selected wireless channel when the determine fails to identify any competing claim.

24. An access point configured to managing channel use in a wireless local area network communications environment with other access points and a plurality of mobile stations, the access comprising:
a memory;
a processor cooperating with the memory and being configured to:
select a wireless channel from a plurality of available channels;
determine, in response to a competing claim for the selected wireless channel by at least one other second access point, whether the first access point will utilize the selected channel, comprising:
maintain a claim to the selected channel when parameters indicate that the access point is likely closer to the center than any competing access points; and
surrender the claim to the selected channel when parameters indicate that the access point is likely farther from the center than at least one of the competing access points;
second select, when first access point is not determined to utilize the selected wireless channel, another channel from the plurality, of available channels.

25. A system for managing channel use in a wireless local area network communications environment including a plurality of access points and a plurality of mobile stations, the system comprising at a first access point:

means for first selecting, in response to restart, a wireless channel from a plurality of available channels;

means for determining, in response to a competing claim for the selected wireless channel by at least One other second access point, whether the first access point will utilize the selected channel; and means for second selecting, when first access point is not determined to utilize the selected wireless channel, another channel from the plurality of available channels, and wherein the means for second selecting comprises:

means for selecting a new wireless channel from the plurality of available channels; and means for repeating the determining for the new selected wireless channel; and means for repeating, when the repeated determining determines that the first access point will not utilize the new selected wireless channel, the second selecting.

26. The system of claim 25 further comprising means for utilizing the selected wireless channel when the means for determining fails to identify any competing claim.

27. A system for managing channel use in a wireless local area network communications environment including a plurality of access points and a plurality of mobile stations, the system comprising at a first access point:

means for first selecting, in response to restart, a wireless channel from a plurality of available channels;

means for determining, in response to a competing claim for the selected wireless channel by at least one other second access point, whether the first access point will utilize the selected channel, comprising;

means for maintaining a claim to the selected channel when parameters indicate that the access point is likely closer to the center than any competing access points; and means for surrendering the claim to the selected channel when parameters indicate that the access point is likely farther from the center than at least one of the competing access points;

means for second selecting, when first access point is not determined to utilize the selected wireless channel, another channel from the plurality of available channels.

* * * * *